United States Patent
Bruderlin et al.

(10) Patent No.: US 7,427,991 B2
(45) Date of Patent: Sep. 23, 2008

(54) SYSTEM AND PROCESS FOR DIGITAL GENERATION, PLACEMENT, ANIMATION AND DISPLAY OF FEATHERS AND OTHER SURFACE-ATTACHED GEOMETRY FOR COMPUTER GENERATED IMAGERY

(75) Inventors: Armin Bruderlin, Culver City, CA (US); Jeffrey M. Chan, Los Angeles, CA (US); Robert B. Engle, Los Angeles, CA (US); Gokhan Kisacikoglu, Redondo Beach, CA (US); Brian Steiner, Los Angeles, CA (US); David S. Tanner, Los Angeles, CA (US)

(73) Assignees: Sony Corporation, Tokyo (JP); Sony Pictures Entertainment Inc., Culvery City, CA (US)

( * ) Notice: Subject to any disclaimer, the term of this patent is extended or adjusted under 35 U.S.C. 154(b) by 279 days.

(21) Appl. No.: 10/364,272

(22) Filed: Feb. 10, 2003

(65) Prior Publication Data

US 2003/0179203 A1    Sep. 25, 2003

Related U.S. Application Data

(60) Provisional application No. 60/397,163, filed on Jul. 18, 2002, provisional application No. 60/356,723, filed on Feb. 12, 2002.

(51) Int. Cl.
  *G09G 5/00* (2006.01)
(52) U.S. Cl. .................. 345/581; 345/473; 345/474; 345/419; 382/100
(58) Field of Classification Search ......... 345/473–474, 345/419, 581–582
See application file for complete search history.

(56) References Cited

U.S. PATENT DOCUMENTS

| | | | | |
|---|---|---|---|---|
| 5,764,233 A | * | 6/1998 | Brinsmead et al. | 345/419 |
| 5,777,619 A | * | 7/1998 | Brinsmead | 345/419 |
| 6,097,396 A | * | 8/2000 | Rouet et al. | 345/582 |
| 6,720,962 B1 | * | 4/2004 | Alter | 345/420 |
| 6,940,508 B2 | * | 9/2005 | Lengyel | 345/428 |
| 6,952,218 B1 | * | 10/2005 | Bruderlin | 345/581 |
| 7,050,062 B2 | * | 5/2006 | Bruderlin | 345/581 |

OTHER PUBLICATIONS

Y. Watanabe and Y. Suenaga, "A trigonal prism-based method for hair image generation", IEEE Computer Graphics and Applications, 17(3), May 1997, p. 47-53.*

(Continued)

*Primary Examiner*—Jin-Cheng Wang
(74) *Attorney, Agent, or Firm*—Samuel S. Lee; Procopio, Cory, Hargreaves & Savitch LLP

(57) ABSTRACT

A system and process for digitally representing a plurality of surface-attached geometric objects on a model. The system and process comprises generating a plurality of particles and placing the plurality of particles on a surface of the model. A first plurality of curves are generated and placed at locations on the model. Characteristics are defined for the first plurality of curves. A second plurality of curves is interpolated from the first plurality of curves at locations of the particles. A plurality of surface-attached geometric objects is generated that replaces all of the particles and the second plurality of curves.

120 Claims, 28 Drawing Sheets

OTHER PUBLICATIONS

C.-Y. Lee, W.-R. Chen, E. Leu, M. Ouhyoung, "A Rotor Platform Assisted System for 3D Hairstyles", at www.cmlab.csie.ntu.edu.tw, Oct. 14, 2001 13:14.*

A. Bruderlin, "A method to generate wet and broken-up animal fur", Proc. 7th Pacific Conf. on Comp. Graphics and App., Oct. 5-7, 1999, pp. 242-249.*

J. T. Kajiya, T. L. Kay, Rendering fur with three dimensional textures, Proceedings of the 16th annual conference on Computer graphics and interactive techniques, p. 271-280, Jul. 1989.*

Jerome Lengyel, Emil Praun, Adam Finkelstein, Hughes Hoppe, Real-time fur over arbitrary surfaces, Proceedings of the 2001 symposium on Interactive 3D graphics, p. 227-232, Mar. 2001.*

Dan B. Goldman, Fake fur rendering, Proceedings of the 24th annual conference on Computer graphics and interactive techniques, p. 127-134, Aug. 1997.*

C.-Y. Lee, W.-R. Chen, E. Leu, M. Ouhyoung, "A Rotor Platform Assisted System for 3D Hairstyles", Proc. WSCG 2002 (the 10$^{th}$ International Conf. in Central Europe on Computer Graphics Vis. and Computer Vision, Pizen, Czech Rep., Feb. 2002.*

N. M. Thalmann, et al., "Virtual Clothes, Hair and Skin for Beautiful Top Models", MIRALab Information 1998, pp. 1-19.*

Tae-Yong Kim, "A Thin Shell Volume for Modeling Human Hair", IEEE Computer Animation, pp. 104-111, 2000.*

A. Daldegan, N. Magnenat Thalmann, T. Kurihara and D. Thalmann, *An Integrated System for Modeling, Animating and Rendering Hair*, Eurographics '93, Proceedings, 12, 3, 1993, pp. 211-221.

N. Magnenat Thalmann et al., *Virtual Clothes, Hair and Skin for Beautiful Top Models*, Computer Graphics International '96, Proceedings, South Korea, 1996, pp. 132-141.

L. Streit, W. Heidrich, *A Biologically-Parameterized Feather Model*, Eurographics '02 Proceedings, 21, Sep. 3, 2002.

P. Volino, M. Courchesne, N. Magnenat Thalmann, *Versatile and Efficient Techniques for Simulating Cloth and Other Deformable Objects*, Computer Graphics (ACM SIGGRAPH Proceedings), Los Angeles, 1995, pp. 137-144.

A. Witkin, P. Heckbert, *Using Particles to Sample and Control Implicit Surfaces*, Computer Graphics (ACM SIGGRAPH Proceedings), 1994, pp. 1-9.

Y. Chen, Y. Xu, B. Guo, H.Y. Shum. *Modeling and Rendering of Realistic Feathers*, Computer Graphics (ACM SIGGRAPH Proceedings), San Antonio, 2002, pp. 630-636.

M. Moore, J. Wilhelms, *Collision Detection and Response for Computer Animation*, Computer Graphics (ACM SIGGRAPH Proceedings), 22(4), 1988, pp. 289-298.

D. Baraff, A. Witkin, *Dynamic Simulation of Non-Penetrating Flexible Bodies*, Computer Graphics (ACM SIGGRAPH Proceedings), 26(2), 1992, pp. 303-308.

B. Robertson, *Birds of a Feather*, Computer Graphics World, vol. 24, No. 1, Jan. 2001, pp. 22-27.

D. Baraff, A. Witkin, *Large Steps in Cloth Simulation*, Computer Graphics (ACM SIGGRAPH Proceedings), Orlando, 1998, p. 43-54 (CD-ROM version, pp. 1-12).

D. Breen, D. House, M. Wozny, *Prediction the Drape of Woven Cloth Using Interacting Particles*, Computer Graphics (ACM SIGGRAPH Proceedings), Orlando, 1994, pp. 365-372 (CD-ROM version, 9 pages).

A. Bruderlin, *A method to generate wet and broken-up animal fur*, Journal of Visualization and Compter Animation, John Wiley & Sons, vol. 11, No. 5, Dec. 2000, pp. 249-259.

D. Goldman, *Fake Fur Rendering*, Computer Graphics (ACM SIGGRAPHS Proceedings), Los Angeles, 1997, pp. 127-134 (CD-ROM version, 8 pages).

A. Van Gelder and J. Wilhelms, *An Interactive Fur Modeling Technique*, Graphics Interface '97, Proceedings, May 1997, pp. 181-188.

* cited by examiner

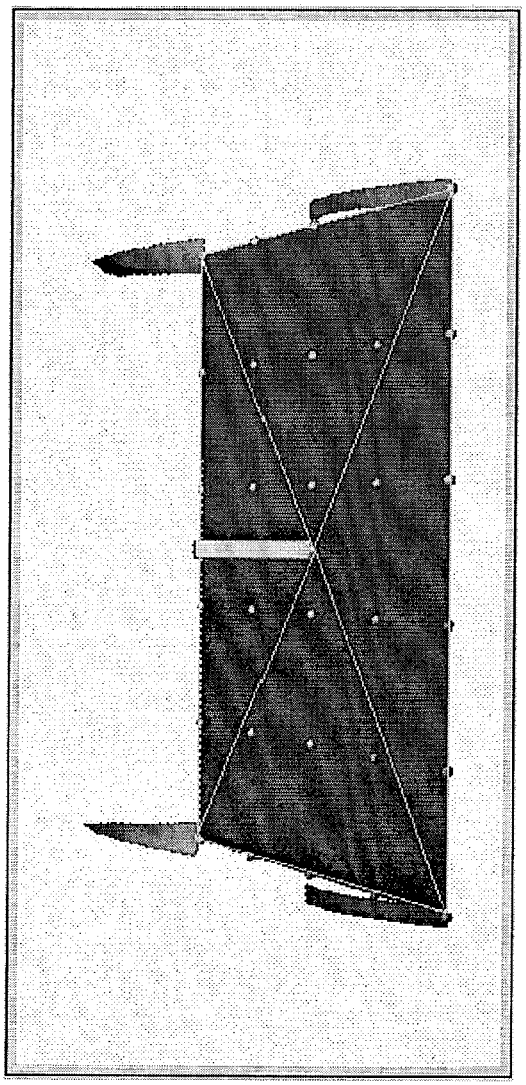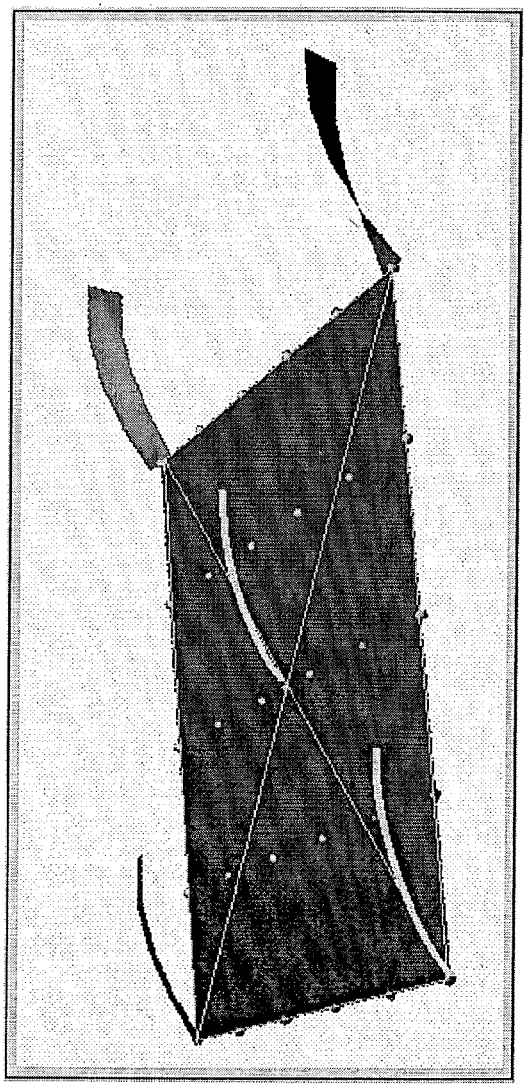
FIG. 8A
FIG. 8B

SYSTEM AND PROCESS FOR DIGITAL GENERATION, PLACEMENT, ANIMATION AND DISPLAY OF FEATHERS AND OTHER SURFACE-ATTACHED GEOMETRY FOR COMPUTER GENERATED IMAGERY

RELATED APPLICATIONS

This application claims priority to Provisional Application No. 60/356,723 filed Feb. 12, 2002, and to Provisional Application No. 60/397,163 filed Jul. 18, 2002, each of which is hereby incorporated by reference.

BACKGROUND OF THE INVENTION

1. Field of the Invention

The present invention relates generally to systems and processes for digital generation, placement, animation and display of surface-attached geometric objects on computer generated models. More particularly, the present invention relates to the digital generation, placement, animation and display of realistic feathers on animal models.

2. Description of Related Art

Media productions have benefited in recent years from technical advances in animation and in computer generated images. Increasingly, producers and directors of media productions are creating scenes comprising a combination of real and computer generated images that appear to be interacting with each other and co-existing within the same real or virtual space. These new techniques can create realistic special effects such as computer generated dinosaurs, mice or birds interacting with real people, or the destruction of recognizable cities by computer generated asteroids.

These new techniques are used in media productions such as motion pictures, television shows, television commercials, videos, multimedia CD-ROMs, web productions for the Internet/intranet, and the like. One of the many challenges in modeling, animating and rendering believable birds in computer graphics has been to produce realistic-looking feathers. A real feather coat is made up of many individual feathers covering the skin, and fulfills vital functions such as lifting the bird in flight, attracting mates, and protection against cold, moisture and predators. Between different birds, as well as across the body of individual birds, the look and structure of these feathers vary greatly with respect to length, thickness, shape, color, orientation and under/overcoat composition. In addition, feathers are not static, but move and break up as a result of the motion of the underlying skin and muscles, and also due to external influences, such as wind and moisture.

Thus, computer generation of a convincing feather coat which covers the skin of a bird requires dedicated solutions to a number of problems. For instance, it is not feasible to individually model and animate all of the feathers. In addition, interpenetration ("collisions") may arise, both between neighboring computer generated feathers and between computer generated feathers and the underlying skin surfaces. Also, prior methods of computer generation of feathers do not account for the fact that wet feathers clump together, resulting in a significantly different appearance compared to dry feathers. Furthermore, prior methods of computer generation of feathers do not adequately simulate the effects of wind on a feather coat.

Thus, there is an industry demand for a practical, flexible, robust, efficient and easy to use system and method that can generate realistic computer generated feathers. In addition, there is an industry demand for a system and method that can generate, place and display a large variety of feathers on a bird's skin to create a dense feather coat, while at the same time minimizing interpenetration between computer generated feathers. Furthermore, there is an industry demand for a system and method that can realistically reproduce the effects of moisture and wind on feathers.

SUMMARY OF THE DISCLOSURE

Therefore, embodiments of the present invention provide a practical, flexible, robust, efficient and easy to use system and method for the digital representation and generation of realistic computer generated surface-attached geometric objects, including, but not limited to, computer generated feathers, hair, leaves, grass, scales and the like.

According to embodiments of the present invention, a system and process for digitally representing a plurality of surface-attached geometric objects on a model (such as an animated character or any other computer generated object) is disclosed. The system and process comprises generating a plurality of particles and placing the plurality of particles on a surface of the model. A first plurality of curves are generated and placed at locations on the model. At least one characteristic is defined for at least one of the first plurality of curves. A second plurality of curves is interpolated from the first plurality of curves at locations of the plurality of particles. A plurality of surface-attached geometric objects is generated that replaces all of the particles and the second plurality of curves.

In one embodiment, the defined characteristic of the curves may be, for example, an orientation, bend and/or twist of the curves. In other embodiments, a two-dimensional ribbon is defined over the curve and the defined characteristic is a twist and/or a bend of the ribbon. A twist of a curve or ribbon may be defined as a rotation of the curve or ribbon about a central axis of the curve or ribbon. A bend of a curve or ribbon may be defined as a curvature of a central axis of the curve or ribbon.

According to some embodiments of the present invention, expressions are evaluated for each surface-attached geometric object to be attached to the surface of the model. These expressions include static expressions, dynamic expressions and execution control expressions. Static expressions may contain time-invariant expressions which specify feather attributes such as default length or default laydown angle. Dynamic expressions may allow a user to alter various attributes of the surface-attached geometric objects at render time. Thus, using dynamic expressions the user may create a desired look without affecting the default attribute settings. As an example, the laydown angle may be modified for a certain subset of surface-attached geometric objects, such as feathers, based on a unique identifier of a surface-attached geometric object. Dynamic expressions may also be used to turn on or off a list of surface-attached geometric objects based on their unique identifiers. Execution control expressions provide a user with a powerful and flexible mechanism to rearrange the render-time processing of surface-attached geometric objects to achieve a desired look or effect. According to other embodiments of the present invention, fx attributes may be applied to surface-attached geometric objects. In the case of a feather, the fx attributes may include the number of splits in a feather and the number of hairs in a feather.

According to embodiments of the present invention, a surface-attached geometric object having a base shape defined at least in part by the expressions is generated to replace each particle. In some embodiments, the base shape may be deformed according to the expressions. In one embodiment, the generated surface-attached geometric objects may be exported to a modeling and animation application for manual animation and then reintroduced into the generation process.

These and other features and advantages of embodiments of the invention will be apparent to those skilled in the art from the following detailed description of embodiments of the invention, when read with the drawings and appended claims.

BRIEF DESCRIPTION OF THE DRAWINGS

Referring now to the drawings in which like reference numbers represent corresponding parts throughout:

FIGS. 8A and 8B show two different views showing examples of key-curves and ribbons placed on a surface patch and combed, according to embodiments of the present invention;

DETAILED DESCRIPTION OF EMBODIMENTS OF THE INVENTION

Figure 1:
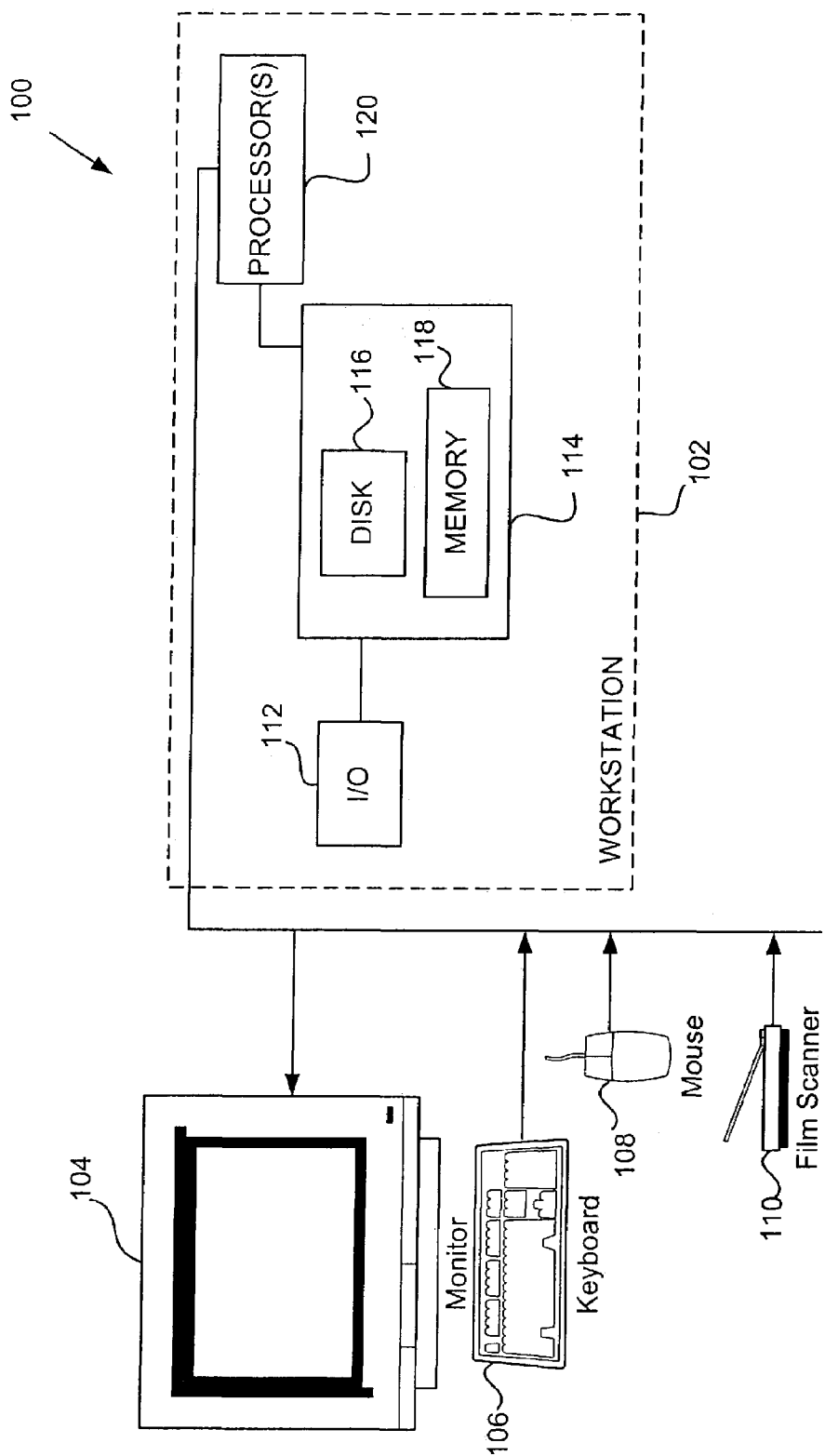
FIG. 1 shows an exemplary hardware/software environment in which a system and process according to embodiments of the invention may be employed.

In the following description of embodiments of the invention, reference is made to the accompanying drawings which form a part hereof, and in which is shown by way of illustration specific embodiments in which the invention may be practiced. It is to be understood that other embodiments may be utilized and structural changes may be made without departing from the scope of embodiments of the present invention.

As discussed above, the present invention relates generally to a system and process for digital generation, placement, animation and display of surface-attached geometric objects for computer generated imagery. Embodiments of the invention may be employed in various applications, including, but not limited to, television special effects, video game development, educational applications, interactive applications, and computer aided design applications (for example, architectural design). In one embodiment, a system and process for digital generation, placement, animation and display of surface-attached geometric objects for computer generated imagery is configured for a film industry visual effects environment. However, other embodiments may be employed in other video or computer graphics environments.

Embodiments of the present invention address the need for a system and process for practically, flexibly, robustly, efficiently and easily generating, placing and displaying realistic computer generated surface-attached geometric objects, such as, but not limited to, feathers, hair, leaves, grass, scales and/or other geometric objects. A system and process according to embodiments of the invention advantageously implements a graphics pipeline that treats identically various types of surface-attached geometric objects. The graphics pipeline is openly implemented such that it may be easily modified to generate, place and display additional surface-attached geometric objects that may be added in the future. The graphics pipeline is flexible enough that instanced surface-attached geometric objects of one type may be changed to a different type at render time. In addition, any instanced surface-attached geometric object may also be turned on or off at render time.

According to embodiments of the present invention, most software components of the graphics pipeline are implemented in a modular and object-oriented fashion so that pieces and libraries can be shared and used by different components in the graphics pipeline. For example, in one embodiment, a Maya plugin is used in an animation section of the graphics pipeline and RenderMan DSO is used in a rendering section of the graphics pipeline. Both the RenderMan DSO and Maya plugin may use common libraries to generate a surface-attached geometric object primitive from the high level attributes. In the RenderMan DSO, the surface-attached geometric object primitive code is used to "render" a surface-attached geometric object, in the Maya plugin it is used to "model" a surface-attached geometric object.

A system and process for digital generation, placement, animation and display of surface-attached geometric objects, according to embodiments of the present invention, may be used with various types of hardware/software combinations. FIG. 1 illustrates an exemplary hardware/software environment wherein, according to one embodiment, the system and process of the present invention may be employed.

The system 100 may include a computer workstation 102, a computer monitor 104, and input devices such as a keyboard 106, mouse 108, and film scanner 110. The workstation 102 may also include input/output interfaces 112, storage 114, such as a disk 116 and random access memory (RAM) 118, as well as one or more processors 120. The workstation 102 may be a computer graphics workstation such as the IRIX workstation sold by Silicon Graphics, Inc., a Windows NT-type workstation or other suitable computer or computers. The computer monitor 104, keyboard 106, mouse 108, film scanner 110, as well as other input devices such as, but not limited to, video tape recorders, cameras, and hardware accelerators (not shown) may be used to interact with various software elements of the system residing in the memory of the workstation 102 to cause media editing, compositing and mixing processes to be performed on media. The system 100 in FIG. 1 is shown by way of illustration and not limitation. Other systems may be used to implement embodiments of the invention.

System and device functions and processes described herein may be implemented with machine-executable instructions. Software comprising these instructions may be used to program and cause general-purpose or special-purpose processors to perform the functions and processes described herein. Alternatively, such functions and processes may be implemented by firmware, hardware comprising hardwired logic, or by any combination thereof.

Figure 2:
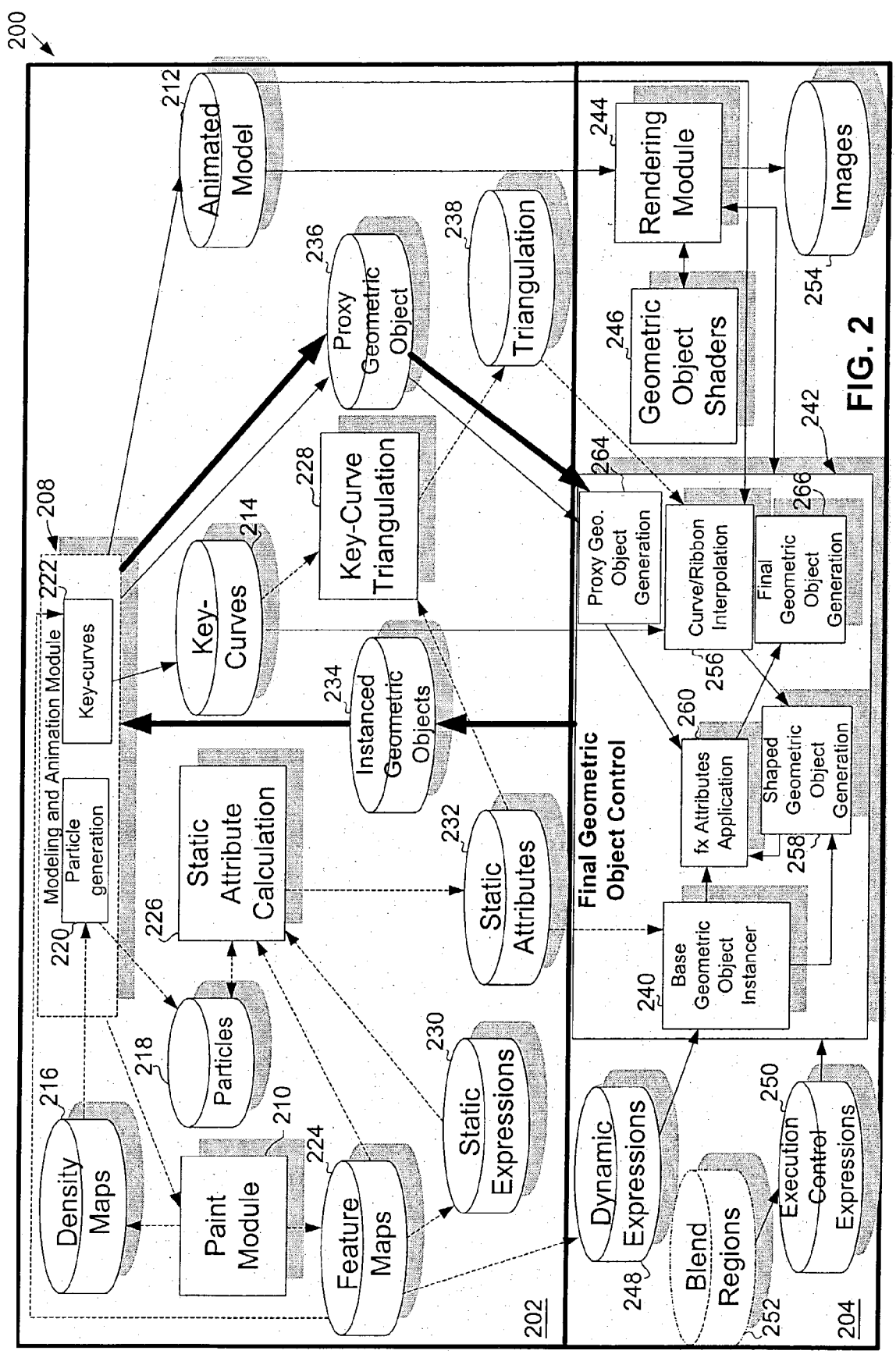
FIG. 2 shows a simplified block diagram illustrating a graphics pipeline for digital generation, placement, animation and display of surface-attached geometric objects, according to an embodiment of the invention.

FIG. 2 shows a simplified block diagram illustrating graphics pipeline 200 for digital generation, placement, animation and display of surface-attached geometric objects, according to an embodiment of the invention. Graphics pipeline 200 can be broadly divided into a modeling and animation section 202 and a rendering section 204. FIG. 2 illustrates an overview of the relationship between the two sections. In FIG. 2, rectangular blocks with solid lines represent proprietary modules, and rectangular blocks with broken lines represent commercial software. Furthermore, thin solid line arrows within FIG. 2 represent data that is generated per frame and thin broken line arrows represent data that is generated in a frame independent manner. Finally, thick solid line arrows represent an editing loop, also referred to as a "tweak loop." Each of the two sections of graphics pipeline 200, as well as the relationship between the two sections, will be discussed in detail below.

As shown in FIG. 2, according to embodiments of the present invention, modeling and animation section 202 comprises modeling and animation module 208, which may be a digital modeling and animation software package such as, but not limited to, Maya, 3-D Studio Max, or Softimage. Modeling and animation section 202 further comprises a paint module 210, which may be a digital painting application such as, but not limited to, StudioPaint, Matador or Photoshop. "Painting" is the process of manually adjusting or replacing individual pixels in an image or texture map. Modeling and animation section 202 further comprises animated model 212, key-curves data files 214, density maps data files 216, particles data files 218, feature maps data files 224, static attribute calculation module 226, key-curve triangulation module 228, along with static expressions data files 230, static attributes data files 232, proxy geometric object data files 236, triangulation data files 238, and, in some embodiments, instanced geometric objects data file 234. All of these data files may be stored, for example, in storage 114 of system 100.

According to embodiments of the present invention, modeling and animation module 208 comprises multiple software modules in the form of Maya embedded language ("MEL") code and C++ plug-ins with which embodiments of the present invention are implemented. As shown in FIG. 2, in one embodiment modeling and animation module 208 may include sub-modules such as, but not limited to, a particle generation sub-module 220 and a key-curves sub-module 222. The operation of these two modules according to embodiments of the present invention will be described below.

Figure 3:
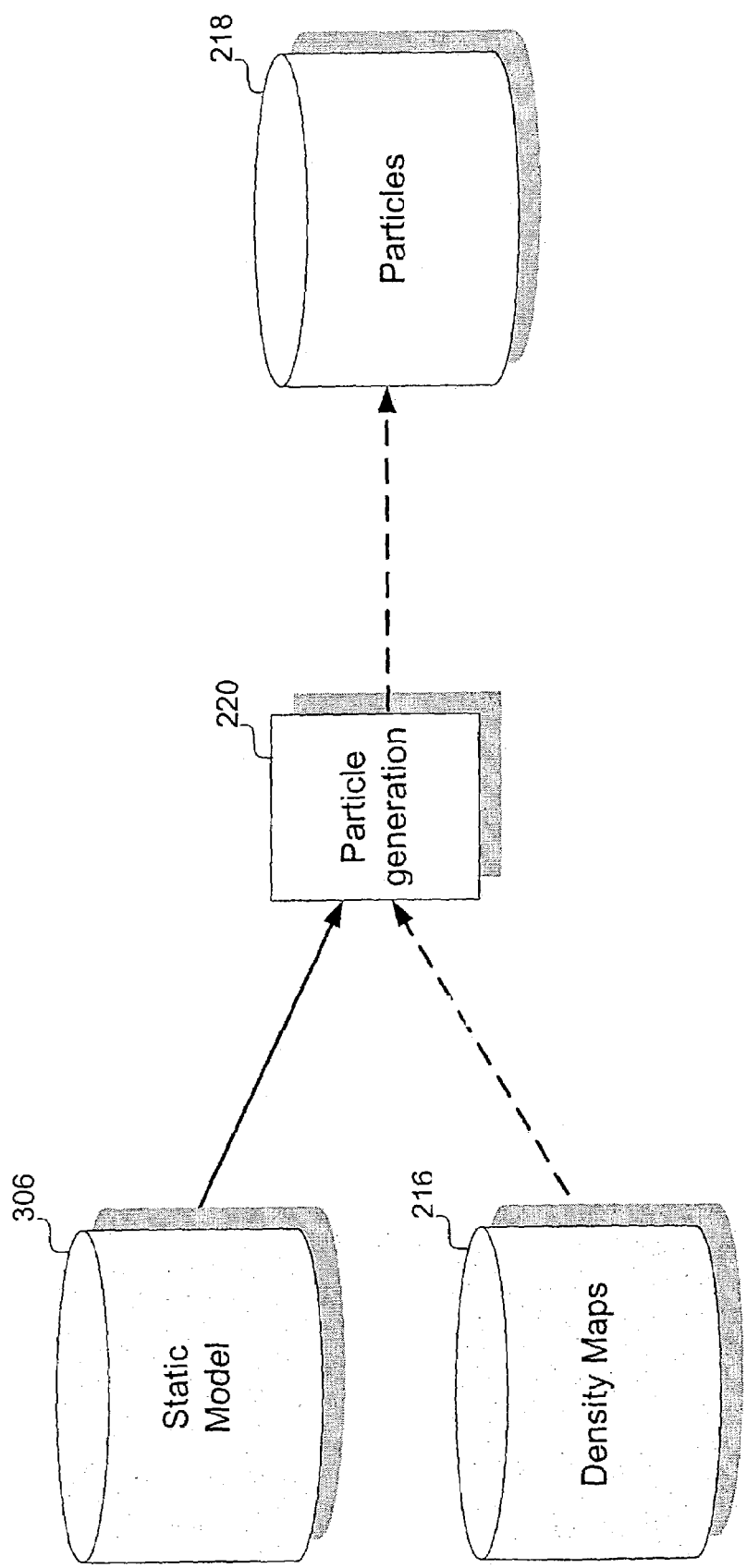
FIG. 3 shows a block diagram illustrating the particle generation sub-module and particles data files of the graphics pipeline of FIG. 2, along with a static model data file and density maps data files, according to embodiments of the present invention.

FIG. 3 shows a block diagram illustrating the particle generation sub-module 220 and particles data files 218 of FIG. 2, along with a static model data file 306 and density maps data files 216, according to embodiments of the present invention. As illustrated by the flow diagram of FIG. 4 and as shown in FIG. 3, at S402 a static model and density maps are input to particle generation sub-module 220 from the static model data file 306 and density maps data files 216, respectively. The static model may define the geometry of the surfaces that will contain the particles. The surfaces may correspond to, for example, the skin of an animal model. Particles are defined herein as points on the surfaces where feathers, hair or other geometric objects are attached. In one embodiment, a three-dimensional geometry may be used to model the skin, for example an animal skin, on which the particles are placed. The density maps are one type of feature map and indicate relative density of the resulting particle locations.

According to one embodiment of the present invention, the static modeling process is performed outside of graphics pipeline 200 and the completed static model is provided as an input to the graphics pipeline 200. In one embodiment, the geometry of the static model may be defined as a connected set of parametric surfaces often referred to as "patches." The patches can be generated in a number of ways known to one skilled in the art. In one embodiment, non-uniform rational B-spline ("NURBS") patches are used. However, embodiments of the present invention may be employed with any suitable model surface. A model, depending on its type, may have multiple patches. For example, a model of a bird or mouse may be made up of many patches. An example of a surface patch 800 is shown in FIGS. 8A and 8B.

Figure 4:
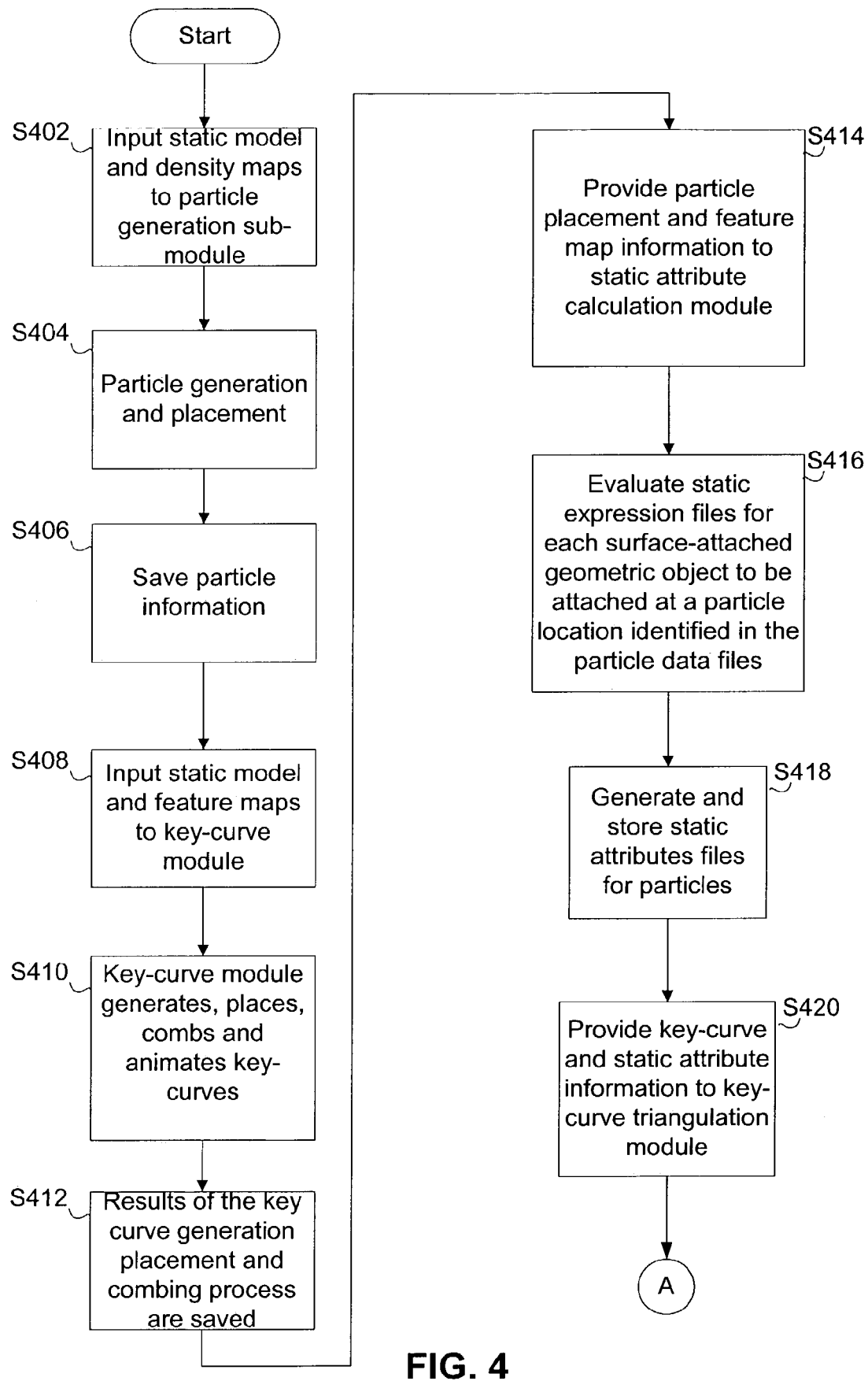
FIGS. 4, 5, 6 and 7 show a flow diagram of a process for digital generation, placement, animation and display of surface-attached geometric objects, according to embodiments of the present invention.

Referring again to FIG. 3, the particle generation sub-module 220 receives the static model and generates and places particles on the surfaces of the static model (S404 in FIG. 4). According to embodiments of the present invention, the particle generation sub-module 220 may be used to place particles in both a manual mode and an automatic mode. The manual mode of particle placement allows placement of particles on the surfaces in various ways. For example, particles may be manually placed in a grid. Alternatively or additionally, particles may be manually placed along a line or at a particular point designated by a parametric (u,v) coordinate system of a surface patch.

According to one embodiment of the automatic mode of particle placement, a determination is made of the density of the surface-attached geometric objects on the static model. For example, in the case of a bird, the density of a feather coat is determined. Alternatively, in the case of a mouse or other furry animal, the density of a fur coat is determined. From this density determination an algorithm is used to calculate how many feathers, hairs, leaves, grass, scales and/or other surface-attached geometric objects are placed on each surface patch.

According to embodiments of the present invention, the algorithm combines a user-specified global density value with density maps and/or on-off maps to calculate the number and position of particles on the surface patch. By taking the area of each surface patch into account, the algorithm achieves a balanced placement of particles across surface patches of different sizes. The algorithm subdivides each surface patch into N×M sub-patches, where N+1×M+1 is the resolution of the density map. The algorithm determines the number of particles to place in each sub-patch by, for example, averaging the density map values at each sub-patch vertex, and multiplying by the global density value. The result of the first multiplication is then multiplied by the area of each sub-patch. The result of the second multiplication yields the number of particles to place in each sub-patch. The positions of the particles in each sub-patch are then defined by uniformly distributed pseudo-random numbers between the minimum and maximum bounds.

In cases where there are only a few particles which must cover the whole surface patch (for example, in surface patches of the static model of a bird that contain only a small amount of feathers), the particles may not be equally distributed using the above-described algorithm. Thus, large uncovered areas of skin appear next to areas with many adjacent particles. Also, parts of a bird which contain larger feathers may have a proportionally smaller density. Thus, an alternate technique is required under these circumstances.

To address these cases, in an alternate technique of automatic particle placement according to embodiments of the present invention, a particle repulsion algorithm is adapted to support both models composed of connected surfaces and feature maps including density maps indicating relative density of the resulting particle locations. There is one density map for each surface patch. All the density maps are read by the algorithm and the particle repulsion is carried out by the algorithm. Thus, different densities may be designated for different surface patches, i.e., different regions of the static model.

Figure 9:
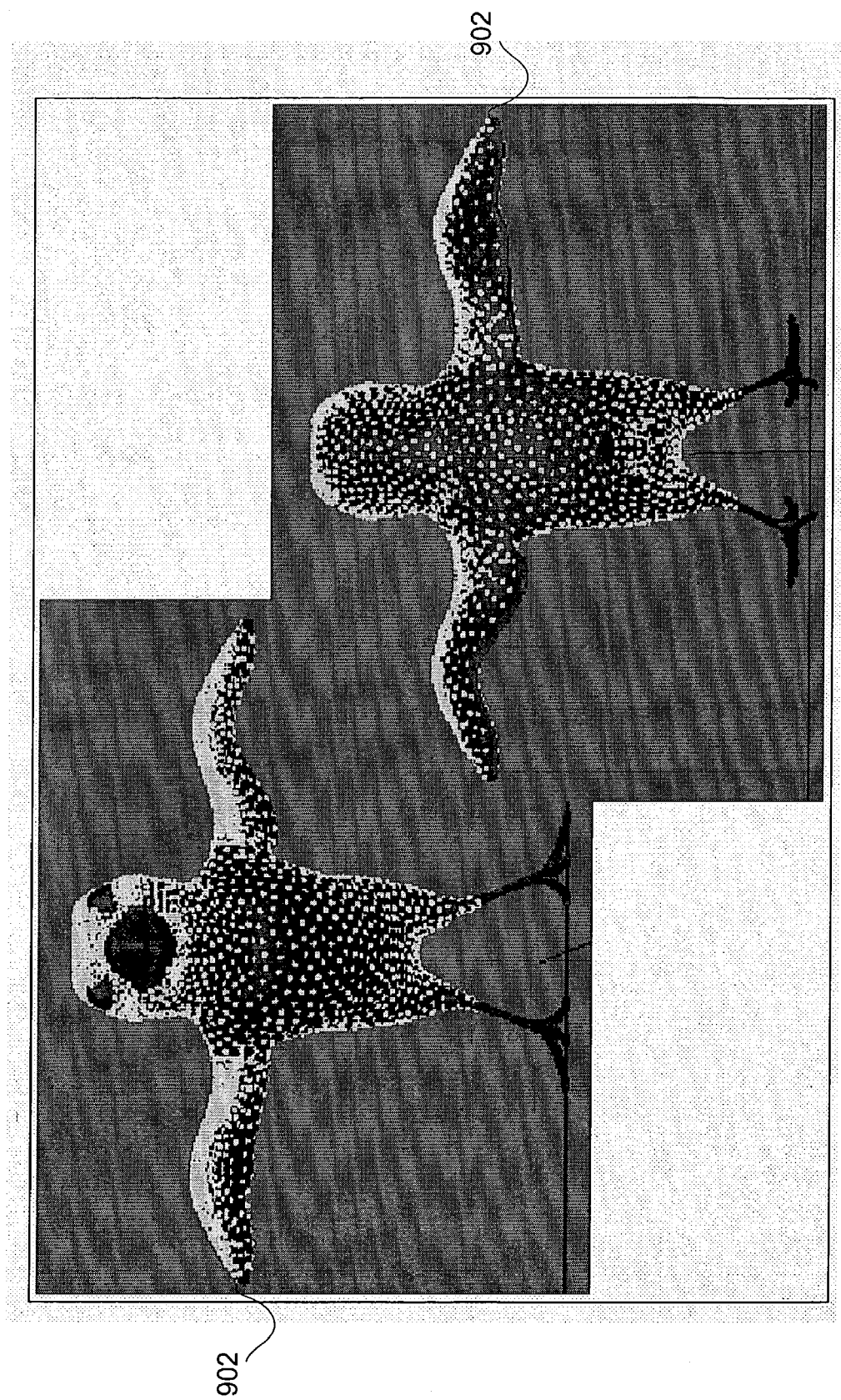
FIG. 9 shows front and back views of a static model of a bird after automatic placement of particles on surfaces of the model, according to embodiments of the present invention.

Particle locations are modeled as particles which are "injected" at a fixed location on the model's surfaces, for example on a character's skin. The particles then flow over the surface until a desired level of equilibrium is achieved. The particle positions are recorded as the (u, v) locations of each of the final feathers, hairs, leaves, grass, scales and/or other surface-attached geometric objects. FIG. 9 illustrates the results of this technique. FIG. 9 shows front and back views of a static model of a bird after automatic placement of particles 902 on the model's surfaces. The results of the particle repulsion technique may be merged with the high-density area technique described above. Final adjustments may be made using a manual particle placement tool in particle generation sub-module 220. For example, after execution of automatic particle repulsion, it may be seen that certain areas need manual placement. Particles may be added, moved and deleted manually. Thus, the automatic and manual particle placement techniques may be combined in some embodiments.

At S406 (FIG. 4), information about particles may be saved. In one embodiment, there is one particle data file 218 per surface patch.

Paint module 210 (FIG. 2) receives the static model as an input and may generate feature maps that then may be stored in feature maps data files 224. These feature maps describe various features and/or attributes of the surface-attached geometric objects, such as, but not limited to, shape attributes. For example, feature maps may define the length and width of the surface-attached geometric objects. Paint module 210 may also generate density maps.

According to embodiments of the present invention, graphics pipeline 200 includes a procedural feather modeler that can generate a large variety of feathers from high level shape and effects attributes. Feathers have a simple basic geometry. A feather consists of three main sections: a shaft or quill, a left vane and a right vane. Although the shaft is essentially a cylindrical tube with varying radius along its length, the vanes may have abrupt curvature changes and may contain splits. The vanes may be populated by down hairs. These properties make the geometric structure of the vanes much more complex.

According to embodiments of the present invention, a feather's geometry is modeled to include a single surface for the shaft, and a set of four boundary curves for each of the left and right vanes. The curves are used to construct the surfaces for the left and right vanes. Embodiments of the present invention provide a set of high-level, user-controllable attributes which are mapped to specific feather geometries. Some of these attributes directly affect the shape of the curves, such as leftVaneWidth, rightVaneBegin (how far up the shaft the vane starts), or vaneTipWidth. Other attributes such as vaneCurvature modify the surfaces of the vanes directly. Still other attributes, such as scale, affect the whole feather.

Figure 10:
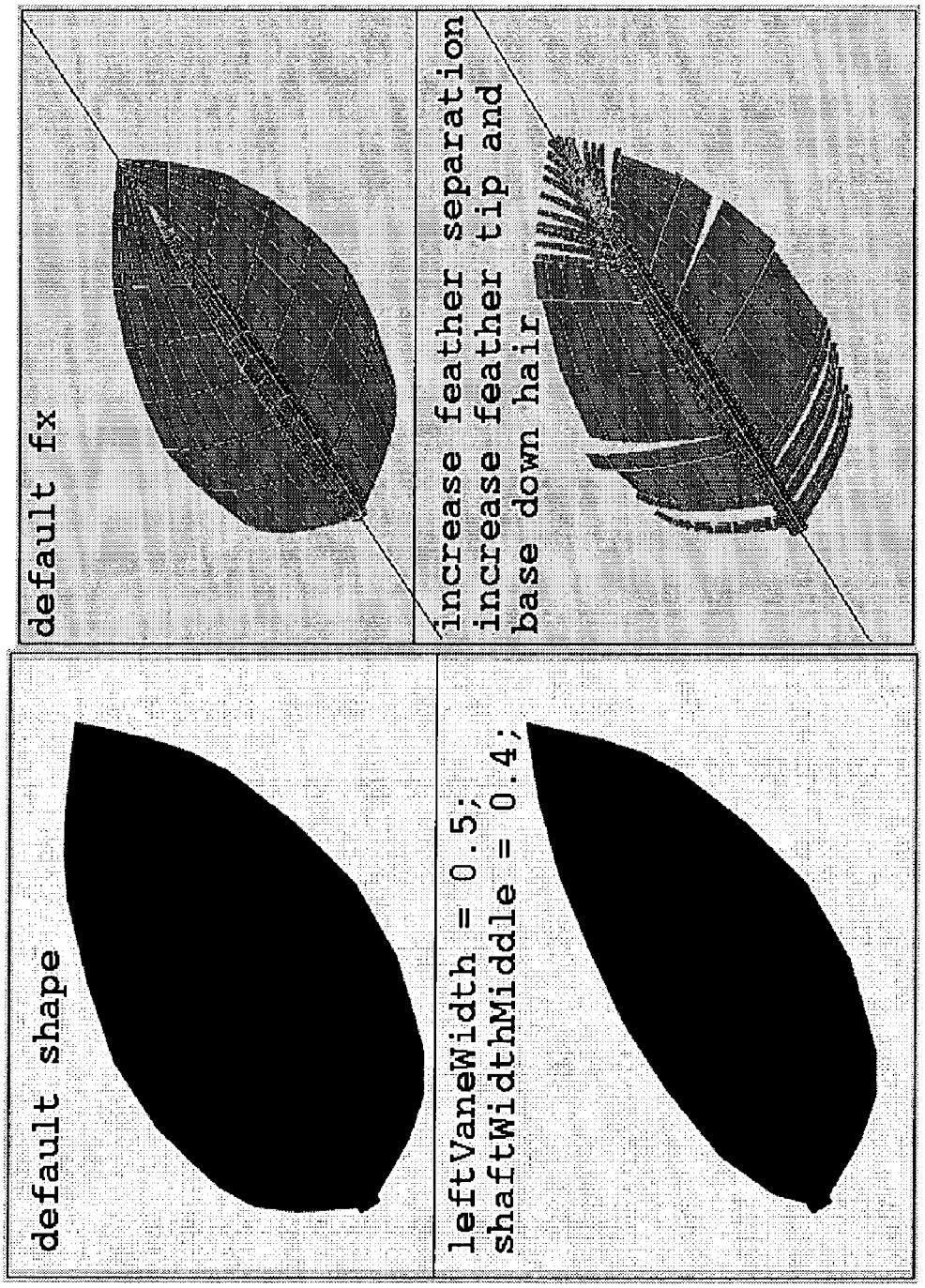
FIG. 10 shows examples of shape attributes and fx attributes of a feather, according to embodiments of the present invention.

In one embodiment, graphics pipeline 200 includes a procedural feather modeling system. Multiple high-level attributes in the procedural feather modeling system may be used to describe the geometry of a feather. The multiple high-level attributes may include multiple feather attributes, some of which are shape attributes. The shape-attributes modify the geometry of the three basic sections of a feather (one patch each for shaft, left and right vane) or the geometry of the curves and may include, but are not limited to, length of the feather and width of the feather. Examples of shape-attributes, according to embodiments of the present invention, are shown to the left of FIG. 10. The multiple high-level attributes may further include multiple special fx attributes. The fx-attributes actually change the topology of the surface patches for the vanes by splitting them into several patches or by adding curves. The fx-attributes may include, but are not limited to, the number of splits in a feather. Examples of fx-attributes are illustrated on the right of FIG. 10. An exemplary listing of shape attributes and fx attributes used in one embodiment of the present invention is shown below in Example Listing A.

In one embodiment, each of the attributes has a default value. However, these default values may be changed by the user. This is accomplished through the use of expression files. Thus, rather than hard-code a value for the attributes, embodiments of the present invention may describe each attribute in an expression file.

Figure 11:
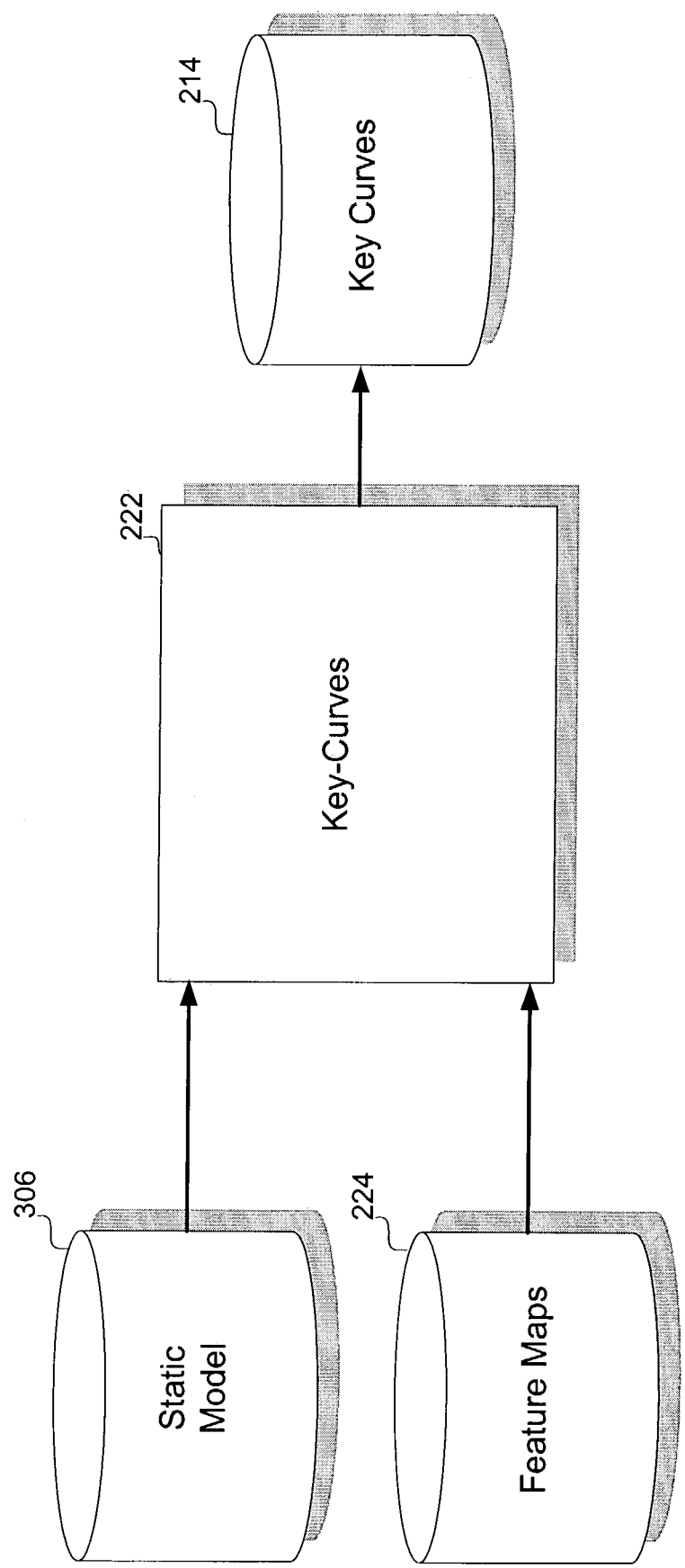
FIG. 11 shows a block diagram of the key-curves sub-module, feature maps data files and static key-curves data files of FIG. 2, along with a static model data file, according to embodiments of the present invention.

FIG. 11 shows a block diagram of the key-curves sub-module 222, feature maps data files 224 and key-curves data files 214 of FIG. 2, along with static model data file 306, according to embodiments of the present invention. As illustrated by the flow diagram of FIG. 4 and as shown in FIG. 11, at S408 key-curves sub-module 222 receives as an input the static model from the static model data file 306. Key-curves sub-module 222 also receives as an input feature map information from feature maps data files 224. In particular, key-curves sub-module 222 may receive key-curve length information that was earlier produced in paint module 210 (FIG. 2). The length information defines how long to make the key curves. All of the feature maps, including the length maps, are done on a patch-by-patch basis. The number of key curves per patch may be adjustable by the user based on the amount of control the user desires.

According to embodiments of the present invention, at S410 key-curves sub-module 222 performs generation, placement, combing and, in some embodiments, animation of a number of key-curves on the surfaces (skin) of the static model. The surface-attached geometric objects, for example feathers and/or hair, are later interpolated from these key-curves, as discussed below.

As was the case with the particle generation sub-module 220 discussed above, various algorithms allow for both manual and automatic placement of key-curves. For example, key-curves may be manually placed in a grid (equally-spaced in (u, v) or in arc-length). Alternatively or additionally, key-curves may be automatically and randomly placed across multiple surface patches based on patch area. Special care is taken that key-curves on patch boundaries are aligned so that the final feather/hair coat does not exhibit any discontinuities across surface patches.

According to embodiments of the present invention, two combing techniques may be used to change the orientation and shape of key-curves once placed: curve combing and chain combing. The curve combing technique may be used, for example, in combing the reference pose of a model. The chain combing technique may be used, for example, for quick combing adjustments and animation in specific shots of a movie.

In curve combing, one or more combing direction curves are defined and assigned to a set of key-curves. These selected key-curves then orient themselves towards the combing direction curves depending on the amount of bend, twist and curvature, as well as the distance from the direction curve. A twist of a curve may be defined as a rotation of the curve about a central axis of the curve. A bend of a curve may be defined as a curvature of a central axis of the curve. Values for these attributes are specified via menus and can also be key-framed. The combing tool also provides a simple curve/surface collision mode, in which key-curves that intersect the underlying surface patches are pushed back up. Curve combing techniques are discussed in two co-pending published U.S. utility patent applications entitled "Method and apparatus for the digital creation of fur effects," Ser. No. 09/370,104, filed Aug. 6, 1999 and Ser. No. 10/052,068, filed Jan. 16, 2002, which are hereby incorporated by reference in their entirety.

Figure 12:
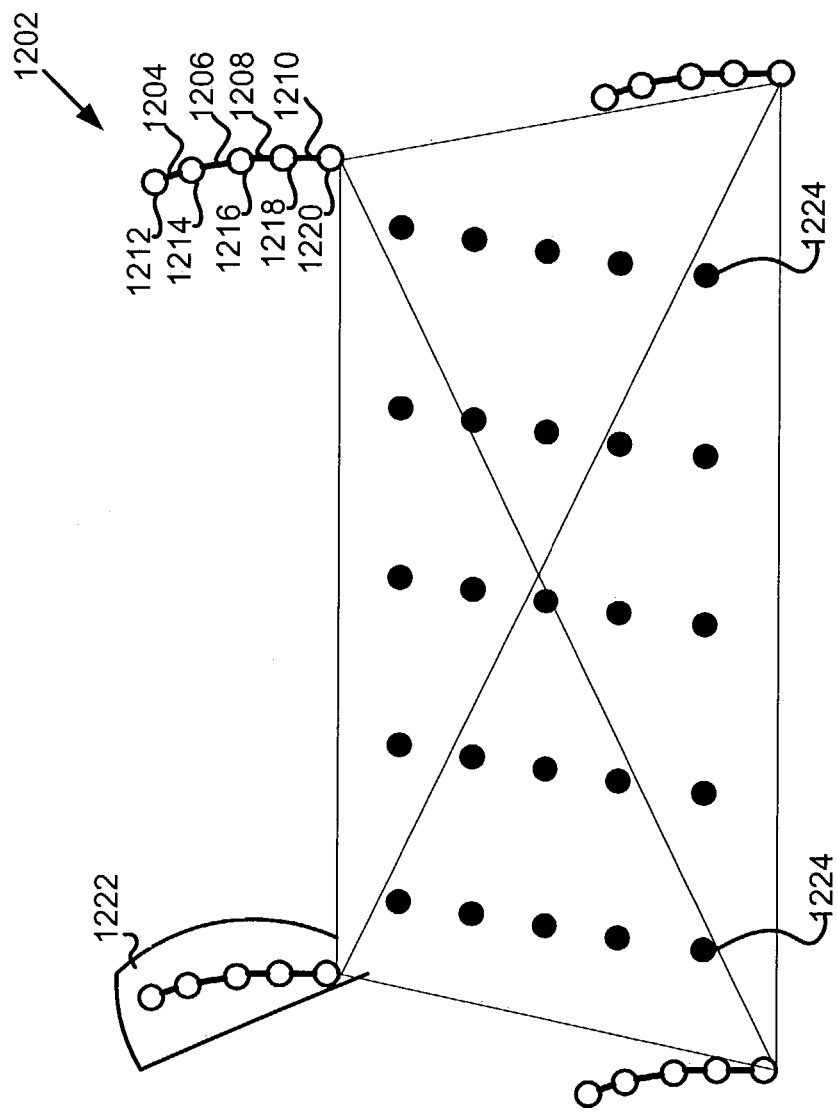
FIG. 12 shows a chain combing process, according to embodiments of the present invention.

Referring to FIG. 12, a chain combing process according to embodiments of the present invention is shown. Chain combing is a direct manipulation technique in which an articulated chain is defined over a key-curve 1202, where the chain has n-1 segments (for example, segments 1204, 1206, 1208 and 1210) for n control points of the key-curve (for example, control points 1212, 1214, 1216, 1218 and 1220). Individual chains may be defined for individual key-curves. As the chain is deformed via forward or inverse kinematics, the underlying key-curve changes accordingly. Additional key-curves can be assigned to the same chain. In some embodiments, the additional key-curves change along with the underlying key-curve. Thus, the key-curves may be defined such that all the key-curves will follow one chain curve that is dragged in a particular direction. The chain combing technique allows key-curves to be manipulated, moved and bent according to the user's preference. The more control points there are per key-curve, the more flexibility the user has in adjusting the key-curve. In addition, key-curves or their chains can be animated via key-framing.

These key-curves may also include a ribbon to simulate, for example, the two dimensional character of a feather twisting. Thus, two-dimensional ribbons may be defined over the one-dimensional key-curves if twists are desired. The ribbon may be just a flat patch. Rotation can be added to the patch to make it curve, twist and/or bend in order to simulate, for example, the twisting of a feather. A twist of a ribbon may be defined as a rotation of the ribbon about a central axis of the ribbon. A bend of a ribbon may be defined as a curvature of a central axis of the ribbon. The user may use the various control points to twist this two-dimensional ribbon and adjust it as desired.

FIGS. 8A and 8B show examples of key-curves and ribbons placed and combed on a surface patch, from two different viewing angles. FIG. 8B includes three key-curves (left and middle) and two ribbons (right). Ribbons 1222, key-curve 1202 and particles 1224 may also be seen on the surface patch in FIG. 12. As discussed above, particles 1224 are points where surface-attached geometric objects will later be interpolated from the key-curves.

At S412, the results of the key curve generation placement and combing process are saved to key-curves data files 214. In one embodiment, there is one key-curves data file per patch for the key-curves data files 214. Thus, for example, if there are 30 surface patches, there will also be 30 key-curves data files.

In addition, the animated model is translated into rendering files 212 suitable for a rendering module and these rendering files are stored. These rendering files are passed to rendering module 244 and will later be used at render time.

Static attribute calculation module 226 may determine the static attributes of feathers, hairs, leaves, grass, scales and/or other surface-attached geometric objects. A static attribute does not change from frame to frame. In contrast, a dynamic attribute is determined at render-time and may be time-dependent. Some examples of static attributes might include, but are not limited to, the length or color of the surface-attached geometric objects. Examples of dynamic attributes, which are calculated for each frame by the final geometric object control module 242 of rendering section 204, might include, but are not limited to, twist and final orientation of the surface-attached geometric objects.

According to embodiments of the present invention, graphics pipeline 200 enables a user to redefine or modify static attributes at render time by including them in static expressions and dynamic expressions. As an example, the length of a feather or other surface-attached geometric object may first be set in a static expression via a feature map lookup, then changed in a dynamic expression by adding some random variation to somewhat break up the "groomed" look. In addition, the type of an instanced surface-attached geometric object may be changed at render time. Thus, the surface-attached geometric object might first be statically designated as a feather, but may later be changed to a hair by means of a dynamic expression. Dynamic expressions will be discussed in detail below. Exemplary static and dynamic expression files are shown below in Example Listings B and C, respectively.

Figure 13:
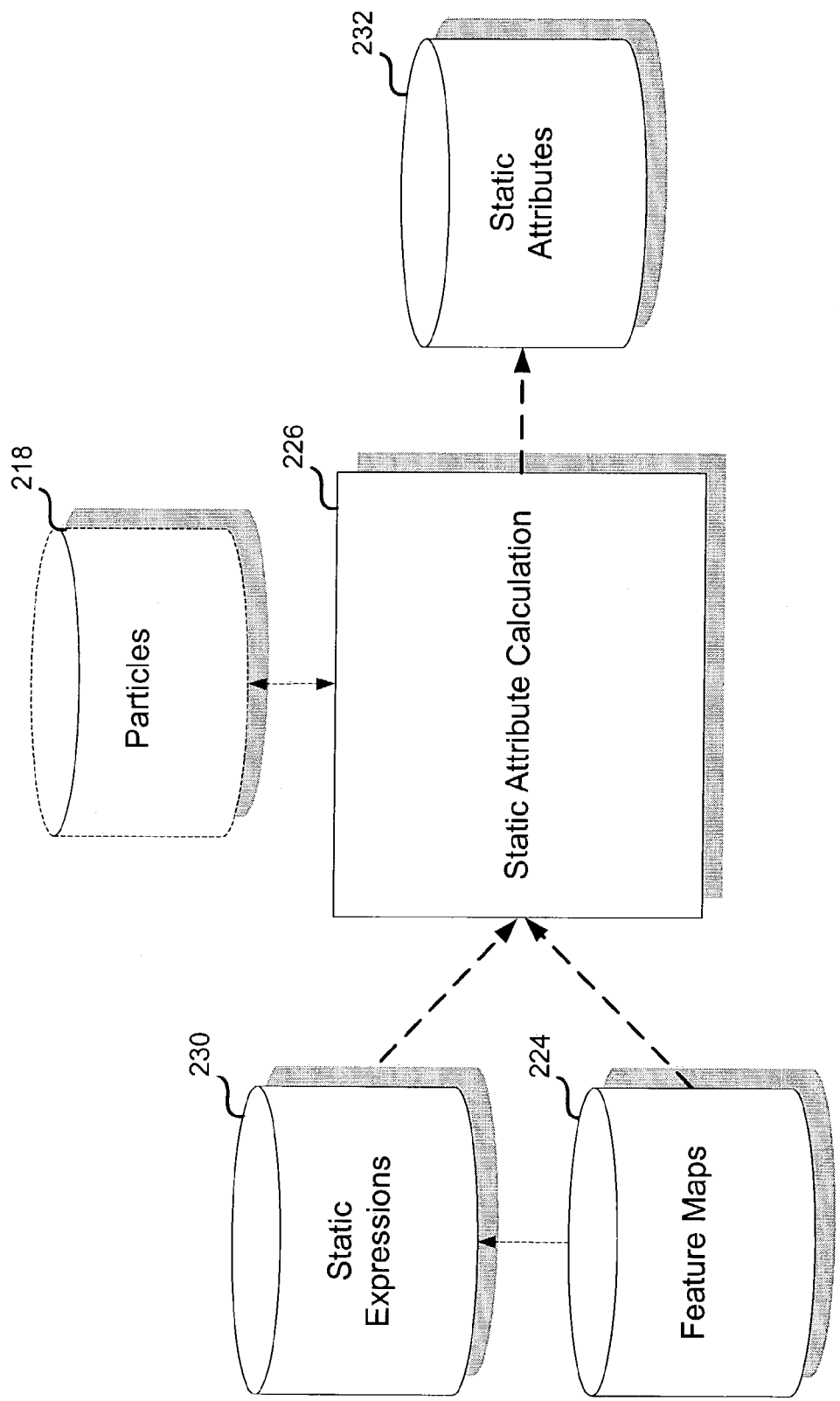
FIG. 13 shows a block diagram of the static attribute calculation module, static expressions data files, feature maps data files, particles data files and static attributes data files of FIG. 2, according to embodiments of the present invention.

FIG. 13 shows a block diagram of the static attribute calculation module 226, static expressions data files 230, feature maps data files 224, particles data files 218 and static attributes data files 232 of FIG. 2, according to embodiments of the present invention. As illustrated by the flow diagram of FIG. 4 and as shown in FIG. 13, at S414 static attribute calculation module 226 receives inputs from static expressions data files 230, feature maps data files 224 and from particles data files 218. Particles data files 218 provide particle placement information (the location of particles in a (u, v) format) to static attribute calculation module 226. Feature maps data files 224 provide definitions of additional attributes for the particles to static attribute calculation module 226. The static expressions data files 230 may contain time-invariant expressions which specify feather attributes such as, but not limited to, default length or default laydown angle.

Figure 14:
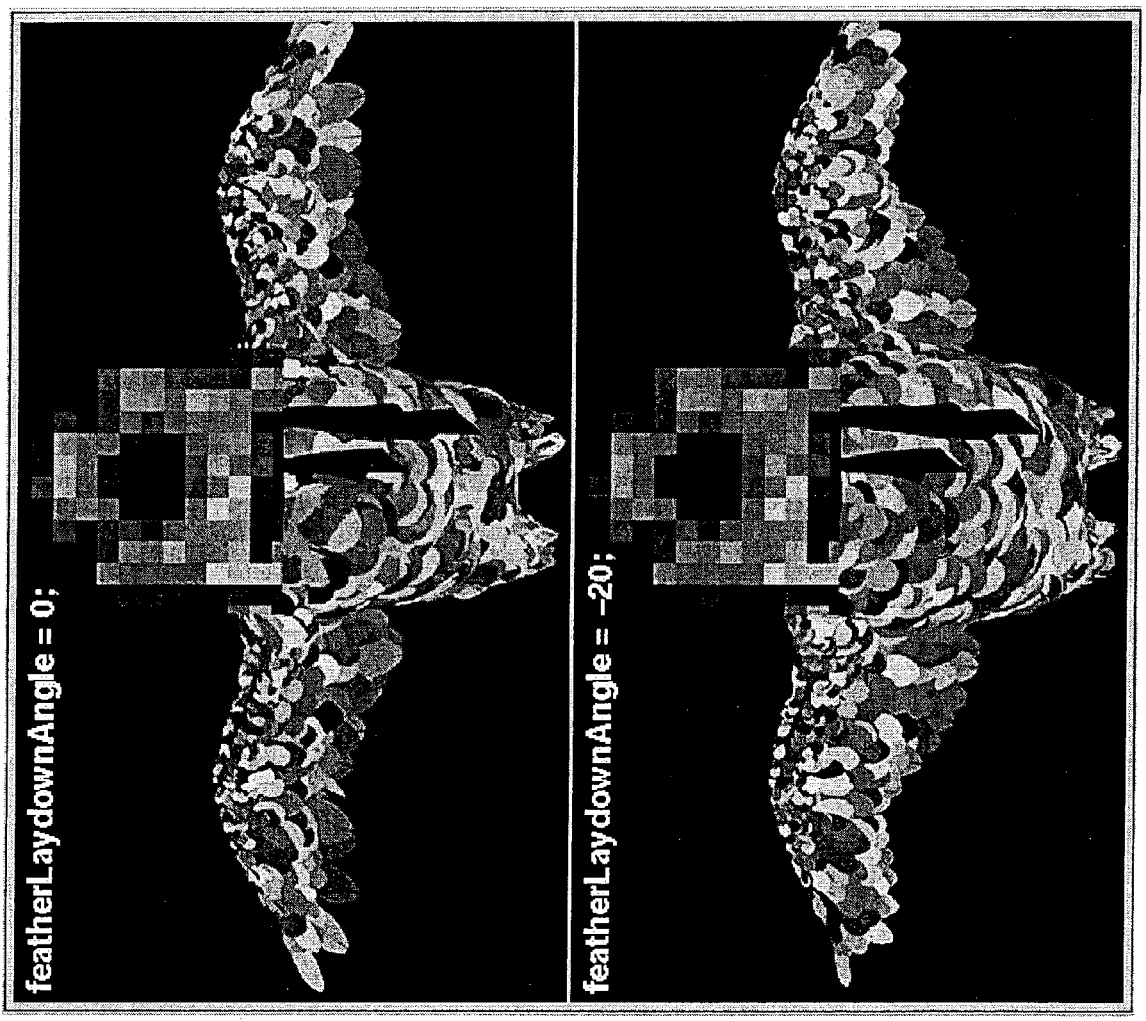
FIG. 14 shows two frames depicting a bird, illustrating results of a static expression defining a laydown angle attribute, according to embodiments of the present invention.

Examples of simple static expressions defining the laydown angle attribute for feathers on a bird are shown in FIG. 14. FIG. 14 shows two frames depicting the bird. In the first frame, a static expression defines the laydown angle attribute as 0 degrees. Thus, there is no laydown angle applied to the feathers in the first frame. In the second frame a static expression defines the laydown angle as −20 degrees. Thus, there is a laydown angle attribute of −20 degrees applied to the feathers in the second frame.

The static attribute calculation module 226 uses expressions to calculate attributes. The expressions may specify that the static attribute calculation module 226 look up the value of an attribute in the feature maps.

At S416, the static attribute calculation module 226 evaluates the static expression files for each surface-attached geometric object to be attached at a particle location identified in the particles data files 218. So a particle, then, is identified at a (u, v) location and the static expression is evaluated and, for example, a length and a width is determined for the surface-attached geometric object to be placed at a particular particle at that particular (u, v) location. This process is performed for each particle in a particular particle data file. Once the process is complete for the particular particle data file, it is repeated for the remaining particle data files.

The static attribute calculation module 226 evaluates all of this information and, at S418, generates static attributes files for each surface-attached geometric object to be attached at a particle location. One static attributes file is generated for each surface patch. The static attributes files are then stored in the static attributes data files 232. In one embodiment, a unique identifier for each particle is included in the static attribute files. The static attributes files may be later used by the final geometric object control module 242 of rendering section 204 of graphics pipeline 200 to assign static attributes to the surface-attached geometric objects that will be attached to the particles.

Thus, according to embodiments of the present invention, expression files are definitions of attributes and other temporary variables. The expression files allow a programmable way of modifying the surface-attached geometric objects to have a particular look.

Figure 15:
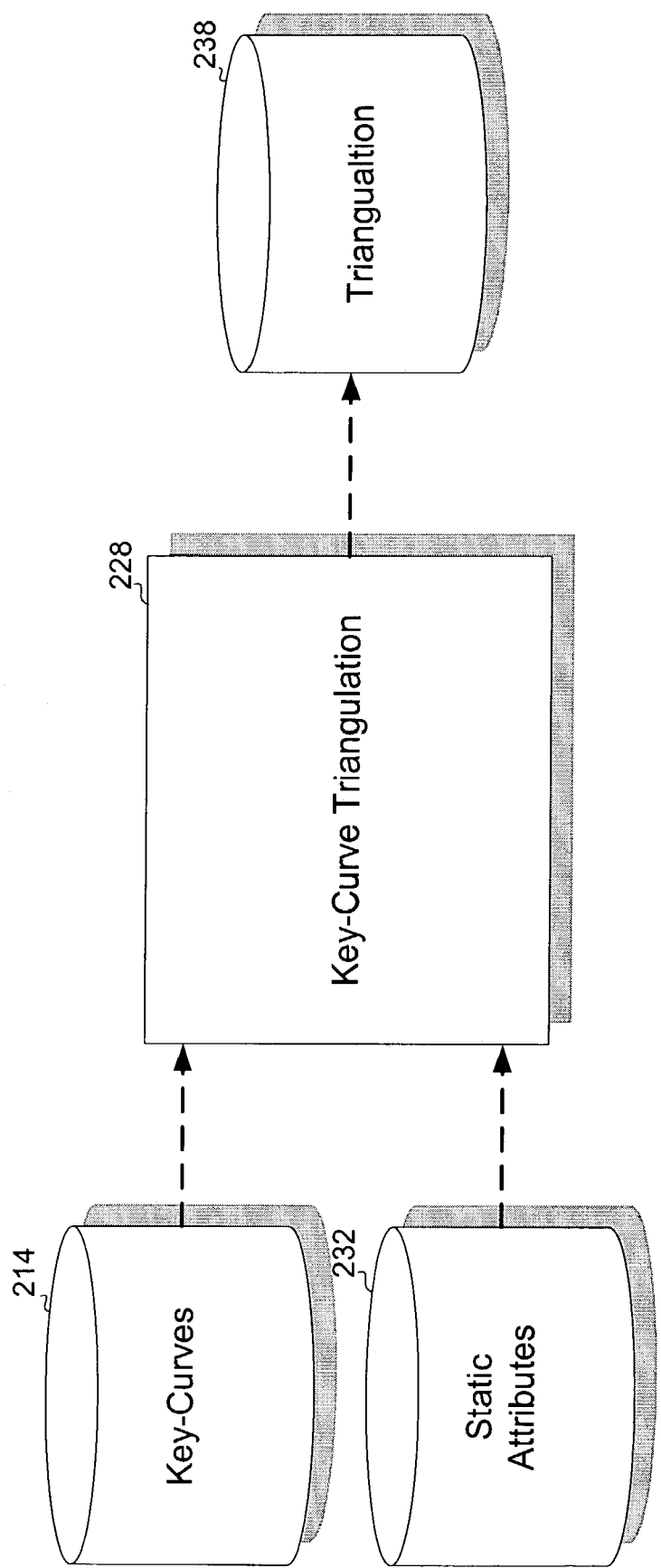
FIG. 15 shows a block diagram of the key-curve triangulation module, static key-curves data files, static attributes data files and triangulation data files of FIG. 2, according to embodiments of the present invention.

FIG. 15 shows a block diagram of the key-curve triangulation module 228, key-curves data files 214, static attributes data files 232 and triangulation data files 238 of FIG. 2, according to embodiments of the present invention. As illustrated by the flow diagram of FIG. 4 and as shown in FIG. 15, at S420 key-curves data files 214 and static attributes data files 232 provide to key-curve triangulation module 228 the key-curve and static attribute information that was generated in modeling and animation section 202.

According to embodiments of the present invention, at S422 (FIG. 5) key-curve triangulation module 228 may determine three key-curves forming a triangle which encloses a number of particles. According to one embodiment, a 2D Delaunay triangulation may be constructed for this purpose from the (u, v) positions of the key-curves for each surface patch. This triangulation procedure produces "well-proportioned" triangles by minimizing the circumcircle and maximizing the triangles' minimal angles. This triangulation may be seen in FIGS. 8A and 8B as formed by the white lines. In one embodiment, a mechanism is provided to scale the (u, v) positions before the triangulation to account for non-uniform stretching of surface patches.

Figure 16:
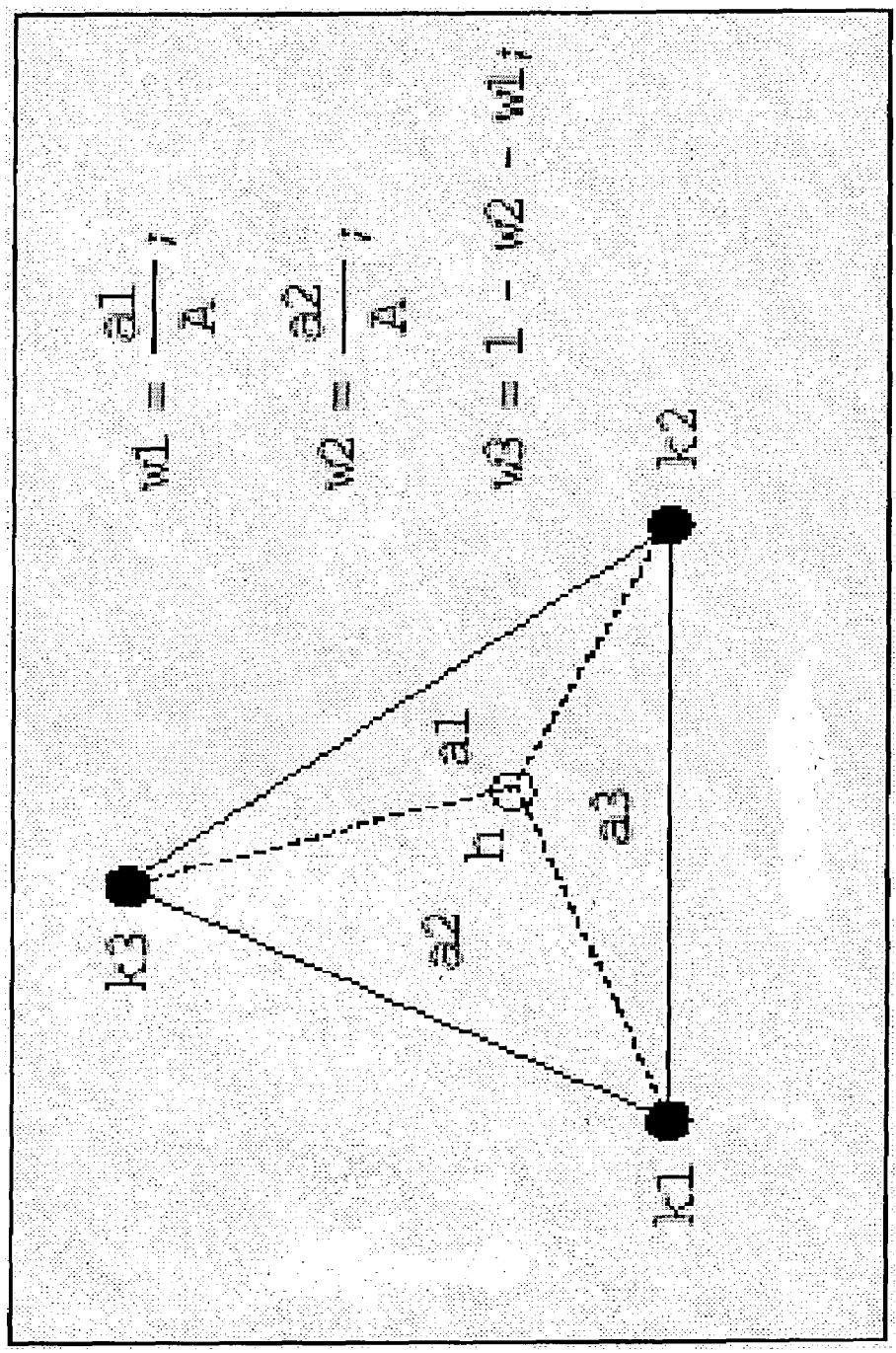
FIG. 16 shows calculations of weights of each key-curves using barycentric coordinates, according to embodiments of the present invention.

Once the triangulation is constructed, a determination is made, at S424, (in an iterative manner for, in turn, each particle) as to which triangle each particle in the static attribute file will fall into. The current particle being evaluated in the iterative process being referred to herein as the "particle of interest". In one embodiment, the unique identifier for the particle of interest, the three indices of the key-curves which form its enclosing triangle, and their weights in relation to the particle of interest (i.e., the influence that each key-curve has upon the particle of interest) are then stored, at S426, in the triangulation data files 238. As illustrated in FIG. 16, the weights (w1,w2,w3) of each key-curve (k1,k2,k3) for the particle of interest (h) are calculated using barycentric coordinates, where A is the area of triangle (k1,k2,k3).

Referring again to FIG. 2, according to embodiments of the present invention, rendering section 204 of graphics pipeline 200 comprises final geometric object control module 242, rendering module 244, geometric object shaders module 246, dynamic expressions data files 248, execution control expressions data files 250, blend regions data files 252 and images data files 254.

Figure 17:
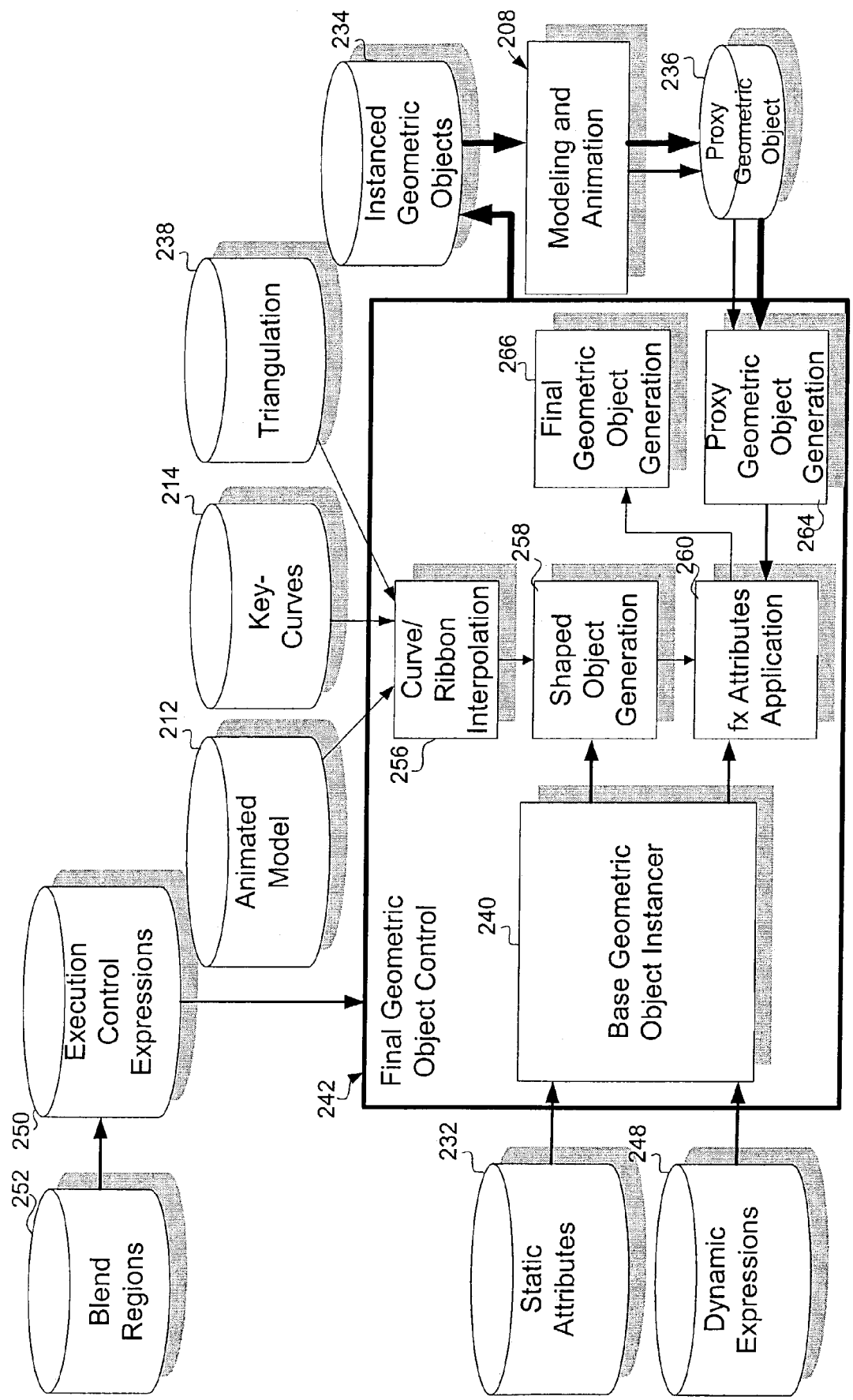
FIG. 17 shows a block diagram of the final geometric object control module, dynamic expressions data files, execution control expressions data files, blend regions data files and various other modules and data files of FIG. 2, according to embodiments of the present invention.

FIG. 17 shows a block diagram of the final geometric object control module 242, dynamic expressions data files 248, execution control expressions data files 250, and blend regions data files 252 of section 204 of FIG. 2, according to embodiments of the present invention. Also shown in FIG. 17 are the modeling and animation module 208, animated model 212, key-curves data files 214, static attributes data files 232, instanced geometric objects data file 234, proxy geometric object data files 236 and triangulation data files 238 of section 202 of FIG. 2.

Figure 5:
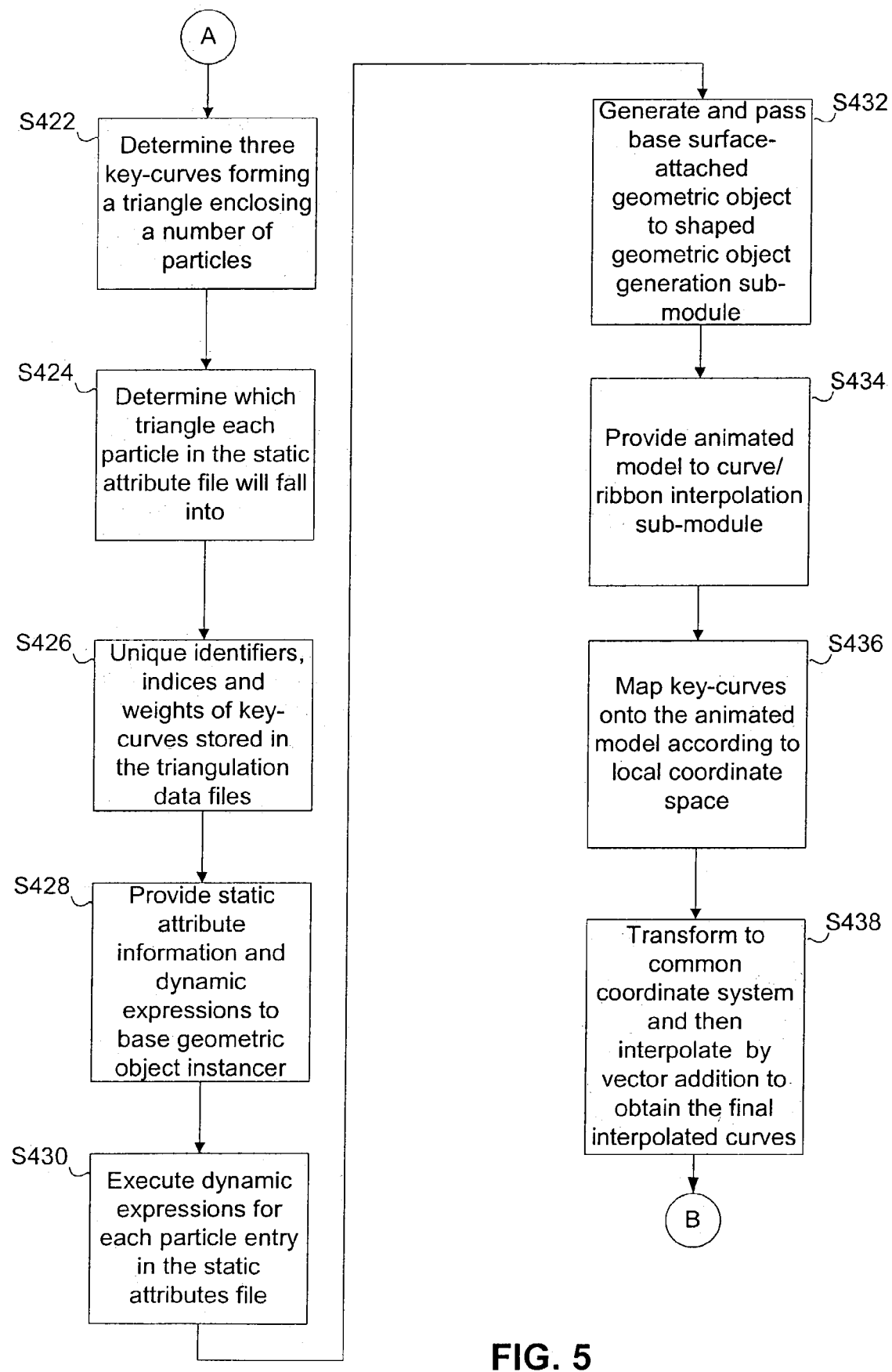

According to embodiments of the present invention, as illustrated by the flow diagram of FIG. 5 and as shown in FIG. 17, at S428 base geometric object instancer 240 receives inputs from static attributes data files 232 and dynamic expressions data files 248. Static attributes data files 232 provide to base geometric object instancer 240 the static attribute information that was generated in modeling and animation section 202. Dynamic expressions data files 248 contain dynamic expression files which allow a user to alter various attributes of the surface-attached geometric objects at render time.

According to embodiments of the present invention, using dynamic expressions the user may create a desired look without affecting the default attribute settings. As an example, the laydown angle may be modified for a certain subset of surface-attached geometric objects, such as feathers, based on their unique identifier. Dynamic expressions may also be used to turn on or off a list of surface-attached geometric objects based on their unique identifiers, for example based on a unique number assigned to each surface-attached geometric object. A user may turn off surface-attached geometric objects which do not provide a desired look during an animation. Also, a user may turn on only certain surface-attached geometric objects to render as a separate image layer for compositing. Surface-attached geometric object unique identifiers used in this manner may, for example, be placed in a surface-attached geometric object off_list or on_list data file (not shown).

Thus, at S430, for each frame the base geometric object instancer 240 loops over each particle entry in the static attributes file and executes dynamic expressions to determine the values of attributes of the surface-attached geometric objects to be attached to the particle locations. As shown in FIG. 5, at S432 the base geometric object instancer 240 generates the base geometric object based on these values of attributes.

Thus, according to embodiments of the present invention, using the inputs from the static attributes data files 232 and dynamic expressions data files 248, base geometric object instancer 240 generates curve primitives and/or patch primitives for surface-attached geometric objects such as, but not limited to, hair or feathers. For example, in one embodiment, base geometric object instancer 240 generates curve primitives for hairs and patch primitives for feathers. According to embodiments of the present invention, a hair may be instanced by using an interpolated curve directly. In contrast, a feather may be instanced by using an interpolated curve which will then be deformed. According to embodiments of the present invention where the surface-attached geometric object is a feather, a procedural feather primitive is used by the base geometric object instancer 240 to construct a reference feather as a base geometric object. As shown in FIGS. 5 and 17, at S432 the base geometric object instancer 240 may then pass the base geometric object to the shaped geometric object generation sub-module 258.

According to embodiments of the present invention, the final geometric object control module 242 may include sub-modules such as, but not limited to, the base geometric object instancer 240, a proxy geometric object generation module 264, a curve/ribbon interpolation sub-module 256, a shaped geometric object generation sub-module 258, an fx attributes application sub-module 260 and a final geometric object generation sub-module 266.

According to embodiments of the present invention, as shown in FIG. 17, the final geometric object control module 242 also receives inputs from animated model 212, key-curves data files 214, proxy geometric object data files 236, triangulation data file 238 and execution control expressions data files 250.

At S434, an animated model is input to curve/ribbon interpolation sub-module 256 from animated model 212. At S436, the key-curves generated using the static model discussed above are mapped onto the animated model so that the key-curves are defined in the local coordinate space of the surface at which the key-curves are to be attached. This allows them to "move" along as the underlying surface (skin) deforms. According to one embodiment of the present invention, the animated modeling process is performed outside of graphics pipeline 200 and the completed animated model is provided as an input to the graphics pipeline 200.

Curve/ribbon interpolation sub-module 256 receives key-curve indices and weight information for each particle and surface information from, respectively, triangulation data files 238 and animated model 212. At S438, curve/ribbon interpolation sub-module 256 first transforms the key-curves to a common coordinate system and then obtains the final interpolated curve (including both direction and twist) for each particle. The curve/ribbon interpolation sub-module 256 obtains the final interpolated curve for each particle by using indices to identify three key-curves forming a triangle and interpolating using weights and vector addition. In some embodiments of the present invention, the key-curves may then be scaled according to the length attribute of each particle using, for example, a scaling algorithm.

Figure 18:
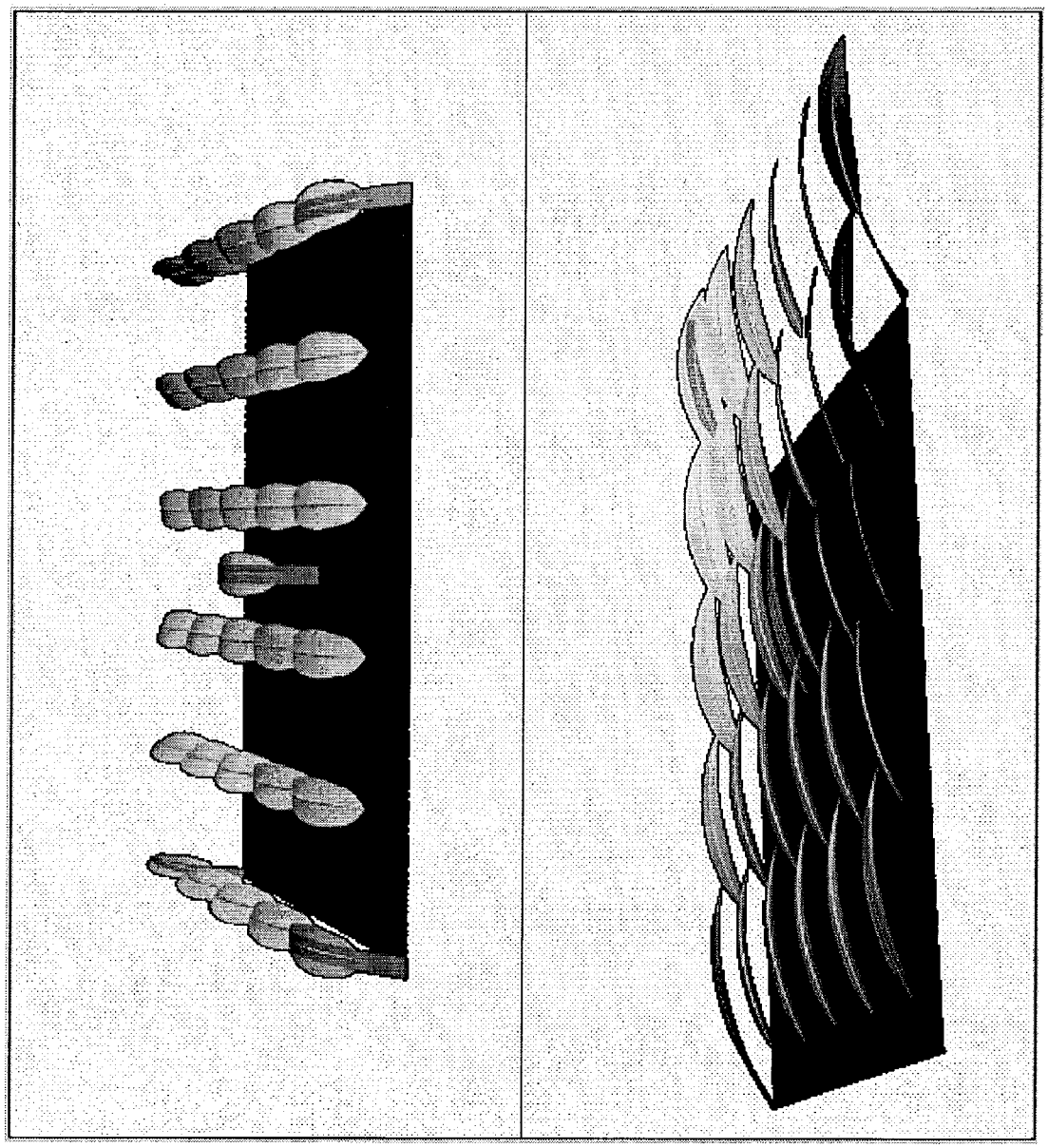
FIG. 18 shows two perspective views of exemplary feathers formed as a result of curve interpolation, according to embodiments of the present invention.

At S440 (FIG. 6), the final interpolated, scaled curve is then input to the shaped geometric object generation sub-module 258. As discussed above, the shaped geometric object generation sub-module 258 also receives as an input the base geometric object provided from the base geometric object instancer 240. At S442, the shaped geometric object generation sub-module 258 generates for each base geometric object, in an iterative manner, a surface-attached geometric object based on, for example, a direction and twist of the interpolated curve that was defined during the curve/ribbon interpolation process described above. The base geometric object is then deformed according to the interpolated curve. In one embodiment where the base geometric object is a feather, the shaft of the instanced feather may have the exact shape of the final interpolated curve. The left and right vanes of the instanced feather may line up correspondingly with the final interpolated curve depending on, for example, the direction, twist and bend of the final interpolated curve. FIG. 18 shows two perspective views of exemplary feathers formed as a result of this process.

Referring again to FIG. 17, according to embodiments of the present invention, at S444, fx attributes application sub-module 260 receives as an input from shaped geometric object generation sub-module 258 the shaped geometric objects. The fx attributes application sub-module 260 also receives as an input from the base geometric object instancer 240 the base geometric object. At S446, fx attributes application sub-module 260 applies any fx attributes to the shaped surface-attached geometric objects. This is done in a two-step process: first, the fx-attributes are applied to the base geometric object to construct a non-deformed fx-object. Then, the shaped geometric object is applied as a surface deformer to this non-deformed fx-object. In the case of a feather, as discussed above, fx attributes may include, but are not limited to, the number of splits in a feather and the number of hairs in a feather. At S448, final geometric object generation sub-module 266 receives information from the fx attributes application sub-module 260, including the surface-attached geometric objects with fx applied. At S450, the final geometric object generation sub-module 266 then generates the final surface-attached geometric objects by applying additional effects, such as moisture and the like.

Figure 6:
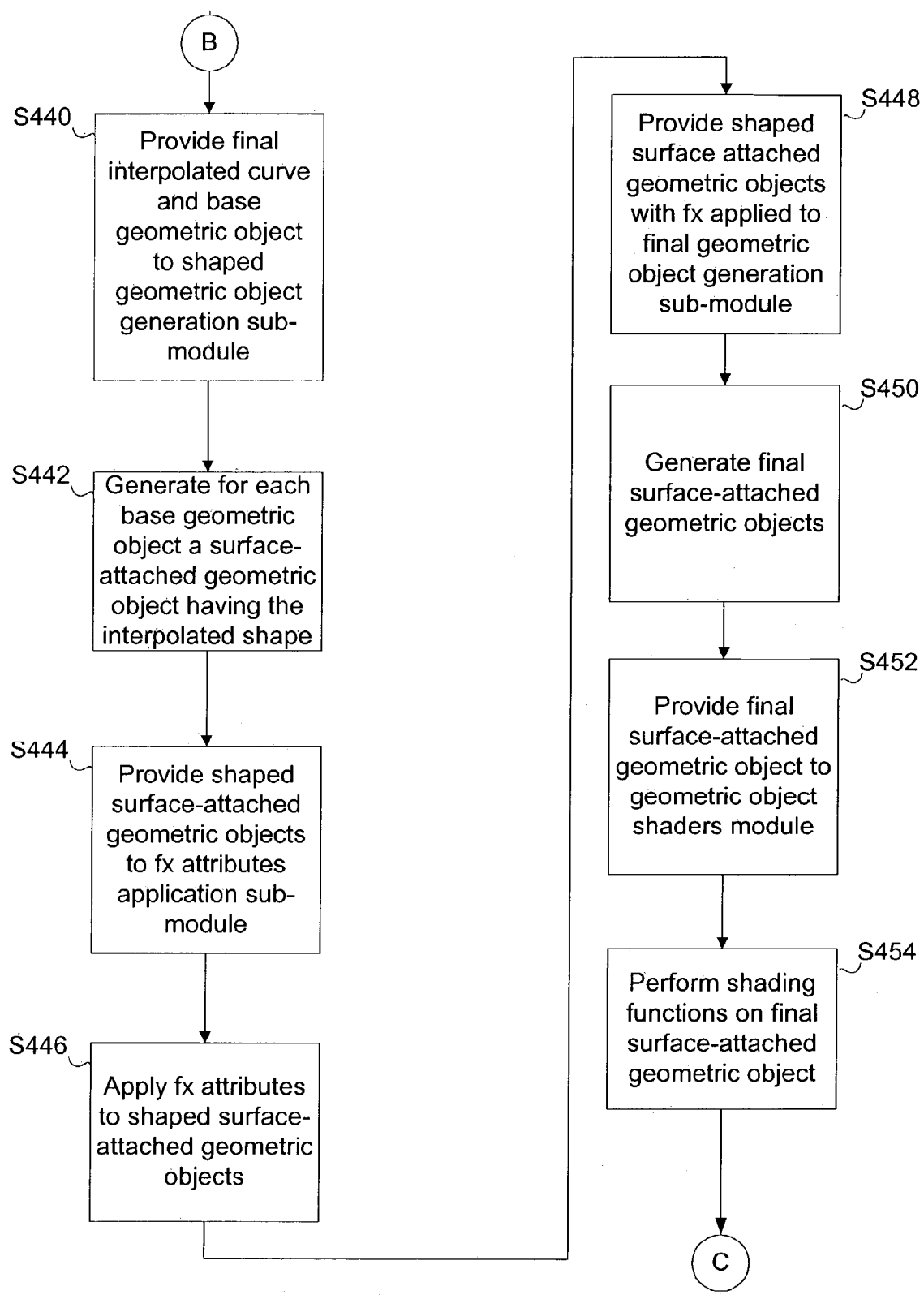
Figure 19:
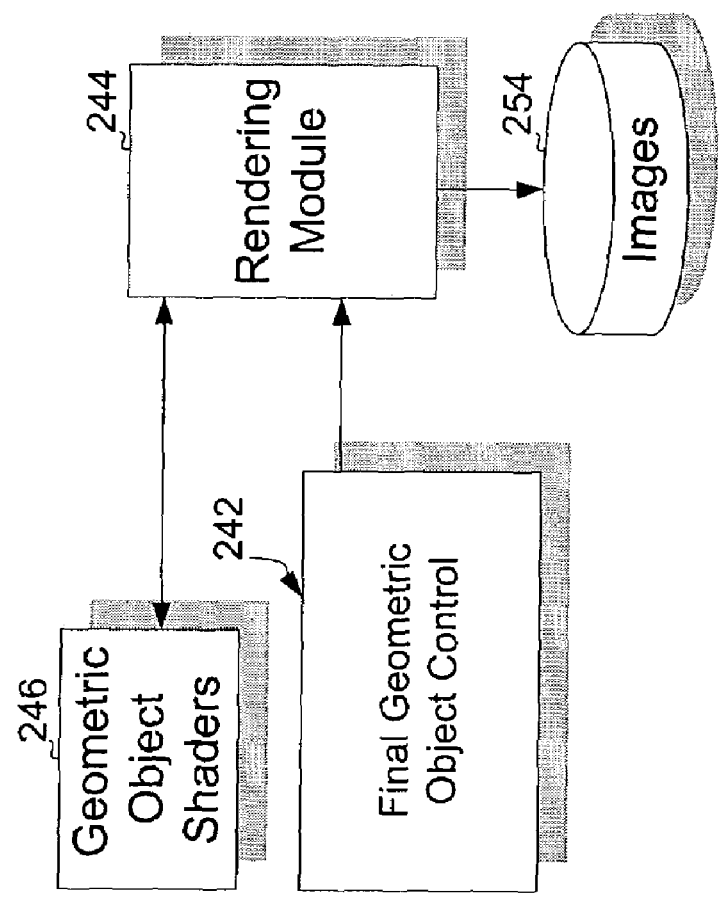
FIG. 19 shows a block diagram of the geometric object shaders module, final geometric object control module, rendering module and images data files of FIG. 2, according to embodiments of the present invention.

FIG. 19 shows a block diagram of the geometric object shaders module 246, final geometric object control module 242, rendering module 244 and images data files 254 of FIG. 2, according to embodiments of the present invention. As shown in FIGS. 6 and 19, according to embodiments of the present invention, at S452 the final geometric object control module 242 may provide the final surface-attached geometric object to geometric object shaders module 246 for shading. According to embodiments of the present invention, geometric object shaders module 246 is made up of five main parts. At S454, these five main parts perform the following shading functions: setup for type of geometry being shaded; grouping into regions of different looks; producing patterns; shading; and final color corrections.

Final geometric object control module 242 may pass a number to the geometric object shaders module 246 that determines what type of geometry the geometric object shaders module 246 is shading. In one embodiment, the numbers range from 0-7. The numbers 0, 1 represent parts of the vane of a feather made with surface patches (for example, 0=left vane; 1=right vane). The number 2 represents the central shaft of a feather. The numbers 3-6 represent parts of the vane of a feather (for example, 3=left down; 4=right down; 5=left tip; 6=right tip) made with curve elements (for example, hairs). The number 7 represents a single hair.

Based on the type of geometry being rendered, the geometric object shaders module 246 may derive normals and texture coordinates in different ways. After the geometry is set up, the geometric object shaders module 246 may not need to know which type of geometry it is shading (except in the case of the shaft).

At this point the different regions are identified. The model, for example a bird, has parts with different patterns and shading characteristics in different parts of the body. For example, the feathers on the head may be more transparent than the ones on the wing. Region maps are used that have different values painted for different regions. The geometric object shaders module 246 initially may set the parameters in all regions according to a default parameter list. The geometric object shaders module 246 may then read an external region file that contains a list of different parameter settings (e.g. specularity, color, opacity) for certain regions which replace the defaults. Thus, a large number of parameters is controlled without over-complication. Additional maps are loaded for soft transitions between regions. Then the geometric object shaders module 246 mixes all the parameter values for the different regions. After the parameters are mixed, the geometric object shaders module 246 no longer requires information about what region a geometry is in.

Patterns define the color variations on the model. Generating patterns is done as a combination of texture mapping and procedural methods. Different regions apply different parameters to texture maps. The textures can also be randomized from feather to feather to break up repetition. Procedural methods are used for simple patterns like the "core" (a dark tear drop shape in the middle of the feather), tip color, edge color, and barb variation. The end result of generating patterns is a final surface color without lighting effects.

The shading part of the geometric object shaders module 246 has a number of lighting components specific to feathers that it calculates (for example, diffuse, back lighting, specular, sheen, inner sheen, and rim light components). In one embodiment, a special backlighting technique is applied to the flight feathers. First, a map is generated of the flight feathers shaded semi-transparent from the camera view. The resulting image is more opaque in areas where flight feathers overlap. This image is then projected onto the flight feathers during shading to mix in the amount of backlighting. The specular component is anisotropic due to the parallel barbs that form the vane surfaces of the feather. Similar to a section of brushed metal, the specular highlights on the vanes of a feather shift as they are rotated around their normals while the light and viewing direction remain fixed.

To account for this effect, the parameterization (in u, v) of a feather's vane are lined up to match the direction of the barbs. An example follows of a pseudo-code, where R is specular component of the reflected light; LN is the normalized light vector; VN is the normalized view vector; Ns1 is the specular size in v; Ns2 is the specular size in u:

vector DerivV=vector normalize(Deriv(P,dPdv));

vector DerivU=vector normalize(Deriv(P,dPdu));

$R$=pow(cos (abs (acos (DerivV.LN)−acos (−DerivV.VN))),Ns1);

$R^*$=pow(cos (abs (acos (DerivU.LN)−acos (−DerivU.VN))),Ns2);

$R^*$=pow(clamp(N.L,0,1),falloff);

Basically the specular component is calculated in each (u, v) surface direction with different N values, then multiplied together. The sheen component may be used to simulate very broad light sources (e.g. the sky) reflecting off the feathers. The inner sheen component may be used to put a brighter sheen next to the feather shaft.

The rim light component provides some special controls to, for example, get a hot rim light effect around the edge of a bird. In one embodiment, a special method is applied to simulate soft, semi-transparent shadows which become darker the deeper a feather is located in the feather coat. Using standard depth maps, the distance between an occluding point and a light is obtained. The difference between the distance of the shading point on the feather from the light and occluding point distance is computed. The shading point may then be darkened in proportion to the computed difference.

Any post-shading color corrections are now added. The main color correction modifies the hue of the color as the feathers get darker. This is used to turn the color warmer as the feather gets darker.

Figure 7:
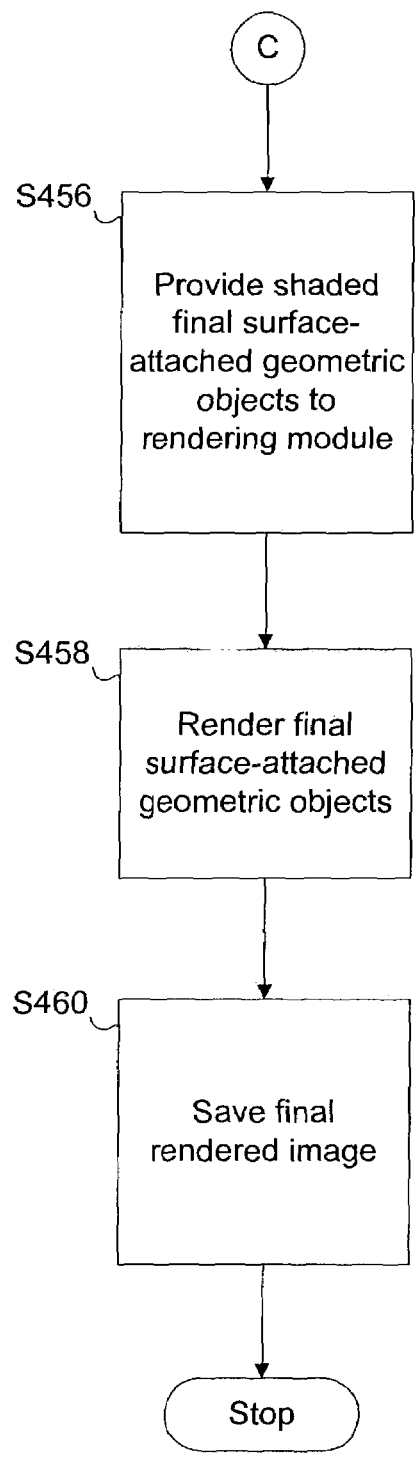
Figure 20:
FIG. 20 shows exemplary rendered and shaded feathers generated by graphics pipeline, according to embodiments of the present invention.

Referring again to FIG. 19, according to embodiments of the present invention, after the final surface-attached geometric objects are shaded, the geometric object shaders module 246 passes them, at S456 (FIG. 7), to rendering module 244 for final rendering at S458. At S460, the final rendered image may then be saved to images data files 254. Exemplary rendered and shaded feathers generated by graphics pipeline 200, according to embodiments of the present invention are shown in FIG. 20.

According to embodiments of the present invention, as shown in FIGS. 2 and 17, final geometric object control module 242 may also receive an input from execution control expressions data files 250. Execution control expressions data files 250 provides the user with a powerful and flexible mechanism to rearrange the render-time processing of surface-attached geometric objects to achieve a desired look or effect. The execution control expressions data files 250 may have one or more expression trees which specify operations to perform on each surface-attached geometric object. The user may select a tree to be evaluated. Each tree may specify a sequence of operations that generates an animated surface-attached geometric object. Additionally, the user may write expressions to dynamically change the parameters passed to each operation based on current sample time, region of origin for the current surface-attached geometric object, or a variety of other conditions. An exemplary execution control expressions file is shown below in Example Listing D.

According to embodiments of the present invention, surface-attached geometric object operations available in the execution control expressions data files 250 may include, for example, a software implemented switch that disables automated animation processing for proxy surface-attached geometric objects. Proxy surface-attached geometric objects are hand-animated surface-attached geometric objects. In one embodiment, the proxy surface-attached geometric objects are feathers and may come in at least two varieties. The first variety is flight feathers which are always controlled directly by character animators, as they are part of the character's performance. On a real bird, flight feathers would consist of the primary and secondary wing feathers. Flight feathers may be hand animated using modeling and animation module 208 and exported to proxy geometric object data files 236. The flight feathers may then be input from proxy geometric object data files 236 to proxy geometric object generation module 264 of final geometric object control module 242. These flight feathers may be flagged as proxy feathers and passed directly to the fx attributes application sub-module 260.

The second variety of proxy feathers are procedural feathers (i.e., automatically generated feathers) which for various reasons have been turned into hand-animated feathers through a tweak loop mechanism included in the graphics pipeline 200. The tweak loop mechanism is shown in FIGS. 2 and 17 by the thick solid line arrows. The execution control expressions data files 250 may allow a user to write and read animated surface-attached geometric object geometry to and from the instanced geometric objects data file 234. This allows a user to cache surface-attached geometric object animation for future use. Additionally, the user may import the cache into the modeling and animation module 208 of section 202 of the graphics pipeline 200 and "tweak" a problematic surface-attached geometric object's animation, later exporting new proxy surface-attached geometric objects information to the proxy geometric object data files 236 of the graphics pipeline 200.

New proxy surface-attached geometric objects information is then input from the proxy geometric object data files 236 to the proxy geometric object generation module 264 of section 204 of the graphics pipeline 200, which generates the proxy surface-attached geometric object. The user may then employ the switch operation discussed above to swap in the proxy surface-attached geometric object to the fx attributes application sub-module 260 from the proxy geometric object generation module 264 in place of the automatically animated surface-attached geometric object generated by the shaped geometric object generation sub-module 258. Thus, after tweaking, these procedurally generated feathers are treated as proxy feathers just like the flight feathers (which are controlled by the animators).

According to embodiments of the present invention, the execution control expressions data files 250 may also allow the user to create blends between surface-attached geometric objects generated by alternate branches of the expression tree. The blend operation may, for example, allow the user to select the best surface-attached geometric object animation method for a given region of a character. The user may specify blend regions and weights to isolate various parts of the model (for example, a character's body) and supply appropriate expressions to blend multiple surface-attached geometric object animations together.

According to embodiments of the present invention, different types of animation can be blended together. For example, animation performed with static key-curves may be blended with animation performed with animated key-curves in order to achieve a different result. In this manner, different animation methods may be used on different parts of the character's body.

Blending involves the creation of a blend region. Referring again to FIG. 17, according to embodiments of the present invention, execution control expressions data files 250 receive as an input blend region information from blend regions data files 252. In one embodiment, a blend region may comprise three regions: an inner sphere and an outer sphere and the outside of both the inner sphere and the outer sphere. Things outside both spheres are typically weighted at zero. Things within the inner sphere will have a weight of one and things in the outer sphere, that is, between the inner sphere and the outside of both spheres will vary between zero and one in weight. These blend regions are used to isolate different parts of an object body. For example, one blend region may be used to define the head portion and another blend region may be used to define the body portion of a bird or other character.

As an example, assume that there are two solutions or two animation methods that are used in a particular embodiment of the present invention, named method 1 and method 2. In this case, the blend region may be defined such that the inner sphere uses method 1, the outside of both spheres uses method 2 and the outer sphere between the inner sphere and the outside of both spheres will be a mixture between method 1 and method 2.

Thus, the transitions between different regions making up the model will be smoother. Note that these methods may be different methods or they may be the same methods with different parameters. For example, one attribute that may be applied is a feather stand up angle. In this case, the two various solutions or methods could be as follows: the first method may have a certain stand up angle. Everything outside both the inner sphere and the outer sphere would be the second method or solution where the feathers maintain their static position. The outer sphere between the inner sphere and the outside of both the inner sphere and the outer sphere could be a gradual shift from the static position to the particular stand up angle in the inner sphere.

The blend regions may also be animated, according to embodiments of the present invention. That is, they can be made to move around on the body of the character or else they can remain static.

The blend regions may also be used to weight other parameters and are not restricted just to blending feathers or other surface-attached geometric objects. The blend regions are used by the execution control expressions contained in the execution control expressions data files 250. In other words, the execution control expressions are written to use the blend regions.

According to embodiments of the present invention, the execution control expressions data files 250 may also allow the user to graphically simulate moisture on surface-attached geometric objects such as feathers in a manner similar to that described for graphically simulating wet hair in co-pending published U.S. utility patent application entitled "Method and apparatus for the digital creation of fur effects," referred to above.

Clumping of hairs can occur when the fur gets wet due to the surface tension or cohesion of water. The effect is that the tips of neighboring hairs (a bunch of hairs) tend to gravitate towards the same point, creating a kind of cone-shaped "super-hair", or circular clump. As described in the above-referenced patent application, using an algorithm, computer generated hairs are selectively clumped to provide the look of wet fur. The center hair of each clump is referred to as the clump-center hair, and all the other member hairs of that clump, which are attracted to this clump center hair, are referred to as clump hairs.

Similarly, clumping of feathers can occur when the feathers get wet. The individual barbs located on the shaft of the feather may clump together when wet. The center barb of each clump may be referred to as the clump-center barb, and all the other member barbs of that clump, which are attracted to this clump center barb, are referred to as clump barbs.

Figure 21:
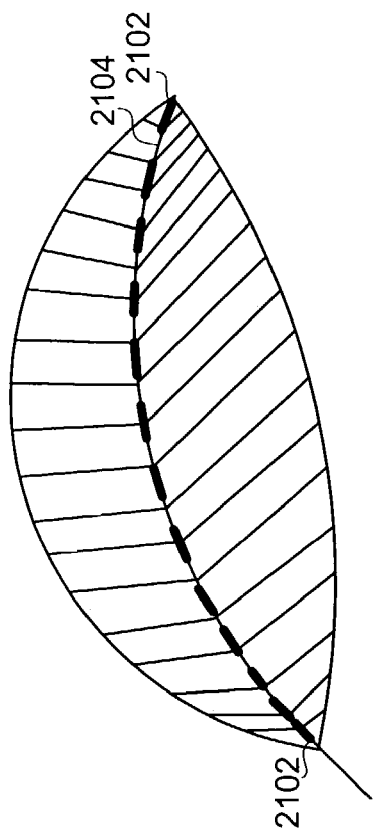
FIG. 21 shows linear clumps defined along the shaft of feather, according to embodiments of the present invention.
Figure 22:
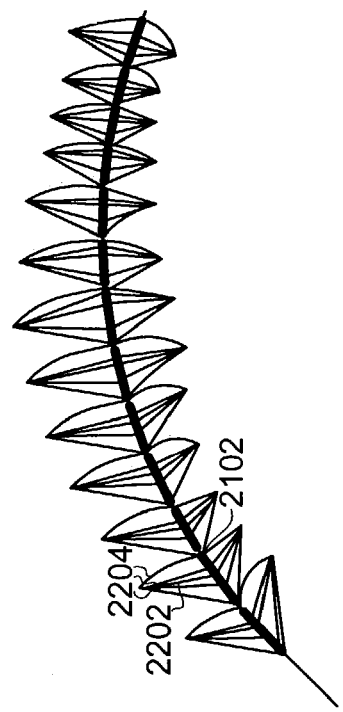
FIG. 22 shows a clump-center barb on a clump, illustrating clump barbs selectively clumped to the clump-center barb when simulating a wet feather according to embodiments of the present invention.

Whereas in the case of hairs the algorithm is defined for a two-dimensional space, in the case of feathers the algorithm must be adapted to a one-dimensional space. That is, in the case of the feather the clump will not be circular, but will be linear instead. As shown in FIG. 21, according to embodiments of the present invention, linear clumps 2102 are defined along the shaft 2104 of the feather. As shown in FIG. 22, each clump 2102 may have a clump-center barb 2202. Spaces on both sides of the clump-center barb 2202 that are part of the clump 2102 include lateral clump barbs 2204 that are selectively clumped to the clump-center barb when simulating a wet feather.

Figure 23:
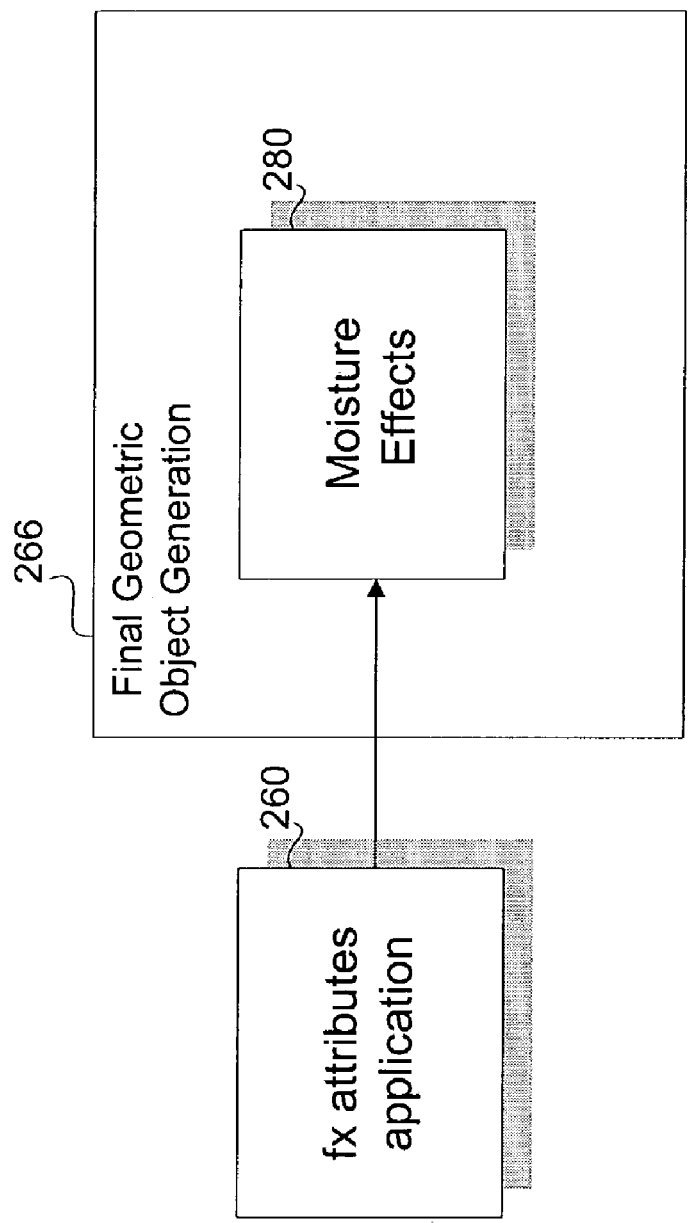
FIG. 23 shows a block diagram of the final geometric object generation sub-module of FIG. 2, including a moisture effects sub-module, along with fx attributes application sub-module, according to embodiments of the present invention.

FIG. 23 shows a block diagram of the fx attributes application sub-module 260 and final geometric object generation sub-module 266 of FIG. 2. According to embodiments of the present invention, final geometric object generation sub-module 266 includes moisture effects sub-module 280. As shown in FIG. 23, fx attributes application sub-module 260 may provide an input to moisture effects sub-module 280 that defines a particular moisture effect which is to be applied to a surface-attached geometric object.

In one embodiment, in order to produce a moisture effect, there are four clumping input parameters that may be provided in an execution control expression: clump-density, clump-size, clump-percent and clump-rate. The clump-density specifies how many clumps should be generated per feather shaft. The clump density is translated into an actual number of clumps defined by clump-center barbs, the number of clump center barbs depending on the length of the shaft. As a result, some of the existing barbs are turned into clump-center barbs. Clump-size defines the length of a clump in a one-dimensional space.

In one embodiment a clump-percent and clump-rate value is assigned to each clump barb. In one embodiment, the values for both range between [0,1], and are used subsequently to reorient clump barbs.

Clump-percent specifies the degree of clumping for a clump barb. For example, a value of zero indicates that the barb is not clumped at all, i.e., it is like a "dry" barb. A value of one indicates that the barb is fully attracted to its clump-center barb, i.e., the tip of the barb may be in the same location as the tip of the clump-center barb.

Clump-rate defines how tightly a clump barb clumps with its corresponding clump-center barb. For example, a value of zero indicates that the clump barb is linearly increasingly attracted to its clump-center barb, from the root to the tip. A clump-rate value closer to one indicates that the barb's control vertices closer to the root are proportionally more attracted to corresponding clump-center barb vertices, which results in tighter clumps.

Figure 24:
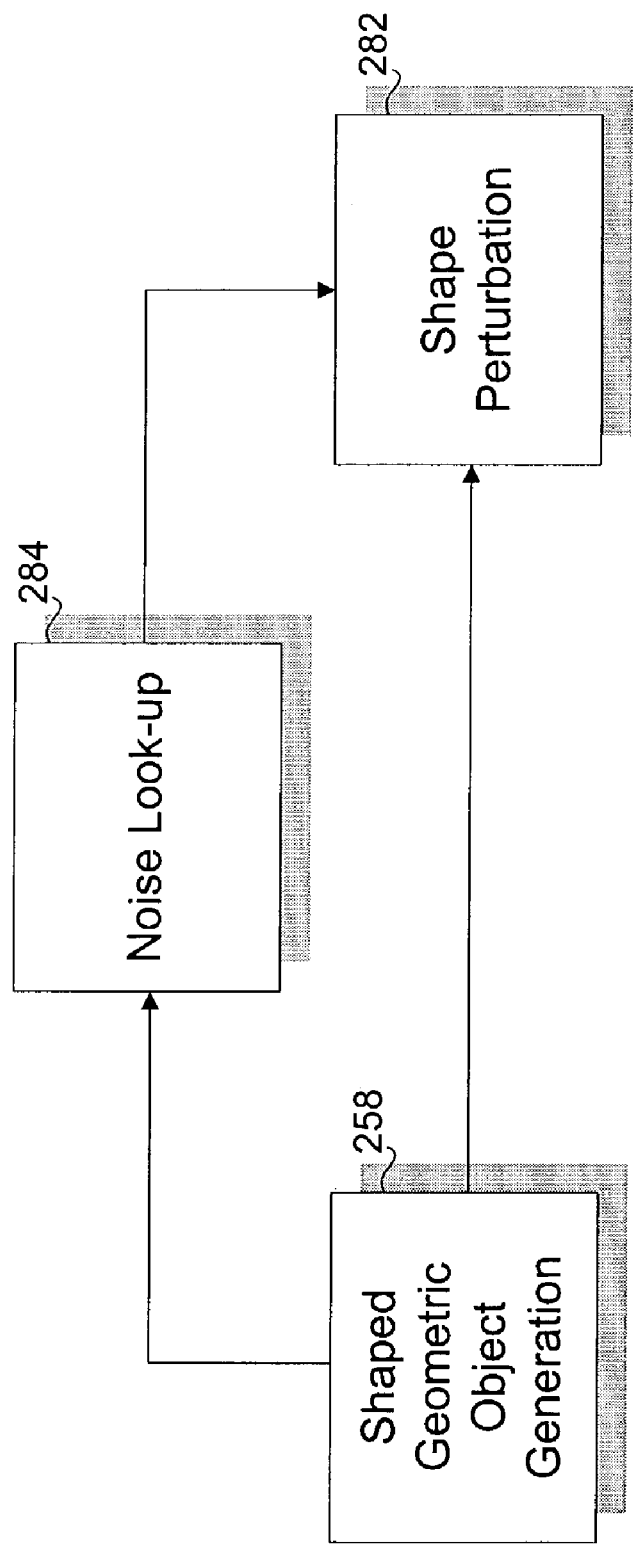
FIG. 24 shows a block diagram of the shaped geometric object generation sub-module of FIG. 2, along with a shape perturbation sub-module and a noise look-up sub-module, according to embodiments of the present invention.

According to embodiments of the present invention, the execution control expressions data files 250 may also allow the user to graphically simulate wind effects on surface-attached geometric objects such as feathers and hairs using an algorithm that includes a noise function to generate random movement of the surface-attached geometric objects. FIG. 24 shows a block diagram of the shaped geometric object generation sub-module 258 of FIG. 2, along with shape perturbation sub-module 282 and noise look-up sub-module 284, according to embodiments of the present invention.

As shown in FIG. 24, according to embodiments of the present invention, execution control expressions data files 250 define a particular wind effect which is to be applied to a surface-attached geometric object. The surface-attached geometric object may be input to shape perturbation sub-module 282 for application of the wind effects to the surface-attached geometric object. Based on the original position of the surface-attached geometric object, a perturbation vector is generated. The shaped geometric object generation sub-module 258 may access noise look-up sub-module 284 and use a look-up function to access a pseudo-random number field to obtain a perturbation vector for each surface-attached geometric object. Each surface-attached geometric object may look up its own perturbation vector. The perturbation vector is used to orient each surface-attached geometric object in a particular direction to simulate the effect of wind on the surface-attached geometric objects.

The noise function may have certain properties that allow for a continuous movement of the surface-attached geometric object. For example, the noise field may comprise a mixture of many frequencies. In addition, various parameters may be specified defining how a surface-attached geometric object is affected by the simulated wind. For example, the amplitude of the noise may be controlled. Similarly, the frequency and direction of the noise may be controlled. In this manner, the wind effects may be controlled to increase the strength of the simulated wind, the frequency of the simulated wind and the direction of the simulated wind. Separate controls may be included based on the type of surface-attached geometric object. For example, separate controls may be provided for controlling the effects of wind on hairs and on feathers.

According to embodiments of the present invention, the perturbation vector may be transformed into the local coordinate space of the surface-attached geometric object. The perturbation vector may then be applied to each of the control points of the surface-attached geometric objects. Thus, another level of control may be provided for defining how the perturbation vector affects the surface-attached geometric object. Perturbation may be performed in the defined local coordinate space of the surface-attached geometric object. Thus, in this manner controls may be included for forcing perturbations to be only in the up/down and/or left/right directions. A control may also be included for providing a twist effect to the surface-attached geometric object.

As described above, according to embodiments of the present invention, the procedural surface-attached geometric objects are automatically generated using static key-curves and interpolation in a local common coordinate space. These automatically generated surface-attached geometric objects may cause problems in the animation at the time of rendering. For example, the surface-attached geometric object animation may have flicker that may distract a viewer of the animation. In addition, the surface-attached geometric objects, for example feathers, may appear to penetrate the animated model or other hand animated geometric objects.

In one embodiment where the surface-attached geometric objects are feathers, the graphics pipeline 200 allows an animator to manually animate the flight feathers of a character to achieve a desired performance. The animation of the procedural feathers of a character should match the animation of the flight feathers as well as the animation of the body of the character. According to some embodiments of the present invention, interpenetration between the procedural surface-attached geometric objects and animated object model or hand animated geometric objects may be reduced or substantially eliminated as described below.

Figure 26:
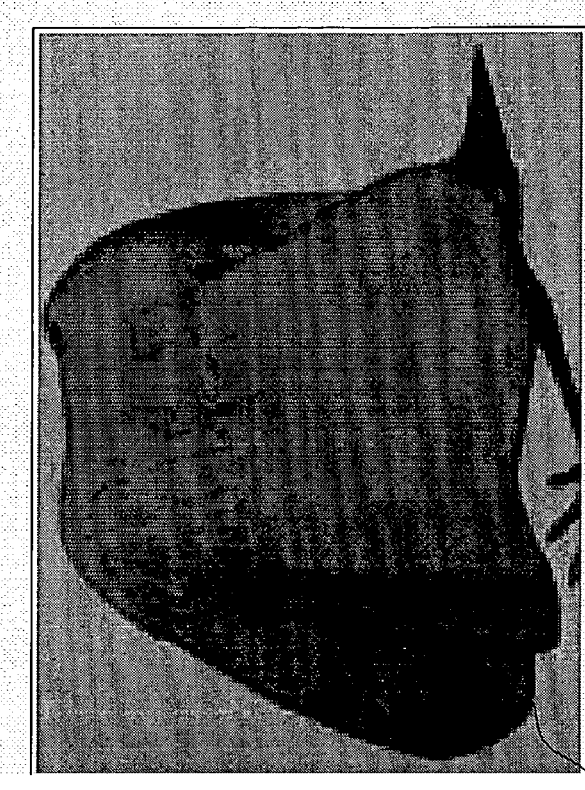
FIG. 26 shows a flight feather sheath, according to embodiments of the present invention.
Figure 25:
FIG. 25 shows an example of flight feathers, according to embodiments of the present invention.

According to embodiments of the present invention for reducing or substantially eliminating interpenetration, a "sheath" of manually animated surface-attached geometric objects is generated which encloses particular ones of the plurality of surface-attached geometric objects to facilitate the operation of various methods of automated feather animation. In one embodiment where the surface-attached geometric objects are feathers, a "flight feather sheath" is generated which encloses the flight feathers. An example of flight feathers 2502 is shown in FIG. 25. As shown in FIG. 26, the flight feather sheath 2602 approximates the convex hull of the flight feathers 2502 during animation and provides a continuous surface which encloses the flight feathers 2502 and the skin to which the flight feathers 2502 are attached. Any holes between the flight feathers 2502 and the skin are covered by the flight feather sheath 2602. The flight feather sheath 2602 also covers any gaps between flight feathers 2502 and smoothes out any creases and kinks in the flight feathers 2502 and the skin to which they are connected. According to embodiments of the present invention, the static and animated models may both include the flight feather sheath information. The graphics pipeline 200 uses the flight feather sheath 2602 as a substitute for the flight feathers 2502 while reducing or eliminating interpenetration, so it can be assumed that the skin and the flight feather sheath 2602 provides a continuous shell around the character.

Figure 27:
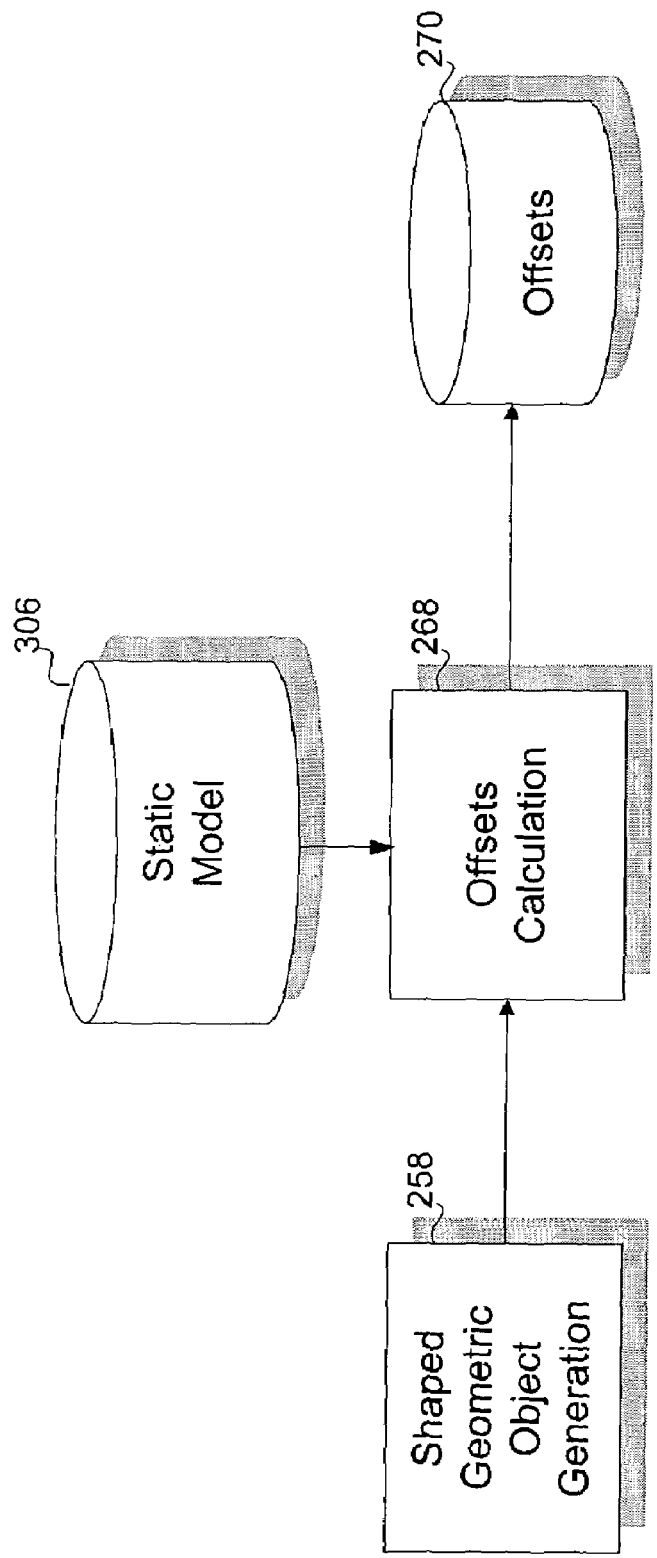
FIG. 27 shows a block diagram of offsets calculation sub-module, offsets data file and static model data file, along with the shaped geometric object generation sub-module of FIG. 2, according to embodiments of the present invention.

FIG. 27 shows a block diagram of offsets calculation sub-module 268, offsets data file 270 and static model data file 306, along with the shaped geometric object generation sub-module 258 of FIG. 2, according to embodiments of the present invention. As shown in FIG. 27, offsets calculation sub-module 268 receives as an input from shaped geometric object generation sub-module 258 the shaped surface-attached geometric objects. Offsets calculation sub-module 268 also receives as an input from the static model data file 306 the static model. According to the present embodiment, the static model may include information about the flight feather sheath 2602.

According to the present embodiment for reducing or substantially eliminating interpenetration, offsets calculation sub-module 268 determines, in an iterative manner, the distance between a control point on a surface-attached geometric object generated by the shaped geometric object generation sub-module 258 and the closest surface point of the static model "below" (i.e., towards the inside of the model) the control point, for each control point on each surface-attached geometric object. The distances are then saved in offsets data file 270. An exemplary algorithm for performing this function will be discussed below.

Figure 28:
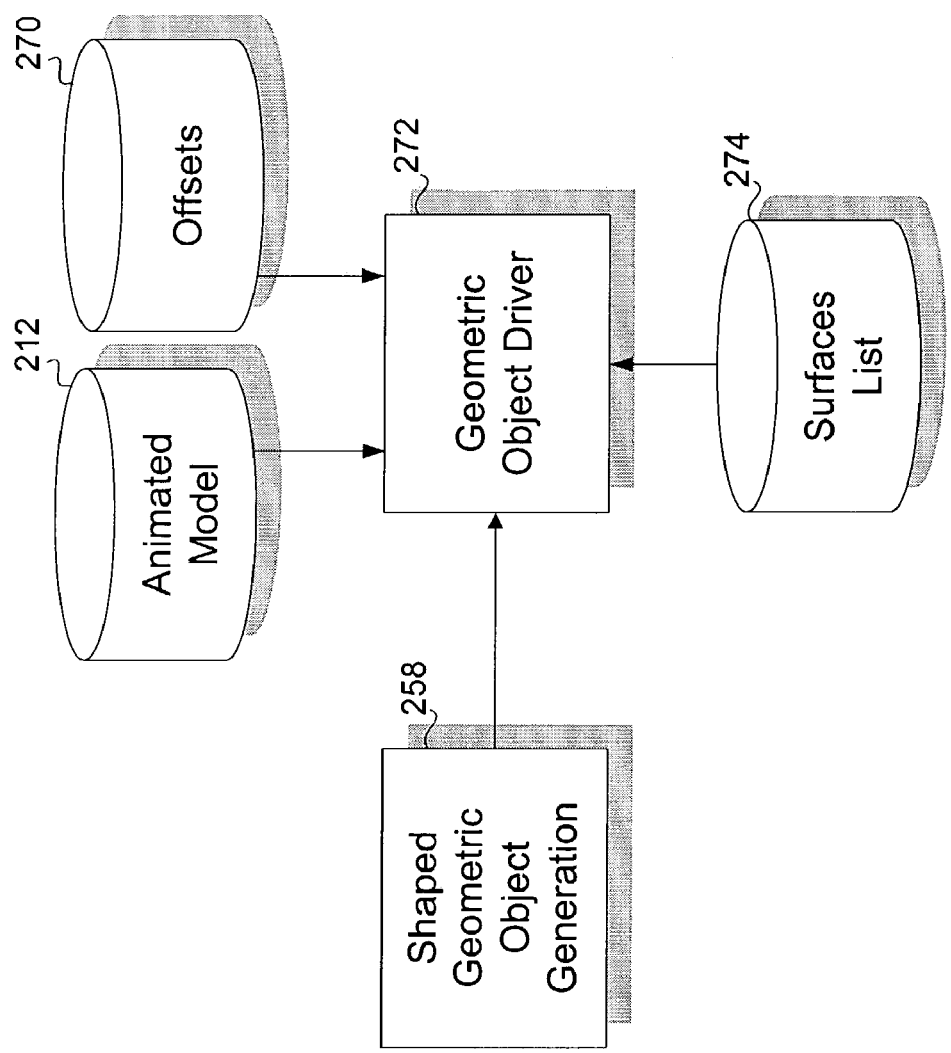
FIG. 28 shows a block diagram of geometric object driver sub-module, surfaces list data files, static offsets data file and animated model, along with the shaped geometric object generation sub-module of FIG. 2, according to embodiments of the present invention.

FIG. 28 shows a block diagram of geometric object driver sub-module 272, surfaces list data files 274, offsets data file 270 and animated model 212, along with the shaped geometric object generation sub-module 258 of FIG. 2, according to embodiments of the present invention. As shown in FIG. 28, geometric object driver sub-module 272 may be included in the present embodiment for reducing or substantially eliminating interpenetration. It receives as an input from shaped geometric object generation sub-module 258 the shaped surface-attached geometric objects. Geometric object driver sub-module 272 also receives as an input from the animated model 212 the animated model. According to the present embodiment, the animated model may include information about the flight feather sheath 2602.

Geometric object driver sub-module 272 also receives as inputs offset information and surfaces list information from offsets data file 270 and surfaces list data files 274, respectively. The surfaces list information may include, for example, a list of all the surface patches on the animated model. The surfaces list may be used to define permissible surfaces and/or portions of surfaces on which a control point on a particular surface-attached geometric object may find a closest surface point, as described above. According to embodiments of the present invention, the surfaces list is manually generated by a user.

According to embodiments of the present invention, for every sample time during an animation of the model, geometric object driver sub-module 272 estimates, in an iterative manner, the closest point on the surface of the animated model from each control point of a surface-attached geometric object. A particular control point is then offset from the estimated closest surface point along the underlying surface normal at that point by the previously recorded amount that was stored in offsets data file 270 for that control point. The closest surface point is not fixed during the animation of the model and may be recalculated each sample time, allowing the geometric object to slide across the underlying surface while still remaining attached to the surface at its base and being constrained by its original length. Thus, the deformation of the model do not cause procedural surface-attached geometric objects to change their shape unless it is to maintain the appropriate offset from the underlying surface. Thus, the original shape and size of the procedural surface-attached geometric objects may be substantially maintained. Geometric object driver sub-module 272 may independently perform this geometric object driver procedure every sample time, allowing processors 120 (FIG. 1) to generate the animation of procedural surface-attached geometric objects in parallel for different frames.

According to embodiments of the present invention, the geometric object driver procedure described above is implemented in the following efficient manner:

The closest point on a smooth surface to another point is the point on the surface which meets the following two criteria:

i) its surface normal passes through both the point on the surface and the other point, and ii) the distance between the surface point and the other point is less than the distance between any other surface point which meets the first criterion, and the other point. There may be more than one closest point on a surface to a particular point.

The geometric object driver procedure uses the first criterion to estimate the closest point on the underlying surfaces to a particular control point of a geometric object via raycasting. The unknown variables that are solved are the closest point on the underlying surface, the surface normal at the closest point, and the position of the control point which is at a known offset from the closest point. The position of the control point is also constrained by its original distance from adjacent control points or a point on the surface of the model.

Figure 30B:
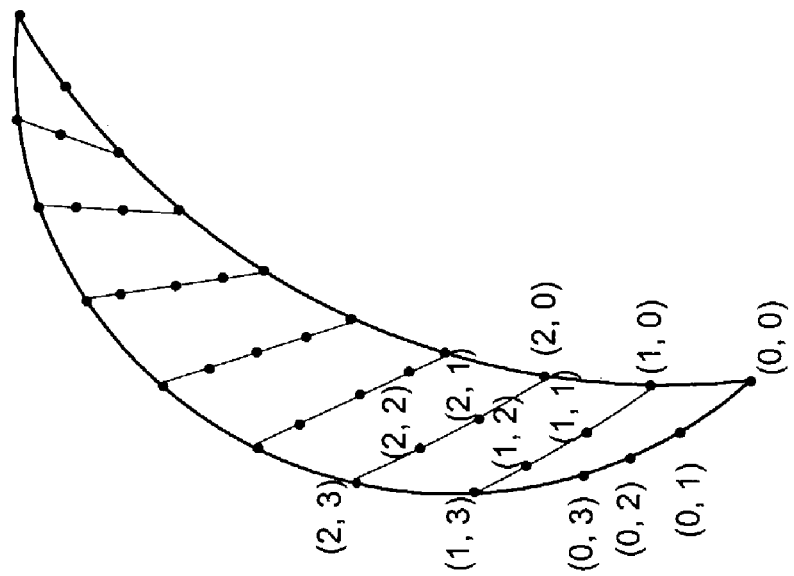
FIG. 30B shows representative control points of the vane of a feather.
Figure 30A:
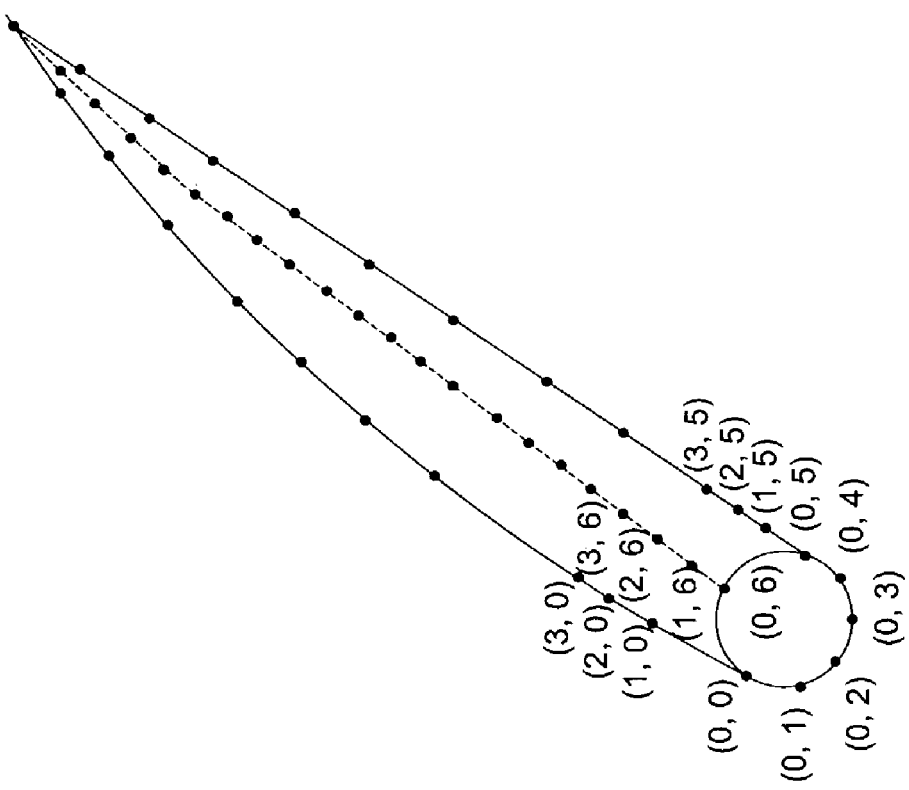
FIG. 30A shows representative control points of the shaft of a feather.

For an embodiment where the geometric objects are feathers, the control points of the shaft of a feather (see representative control points (0, 0) ... (n, n) in FIG. 30A) are processed before the control points of the vanes of a feather (see representative control points (0, 0) ... (n, n) in FIG. 30B). Based on the topology of each surface patch which comprises a feather, the geometric object driver procedure evaluates each control point in a predefined order. The control point (0, 0) is processed first on the shaft. The surface normal of the base of the feather, which is known, is used as an estimate of the surface normal of the closest point to this control point. This vector is a reasonable estimate of the surface normal of the closest point as it may be assumed that the underlying surfaces are not curving drastically between the feather base and the closest point of control point (0, 0). The initial position of the control point is estimated by adding the vector between the feather base and the position of the control point in a shaped feather to the feather base.

The geometric object driver procedure raycasts along the estimated surface normal from the estimated position of the control point to find the intersection point with the underlying surfaces. The control point's position is then offset from the intersection point by the recorded offset along the actual surface normal of the intersection point. The control point's position is then adjusted along the vector between the feather base and the new control point position to ensure that the distance between the feather base and the control point position is constrained to the original distance. The process then repeats using the adjusted control point position and the surface normal of the intersection point as the estimate of the surface normal of the closest point.

A new intersection point is found and once again the control point is offset from the new intersection point by the recorded offset along the actual surface normal of the new intersection point. As before, the control point's position may then be adjusted to constrain the distance between the feather base and the control point to the original distance. The geometric object driver procedure iterates until the distance between the feather base and the offset control point before adjustment is within some tolerance of the original distance. If the geometric object driver procedure is unable to find an intersection point along the estimated surface normal, the geometric object driver procedure uses the last estimate of the control point position.

The geometric object driver procedure then processes control point (1, 0) using the surface normal of the last intersection point of control point (0, 0) as an estimate of the surface normal of the closest point to this control point. The initial estimate of this control point is found by adding the vector between the positions of control point (0, 0) and control point (1, 0) in a shaped feather to the final position of control point (0, 0) previously found. The processing for this control point is similar to that for the previous control point except that the constraint on the distance is between the previous control point and this control point. The geometric object driver procedure similarly processes each control point (2, 0), (3, 0) . . . (n, 0) in turn using the surface normal of the last intersection of the previously processed control point as an estimate of the surface normal of this control point's closest point. The vector between the previous control point and the current control point in a shaped feather is added to the previous control point as an initial estimate of the control point's position, and the original distance between the previous control point and the current control point is used as a constraint.

Then the geometric object driver procedure returns to processing control point (0, 1) and instead of using the surface normal of the last intersection point of control point (n, 0) as the estimate for the surface normal of this control point's closest point, the geometric object driver procedure once again uses the surface normal of the feather base as the estimate for the surface normal of this control point's closest point. This is because the feather base is probably closer to control point (0, 1) than control point (n, 0) and thus its surface normal would be a better estimate than the surface normal of the last intersection point of control point (n, 0).

Additionally, the initial estimate of the control point's position is found by adding the vector between the feather base and this control point in a shaped feather to the feather base and the original distance between the feather base and this control point is used as a constraint. The remainder of the control points (1, 1), (2, 1) . . . (n, 1) are processed as before. The remaining rows of control points of the shaft (0, n) . . . (n, n) are processed analogously to the first and second rows of control points (0, 0) . . . (n, 0) and (0, 1) . . . (n, 1).

The control points on each vane of a feather are also processed similarly. The geometric object driver procedure processes the control point (0, 0) first using the surface normal of the last intersection point of control point (0, 0) of the feather shaft as an estimate of the surface normal of the closest point for this control point, the vector between this control point and the control point (0, 0) of the shaft in a shaped feather added to the previously calculated position of the control point (0, 0) of the shaft as an initial estimate of the position of this control point, and the original distance between this control point and the control point (0, 0) of the feather shaft as a constraint. The geometric object driver procedure then processes each control point (0, 1), (0, 2) and (0, n) in turn using the surface normal of the last intersection of the previously processed control point as an estimate of the surface normal of this control point's closest point, the vector between the previous control point and the current control point in a shaped feather added to the previous control point as an initial estimate of the control point's position, and the original distance between the previous control point and the current control point as a constraint.

Each column of control points (n, 0) . . . (n, n) is processed analogously to the first column (0, 0) . . . (0, n) except that the first control point in each column is processed using the surface normal from the last intersection point of the corresponding control point on the shaft as an estimate of the surface normal of its closest point, the vector between the control point and the corresponding control point on the shaft in a shaped feather added to the corresponding control point on the shaft as an initial estimate of the position of the control point, and the original distance between the control point and the corresponding control point on the shaft as a constraint.

As discussed above, the skin and flight feather sheath of the character may be composed of several surface patches. Patches may overlap each other and thus do not just form the outer shell of the character. The initial estimate of the position of a control point of a feather may lie within the body of the character. Thus, the geometric object driver procedure has to estimate the "closest" point which is actually on the outer shell of the character in order to ensure that the offset control point position is outside the body. This "closest" point may not actually be the closest point on a skin or flight feather sheath patch which is inside the body. The geometric object driver procedure has to raycast on either side of the estimated position of the control point along the estimated surface normal to find the estimated "closest" point.

The initial estimate of the position of a control point may lie on the other side of the body from where the feather base is located. Thus, the geometric object driver procedure should estimate the "closest" point which is actually on the same side of the body as the feather base so that the feather does not interpenetrate the body. It is assumed that the angle between the surface normal of an estimated closest point and the estimated surface normal used to find that closest point is within some range. The geometric object driver procedure considers an intersection point on the skin or flight feather sheath as an estimated closest point if the assumption is satisfied.

The geometric object driver procedure provides the user with controls to determine what parts of the skin or flight feather sheath of the character can be considered the estimated "closest" point to a control point of a procedural feather in the surfaces list data files 274. When an animation of the character brings two or more parts of the character's body into close proximity, the geometric object driver procedure may find an estimated closest point on any of the body parts in close proximity depending on which part is closer during a particular sample time.

An example is the closing of the wing on a winged character, where the wing of the character will come into close proximity with the sides and the chest of the character. This causes flickering of the animation of a feather as its control points are offset from different parts of the character's body for each sample time. Using the example above, the controls allow the user to specify that the geometric object driver procedure should find estimated "closest" points for feathers on the wing only from the skin on the wing or the flight feather sheath and not from the skin on the sides or the chest of the character. These "closest" points may not actually be the closest points to the control points of a feather, as the skin on the sides or chest may be closer.

The geometric object driver procedure uses raycasting to find intersection points of a ray with the skin and flight feather sheath of the character. To facilitate the ray intersection tests, the skin and flight feather sheath surface patches are tessellated into triangles. The geometric object driver procedure uses a fixed tessellation of the skin and flight feather sheath instead of an adaptive tessellation even though the adaptive tessellation may produce a more accurate tessellation with fewer triangles. This avoids a problem where the animation of the procedural feathers flickers because of differences in the tessellation between different sample times of an animation of the character. The user may adjust the accuracy and density of the tessellation for each patch of the skin or flight feather sheath in surfaces list data files 274.

Since the tessellation of the skin and flight feather sheath produces a large number of triangles to more accurately represent the skin and flight feather sheath as they deform during an animation, the geometric object driver procedure uses a Binary Space Partition ("BSP") tree to accelerate the ray intersection tests. The BSP tree provides a spatial subdivision of the character which allows the geometric object driver procedure to only perform ray intersection tests on the triangles forming the parts of the skin and flight feather sheath which are likely candidates for finding an estimated closest point to a particular control point of a feather.

In one embodiment, the geometric object driver procedure uses a statically combed geometric object as its initial reference, trying to maintain the orientation and shape of the geometric object and deforming the geometric object only as necessary to ensure that it does not interpenetrate the surface of a model. The static combing is typically performed on the static or "default" pose of the model to achieve a particular look. However, when the static combing is applied to the model while it is animating, the look of the model may be different from that in the static pose since the static combing curves are only driven at their base by the animation of the model.

Figure 29:
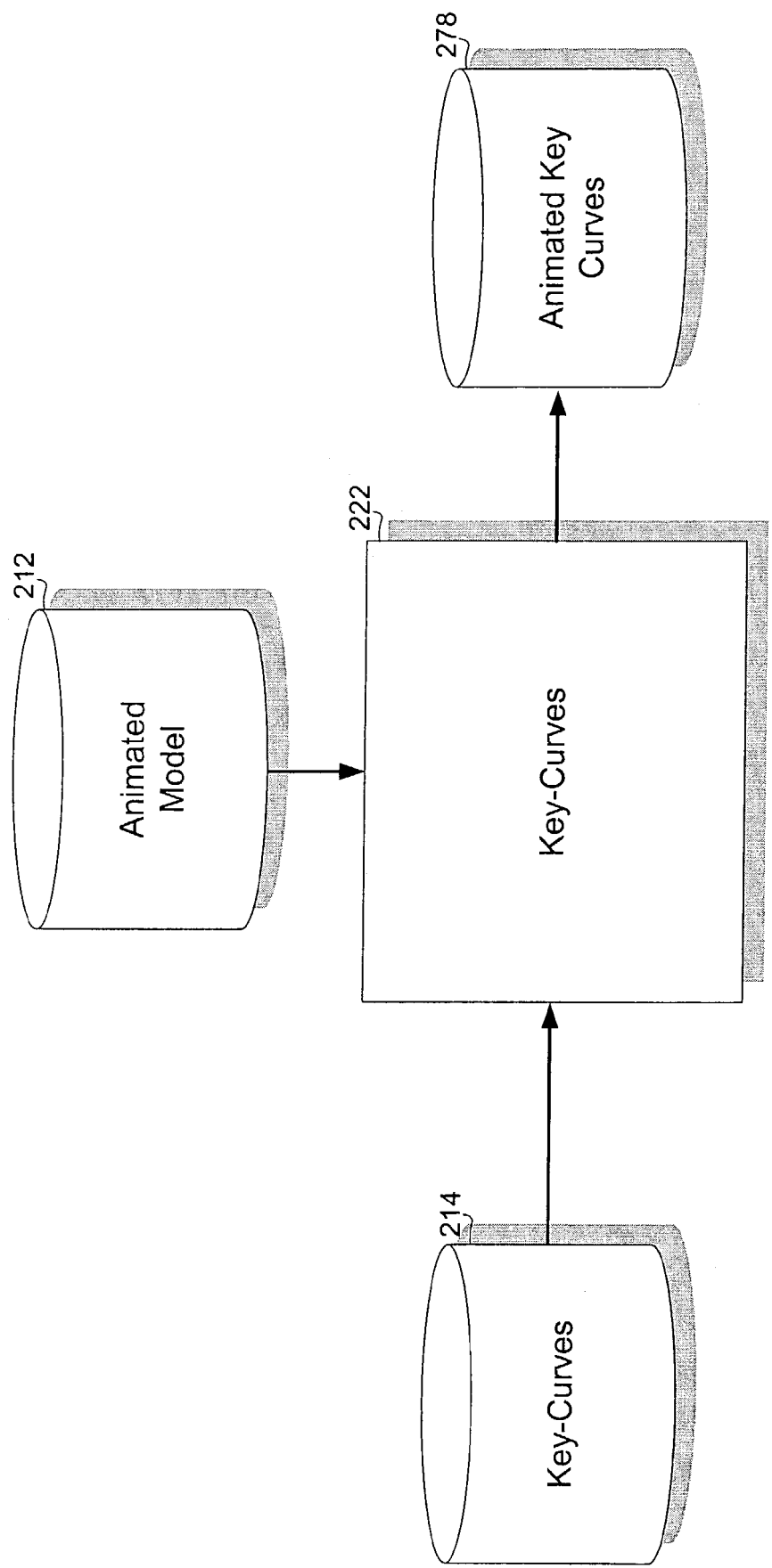
FIG. 29 shows a block diagram of key-curves sub-module and key-curves data files of FIG. 2, along with animated model data files and animated key-curves data files, according to embodiments of the present invention.

FIG. 29 shows a block diagram of the key-curves sub-module 222 and key-curves data files 214 of FIG. 2, along with animated model 212 and animated key-curves data files 278, according to embodiments of the present invention. As shown in FIG. 29 and as discussed above in relation to the key-curves generation, placement and combing process, key-curves sub-module 222 may automatically generate animated key-curves (in addition to the static key-curves) to match the animation of the model. This process is used together with the geometric object driver procedure discussed above.

Key-curves sub-module 222 receives as input static key-curves information from key-curves data files 214. The static key-curves information was previously determined by key-curves sub-module 222 and saved to key-curves data files 214. Key-curves sub-module 222 also receives as an input from the animated model 212 the animated model. Key-curves sub-module 222 then generates animated key-curves and saves them to animated key-curves data files 278. The key-curves sub-module 222 may use the static key-curves which define a particular look for the model as its starting point. According to embodiments of the present invention, each control point of the static key-curves is attached to a corresponding estimated closest point on the surface of the model in a static pose. The distance between each control point and its corresponding closest point is also recorded. The key-curves sub-module 222 then attaches each control point of the static key-curves to the same corresponding point on the surface of the model as it is animating and offsets that control point from the point by the recorded distance, thus generating animated key-curves for a particular animation of the model. The key-curves are being driven by the animation of the surfaces of the model. These animated key-curves are then used to generate geometric objects which react to the animation of the model.

In other embodiments, each control point of a procedural surface-attached geometric object is attached to a corresponding estimated closest point on the surface or sheath of the model in a static pose. The distance between each control point and its corresponding closest point is once again recorded. The method then attaches each control point to the same corresponding point of the surface or sheath of the model as it is animating and offsets that control point from the point along the surface normal by the recorded distance, thus animating the surface-attached geometric object to match a particular animation of the model. The procedural surface-attached geometric objects are being driven by the animation of the surface and sheath of the model.

Thus, according to embodiments of the present invention, graphics pipeline 200 generates animated key-curves to match the look of the model in the static pose on certain parts of the model where the animation tends to deform the model such that the static combing is insufficient to achieve the desired look. The geometric object driver procedure described above may use the animated key-curves to generate geometric objects as its initial reference. The animated key-curves are used to match the look in the static pose while the model is animating or, for example, to achieve a different look for artistic purposes. These key-curves may be automatically generated.

Graphics pipeline 200 ensures that the animated key-curves have lengths that are approximately the same as the lengths of the corresponding static key-curves but still retain changes to the orientation of the animated key-curves. These animated key-curves then provide the orientation changes required to maintain a particular look during the animation of the character. In addition, the geometric object driver procedure discussed above is used to encode the shape of the geometric objects.

The geometric object driver procedure uses the offsets of control points of geometric objects from their estimated closest points on the surface of the model in a static pose. These offsets may be calculated based on the statically combed geometric objects which define a particular look of the character. The same iterative algorithm as described above is used to generate the offsets instead of generating the positions of the control points.

In this case, the unknown variables are the closest point on the underlying surface to the known position of the control point, the surface normal of the closest point, and the offset of the control point from the closest point on the underlying surface. Thus, the geometric object driver procedure uses the algorithm above, modified such that the constraint is that the offset control point is within some distance of the actual position of the control point instead of the distance between the offset control point and another reference point being constrained to some tolerance of the original distance between the two points. An estimate of the offset is the distance between the actual position of the control point and the estimated closest point during each iteration of the algorithm.

It is to be understood that even though numerous characteristics and advantages of embodiments of the present invention have been set forth in the foregoing description, together with details of the structure and function of embodiments of the invention, this disclosure is illustrative only. Changes may be made in detail, especially matters of structure and management of parts within the principles of the present invention to the full extent indicated by the broad general meaning of the terms in which the appended claims are expressed.

Although a system and process according to embodiments of the invention were described in relation to a film industry visual effects environment, a system and process according to embodiments of the invention may also be employed in various other environments and applications, including, but not limited to, television special effects, video game development, educational applications, interactive applications, and computer aided design applications (for example, architectural design).

Various embodiments of the present invention may include one or more of the features and functions described above. One example embodiment includes all the features and functions described above.

Having disclosed exemplary embodiments and the best mode, modifications and variations may be made to the disclosed embodiments while remaining within the scope of the invention as defined by the following claims.

---

Example Listing A

```
feather shape-attributes (36 + randomSeed):
======================================
    single attributes (one number):
        scale
        randomSeed
        numCVsShaftU
        numCVsShaftV
        numCVsVaneU
        numCVsVaneV
        shaftLength
        shaftRadius
        shaftRadiusModifier
        shaftTopRoundnessModifier
        shaftBottomRoundnessModifier
        shaftTopWeightModifier
        shaftBottomWeightModifier
    pair attributes (one each for left and right vanes):
        vaneWidth
        vaneBegin
        vaneBeginTangent
        vaneBeginScale
        vaneLower
        vaneLowerTangent
        vaneLowerScale
        vaneLowerWidth
        vaneUpper
        vaneUpperTangent
        vaneUpperScale
        vaneUpperWidth
        vaneEndTangent
```

Example Listing A -continued

```
        vaneEndScale
        vaneTipWidth
        vaneTipHeight
        shaftVanePosition
        shaftVaneOrientation
        barbSkew
        barbSkewPower
        barbCurvature
        barbCurvaturePower
        vaneCurvature
        vaneCurvaturePower
feather fx-attributes (29):
==============================
    single attributes (one number):
        downHairLengthModifier
        downHairWidthModifier
        downHairPowerModifier
        tipHairLengthModifier
        tipHairWidthModifier
        tipHairPowerModifier
        separation
        separationVariation
        separationSkew
        separationWaviness
        separationProbability
    pair attributes (one each for left and right vane):
        downHair
        downHairDensity
        downHairVariation
        downHairLength
        downHairWidth
        downHairWidthTaper
        downHairSkew
        downHairWaviness
        downHairTransition
        tipHair
        tipHairDensity
        tipHairVariation
        tipHairLength
        tipHairWidth
        tipHairWidthTaper
        tipHairSkew
        tipHairWaviness
        tipHairTransition
```

Example Listing B

```
# ---------------------------------------------------------

# Example static expression file.

# ---------------------------------------------------------

# create random value.

rand = randval(0,1,0);
# look up the value for parameter from corresponding texture map
at current u, v location.

fthr_den =
texture1(spref_eval("{spref:mar/tex_mar_all_fthr_den.tex?rep=
bi8_tif}/")+srfc_name+".tif", srfc_u, srfc_v);
fthr_len=
texture1(spref_eval("{spref:mar/tex_mar_all_fthr_len.tex?rep=
bi8_tif}/")+srfc_name+".tiff", srfc_u, srfc_v);
length =
texture1(spref_eval("{spref:mar/tex_mar_all_len.tex?rep=bi8_tif}/")
+srfc_name+".tif", srfc_u, srfc_v);
hair_on_off=
texture1
(spref_eval("{spref:mar/tex_mar_all_hair_on_off.tex?rep=bi8_tif}/")
+srfc_name+".tif", srfc_u, srfc_v);
eyebrow_matte = texture1
```

Example Listing B

```
(spref_eval("{spref:mar/tex_mar_all_eye_brow_matte.tex?rep=
bi8_tif}/")+srfc_name+".tif", srfc_u, srfc_v);
peak_matte =
texture1
(spref_eval("{spref:mar/tex_mar_all_peak_matte.tex?rep=bi8_tif}/")
+srfc_name+".tif", srfc_u, srfc_v);
helmet_off=
texture1
(spref_eval("{spref:mar/tex_mar_all_helmet_off.tex?rep=bi8_tif}/")
+srfc_name+".tif", srfc_u, srfc_v);
wing_param =
texture1
(spref_eval("{spref:mar/tex_mar_all_wing_param.tex?rep=bi8_tif}/")
+srfc_name+".tif", srfc_u, srfc_v);
wing_fthr_len = texture1
(spref_eval("{spref:mar/tex_mar_all_wing_fthr_len.tex?rep=
bi8_tif}/")+srfc_name+".tif", srfc_u, srfc_v);
wing_tip =
texture1
(spref_eval("{spref:mar/tex_mar_all_wing_tip_matte.tex?rep=
bi8_tif}/")+srfc_name+".tif", srfc_u, srfc_v);
down map =
texture1
(spref_eval("{spref:mar/tex_mar_all_down_map.tex?rep=bi8_tif}/")
+srfc_name+".tif", srfc_u, srfc_v);
hair den =
texture1
(spref_eval("{spref:mar/tex_mar_all_hair_den.tex?rep=bi8_tif}/")
+srfc_name+"tif", srfc_u, srfc_v);
hair_len=
texture1
(spref_eval("{spref:mar/tex_mar_all_hair_len.tex?rep=bi8_tif}/")
+srfc_name+".tif", srfc_u, srfc_v);
back_matte =
texture1
(spref_eval("{spref:mar/tex_mar_all_back_matte.tex?rep=bi8_tif}/")
+srfc_name+".tif", srfc_u, srfc_v);
chest_matte =
texture1
(spref_eval("{spref:mar/tex_mar_all_chest_matte.tex?rep=bi8_tif}/")
+srfc_name+".tif", srfc_u, srfc_v);
head_matte =
texture1
(spref_eval("{spref:mar/tex_mar_all_head_matte.tex?rep=bi8_tif}/")
+srfc_name+".tif", srfc_u, srfc_v);
wing_matte =
texture1
(spref_eval("{spref:mar/tex_mar_all_wing_matte.tex?rep=bi8_tif}/")
+srfc_name+".tif", srfc_u, srfc_v);
cheek_matte =
texture1
(spref_eval("{spref:mar/tex_mar_all_cheek_matte.tex?rep=bi8_tif}/")
+srfc_name+".tif", srfc_u, srfc_v);
tail_matte =
texture1
(spref_eval("{spref:mar/tex_mar_all_tail_matte.tex?rep=bi8_tif}/")
+srfc_name+".tif", srfc_u, srfc_v);
hair_cute =
texture1
(spref_eval("{spref:mar/tex_mar_all_hair_cute.tex?rep=bi8_tif}/")
+srfc_name+".tif", srfc_u, srfc_v);
laydown_map =
texture1
(spref_eval("{spref:mar/tex_mar_all_laydown_map.tex?rep=
bi8_tif}/")+srfc_name+".tif", srfc_u, srfc_v);
sling_wing_off = texture1
(spref_eval("{spref:mar/tex_mar_all_sling_wing_off.tex?rep=
bi8_tif}/")+srfc_name+".tif", srfc_u, srfc_v);
sling_fthr_len =
texture1
(spref_eval("{spref:mar/tex_mar_all_sling_fthr_len.tex?rep=
bi8_tif}/")+srfc_name+".tif", srfc_u, srfc_v);
# set default value to "this is not a clump center hair".

hair_clump_center = -2;
```

Example Listing C

```
# ------------------------------------------------------------------

# Example dynamic expression file.

# Sets the values of numerous temporary variables and some feather/hair
# attributes which are different from their built-in default values.

# ------------------------------------------------------------------
# set minimum value for variables coming from texture maps.

fthr_len = (fthr_len < 0.001 ) ? 0.001 : fthr_len;
hair_len = (hair_len < 0.12) ? 0.12 : hair_len;
hair_on_off = (hair_on_off < 0.001 ) ? 0.001 : hair_on_off;
wing_matte (wing_matte < 0) ? 0 : wing_matte;
head_matte = (head_matte < 0) ? 0 : head_matte;
peak_matte = (peak_matte < 0) ? 0 : peak_matte;
fthr_len = (fthr_len < 0.12 && peak_matte > 0) ? 0.12 : fthr_len;
down_map = (down_map < 0) ? 0 : down_map;
helmet_off = (helmet_off < 0) ? 1 : helmet_off;
laydown_map = (laydown_map < 0) ? 0 : laydown map;
cheek_matte = (cheek_matte < 0) ? 0 : cheek_matte
# create inst_type based on surf_den_map id number.

    # 0: emit nothing
    # 1: emit hair
    # 2: emit feather
    # srfc_den_map == 1 then inst_type == 2, from fthr den map
    # srfc_den_map == -1 then inst_type == 2, from pattern file
    # srfc_den_map == 2 then inst_type == 1, from hair den map
    # srfc_den_map == 3 then inst_type == 1, from down map
inst_type = (srfc_den_map == -1 || srfc_den_map == 1 ) ? 2 :
    # srfc_den_map 1 and -1 is fthr
    ((srfc_den_map == 4) ?        (randval(0.0001,1,fthr_id*4) <=
(laydown_map * .5) ?1:0)          #culls face hair from cute map
    :1);                #srfc_den_map 2 and 3 is hair
inst_type = (inst type == 1) ? ((randval(0.0001,1,fthr_id*4) <=
.5)?1:0):inst_type;       #culls some hair
# ratio between radians and degrees.

ang2rad = 3.1415927 / 180.0;
# final fthr_normal_rot_angle as a random value, +/- 1.5 degrees.

normal_variation = (srfc_den_map == 4) ? 25.5 * ang2rad;
1.5 * ang2rad;
fthr_normal_rot_angle =
randval( -normal_variation, normal_variation, fthr_id*101);
# rotate feathers up from skin (negative val raises).

laydown_variation =
(srfc_den_map == 2 && hair_on_off > .75)
? 20 * ang2rad * (1-wing_matte) : 8 * ang2rad * (1-wing_matte);
fthr_laydown_rot_angle = randval( -laydown_variation, 0,
fthr_id*102);
fthr_laydown_rot_angle = (srfc_den_map == 4)
? fthr_laydown_rot_angle - 2 * ang2rad - (6 * ang2rad *
(eyebrow_matte)):
fthr_laydown_rot_angle;
fthr_laydown_rot_angle = (srfc_den_map == -1)
? fthr_laydown_rot_angle ((3 * cheek_matte) * ang2rad)
: fthr_laydown_rot_angle;
fthr_randomSeed = fthr_id;
length = pow(fthr_len,.6);
# lengthens shorter face fthrs.

length = (head_matte > 0.0 && length < 0.35 && length > 0.12)
? length + 0.18 * (1 - ((length – 0.12)*(1/(.375 – 0.12)))) : length;
length = (head_matte > 0.0 && length < .12) ? length + 0.18 : length;
var_c = (1 – length) * head_matte;
# create matte for shorter face fthrs
hair_len = hair_len + down_map * .5;
hair_len = hair_len * 1.5 * hair_lenMult;
hair_len = hair_len * (1 – hair_on_off * (1 – beak_hairMult));
        # shorter beak hairs than std
hair_len = (randval(0.0001,1,fthr_id*4)<=.1)
? hair_len : hair_len * 1.65 * guard_hairMult;
var_a = wing_matte * (1-wing_fthr_len * 1.0);
# create matte of leading edge
```

Example Listing C

```
var_a = (var_a < 0) ? 0 : var_a;                    # min 0
var_a = pow(var_a,1);
var_b = wing_matte * (1 - wing_fthr_len - 0.7) * 3.0;
# thinner matte of leading edge
var_b = (var_b < 0) ? 0 : ((var_b > 1) ? 1 : var_b);  # min 0
var_b = pow (var_b,2);
fthr_scale vector(.32);
fthr_scale = (wing_matte > 0) ? fthr_scale * ( 1 - var_a * .5) :
fthr_scale;
fthr_origin = vector(0,0,0);
fthr_normal = vector(0,0,0);
fthr_direction = vector(0.0,0.0,0.0);
fthr_shaftLength = 3.4 * length *(1-(hair_on_off* .5) +.01);
# fthrs around beak shorter
fthr_shaftLength = fthr_shaftLength + (wing_fthr_len * 4.0);
# wing fthrs longer
fthr_shaftLength = fthr_shaftLength + down_map * .8;
# downy areas longer
# added these lines for shortening the 1st row (secondary) wing feathers.

lengthMult = (fthr_shaftMult == 1) ? -1: texture1
(inst_shorten_tex_map + "/" + inst_pit_surface + ".tif",
srfc_u, srfc_v);
thr_shaftLength = (lengthMult == -1) ? fthr_shaftLength :
((lengthMult > 0.5) ? fthr_shaftLength * fthr_shaftMult :
fthr_shaftLength);
##### SHAFT MODIFIERS ################
fthr_shaftRadius = (fthr_len < 0.2) ? (fthr_len * 0.02) / 0.2 : 0.02;
fthr_shaftRadiusModifierLowerPosition = 0.0;
fthr_shaftRadiusModifierLowerValue = 0.8;
fthr_shaftRadiusModifierMiddlePosition = 0.50;
fthr_shaftRadiusModifierMiddleValue = 0.6;
fthr_shaftRadiusModifierUpperPosition = 1.0;
fthr_shaftRadiusModifierUpperValue = 0.0;
fthr_shaftTopRoundnessModifierLowerPosition = 0.2;
fthr_shaftTopRoundnessModifierLowerValue = 1.0;
fthr_shaftTopRoundnessModifierMiddlePosition = 0.5;
fthr_shaftTopRoundnessModifierMiddleValue = 1.0;
fthr_shaftTopRoundnessModifierUpperPosition = 1.0;
fthr_shaftTopRoundnessModifierUpperValue = 0.0;
fthr_shaftBottomRoundnessModifierLowerPosition = 0.0;
fthr_shaftBottomRoundnessModifierLowerValue = 1.0;
fthr_shaftBottomRoundnessModifierMiddlePosition = 0.35;
fthr_shaftBottomRoundnessModifierMiddleValue = -1.0;
fthr_shaftBottomRoundnessModifierUpperPosition = 1.0;
fthr_shaftBottomRoundnessModifierUpperValue = 0.0;
fthr_shaftVanePositionLowerPositionRight = 0.0;
fthr_shaftVanePositionLowerValueRight = 0.5;
fthr_shaftVanePositionMiddlePositionRight = 0.5;
fthr_shaftVanePositionMiddleValueRight = 0.5;
fthr_shaftVanePositionUpperPositionRight = 1.0;
fthr_shaftVanePositionUpperValueRight = 0.5;
fthr_shaftVanePositionLowerPositionLeft = 0.0;
fthr_shaftVanePositionLowerValueLeft = 0.5;
fthr_shaftVanePositionMiddlePositionLeft 0.5;
fthr_shaftVanePositionMiddleValueLeft = 0.5;
fthr_shaftVanePositionUpperPositionLeft = 1.0;
fthr_shaftVanePositionUpperValueLeft = 0.5;
fthr_shaftVaneOrientationLowerPositionRight = 0.0; # M shape
fthr_shaftVaneOrientationLowerValueRight = 0;
fthr_shaftVaneOrientationMiddlePositionRight = 0.5;
fthr_shaftVaneOrientationMiddleValueRight =
fthr_shaftVaneOrientationLowerValueRight;
fthr_shaftVaneOrientationUpperPositionRight = 1.0;
fthr_shaftVaneOrientationUpperValueRight = 0;
fthr_shaftVaneOrientationLowerPositionLeft =
fthr_shaftVaneOrientationLowerPositionRight;
fthr_shaftVaneOrientationLowerValueLeft =
fthr_shaftVaneOrientationLowerValueRight;
fthr_shaftVaneOrientationMiddlePositionLeft =
fthr_shaftVaneOrientationMiddlePositionRight;
fthr_shaftVaneOrientationMiddleValueLeft =
fthr_shaftVaneOrientationMiddleValueRight;
fthr_shaftVaneOrientationUpperPositionLeft =
fthr_shaftVaneOrientationUpperPositionRight;
fthr_shaftVaneOrientationUpperValueLeft =
fthr_shaftVaneOrientationUpperValueRight;
## vane width ######
OVERALL FEATHER WIDTH ####

fthr_vaneWidthRight = 1.75 * length * (1-(hair_on_off* .4) + .01);
fthr_vaneWidthRight = (head_matte > 0 && fthr_len < .041)
? fthr_vaneWidthRight * .70 : fthr_vaneWidthRight;
fthr_vaneWidthRight = fthr_vaneWidthRight - (wing_fthr_len * .10);
fthr_vaneWidthLeft = fthr_vaneWidthRight;
## vane shape #########
OVERALL FEATHER SHAPE ####

fthr_vaneBeginRight = 0.01;
#where barbs begin on shaft length ##base attrs ##
fthr_vaneBeginTangentRight = 45;
fthr_vaneBeginScaleRight = .61;
fthr_vaneLowerRight = 0.39;
fthr_vaneLowerTangentRight = -14.5;
fthr_vaneLowerScaleRight = 0.99;
fthr_vaneLowerWidthRight = .56;
fthr_vaneUpperRight = 0.86;
fthr_vaneUpperTangentRight = 25; #changes tip shape significantly
fthr_vaneUpperScaleRight = 0.55;
fthr_vaneUpperWidthRight = .53;
fthr_vaneUpperWidthRight = fthr_vaneUpperWidtlRight - .16 * var_c;
fthr_vaneEndTangentRight = 0;
fthr_vaneEndScaleRight = 0.10;
fthr_vaneTip WidthRight = 0.1; #tip point on fthr
fthr_vaneTipHeightRight = .95 + 3.0 * hair_den * head_matte;
fthr_vaneTipHeightRight = fthr_vaneTipHeightRight +
(1 - fthr_len) * 3;
fthr_vaneTipHeightRight = fthr_vaneTipHeightRight * .7;
fthr_vaneTipHeightRight = fthr_vaneTipHeightRight *
pow((1-wing_fthr_len),2);
fthr_vaneTipHeightRight = fthr_vaneTipHeightRight * fthr_shaftLength;
#needed by current Rman DSO. Do not Change
fthr_vaneCurvatureLowerPositionRight = 0.0;
fthr_vaneCurvatureLowerValueRight = -0.06;
fthr_vaneCurvatureMiddlePositionRight = 0.4;
fthr_vaneCurvatureMiddleValueRight = (-0.05 *
(1-wing_matte)); # curve for all of mar except wings
fthr_vaneCurvatureMiddleValueRight =
fthr_vaneCurvatureMiddleValueRight +
0.02 * wing_matte;   #curve for wings
fthr_vaneCurvatureMiddleValueRight =
fthr_vaneCurvatureMiddleValueRight
+ -0.06 * var_b;       #addtl curve on leading edge
fthr_vaneCurvatureLowerPositionRight = 0.0;
fthr_vaneCurvatureLowerValueRight =
fthr_vaneCurvatureMiddleValueRight;
fthr_vaneCurvatureUpperPositionRight = 1.0;
fthr_vaneCurvatureUpperValueRight = 0.0;
left params ########

fthr_vaneBeginLeft = fthr_vaneBeginRight;
fthr_vaneBeginTangentLeft = fthr_vaneBeginTangentRight;
fthr_vaneBeginScaleLeft = fthr_vaneBeginScaleRight;
fthr_vaneLowerLeft = fthr_vaneLowerRight;
fthr_vaneLowerTangentLeft = fthr_vaneLowerTangentRight;
fthr_vaneLowerScaleLeft = fthr_vaneLowerScaleRight;
fthr_vaneLowerWidthLeft = fthr_vaneLowerWidthRight;
fthr_vaneUpperLeft = fthr_vaneUpperRight;
fthr_vaneUpperTangentLeft = fthr_vaneUpperTangentRight;
fthr_vaneUpperScaleLeft = fthr_vaneUpperScaleRight;
fthr_vaneUpperWidthLeft = fthr_vaneUpperWidthRight;
fthr_vaneEndTangentLeft = fthr_vaneEndTangentRight;
fthr_vaneEndScaleLeft = fthr_vaneEndScaleRight;
fthr_vaneTip WidthLeft = fthr_vaneTipWidthRight;
fthr_vaneTipHeightLeft = fthr_vaneTipHeightRight;
fthr_vaneCurvatureLowerPositionLeft =
fthr_vaneCurvatureLowerPositionRight;
fthr_vaneCurvatureLowerValueLeft =
fthr_vaneCurvatureLowerValueRight;
fthr_vaneCurvatureMiddlePositionLeft =
fthr_vaneCurvatureMiddlePositionRight;
fthr_vaneCurvatureMiddleValueLeft =
fthr_vaneCurvatureMiddleValueRight;
fthr_vaneCurvatureUpperPositionLeft =
```

Example Listing C

```
fthr_vaneCurvatureUpperPositionRight;
fthr_vaneCurvatureUpperValueLeft =
fthr_vaneCurvatureUpperValueRight;
###########################
fthr_separation = (is_flight > 0) ? 2 : 0;
fthr_separationVariation = (is_flight > 0) ? 2 : 0;
fthr_separationSkew = (is_flight > 0) ? 0.06 : 0;
fthr_separationWaviness = (is_flight > 0) ? 0.0 : 0;
fthr_separationProbabilityLowerPosition = (is_flight > 0) ? 0 : 0;
fthr_separationProbabilityLowerValue = (is_flight > 0) ? 1 : 1.0;
fthr_separationProbabilityMiddlePosition = (is_flight > 0) ? 0.8 : 0.5;
fthr_separationProbabilityMiddleValue = (is_flight > 0) ? .75 : 1.0;
fthr_separationProbabilityUpperPosition = (is_flight > 0) ? 0.825 : 1;
fthr_separationProbabilityUpperValue = (is_flight > 0) ? 0.0 : 1;
######## BARB PARAMS ##########

fthr_barbSkewLowerPositionRight = 0.0;
fthr_barbSkewLowerValueRight = 0.08;
fthr_barbSkewMiddlePositionRight = 0.63;
fthr_barbSkewMiddleValueRight = 0.10;
fthr_barbSkewMiddleValueRight =
fthr_barbSkewMiddleValueRight + .7 * var_c;
fthr_barbSkewUpperPositionRight = 1.0;
fthr_barbSkewUpperValueRight = 0.00;
fthr_barbCurvatureLowerPositionRight = 0.0;
fthr_barbCurvatureLowerValueRight = .45;
fthr_barbCurvatureMiddlePositionRight = 0.64;
fthr_barbCurvatureMiddleValueRight = 0.2;
fthr_barbCurvatureMiddleValueRight =
fthr_barbCurvatureMiddleValueRight + .6 * var_c;
fthr_barbCurvatureUpperPositionRight = 1.0;
fthr_barbCurvatureUpperValueRight = −0.05;
fthr_barbCurvatureUpperValueRight =
fthr_barbCurvatureUpperValueRight − .26 * var_c;
fthr_barbCurvaturePowerLowerValueRight = 1.0;
fthr_barbCurvaturePowerMiddleValueRight = 0.8;
fthr_barbCurvaturePowerMiddleValueRight =
fthr_barbCurvaturePowerMiddleValueRight + .6 * var_c;
fthr_barbCurvaturePowerUpperValueRight = 1.0;
## left params ########
fthr_barbSkewLowerPositionLeft = fthr_barbSkewLowerPositionRight;
fthr_barbSkewLowerValueLeft = fthr_barbSkewLowerValueRight;
fthr_barbSkewMiddlePositionLeft = fthr_barbSkewMiddlePositionRight;
fthr_barbSkewMiddleValueLeft = fthr_barbSkewMiddleValueRight;
fthr_barbSkewUpperPositionLeft = fthr_barbSkewUpperPositionRight;
fthr_barbSkewUpperValueLeft = fthr_barbSkewUpperValueRight;
fthr_barbCurvatureLowerPositionLeft =
        fthr_barbCurvatureLowerPositionRight;
fthr_barbCurvatureLowerValueLeft =
        fthr_barbCurvatureLowerValueRight;
fthr_barbCurvatureMiddlePositionLeft =
        fthr_barbCurvatureMiddlePositionRight;
fthr_barbCurvatureMiddleValueLeft =
        fthr_barbCurvatureMiddleValueRight;
fthr_barbCurvatureUpperPositionLeft =
        fthr_barbCurvatureUpperPositionRight;
fthr_barbCurvatureUpperValueLeft =
        fthr_barbCurvatureUpperValueRight;
fthr_barbCurvaturePowerLowerValueLeft =
fthr_barbCurvaturePowerLowerValueRight;
fthr_barbCurvaturePowerMiddleValueLeft =
fthr_barbCurvaturePowerMiddleValueRight;
fthr_barbCurvaturePowerUpperValueLeft =
fthr_barbCurvaturePowerUpperValueRight;
###### RICURVES ####################
DOWN ###

fthr_downHairRight = 1; #down hair 0 is no down hair.
If 1 then all down    #SOLID or DOWNY
fthr_downHairRight = (is_flight > 0) ? 0 : fthr_downHairRight;
fthr_downHairLeft = fthr_downHairRight;
fthr_downHairDensityRight = 10 + 8 * (1 − fthr_len * .8) *
                (1−(hair_den * head_matte));
fthr_downHairDensityRight = fthr_downHairDensityRight +
        (wing_matte * (back_matte * .5 + .5)) *
        ((wing_fthr_len − .3) * fthr_downHairDensityRight * 0.9);
# increases down density on longer back of wing fthrs only
fthr_downHairDensityRight =
fthr_downHairDensityRight − down_map * 13;
fthr_downHairDensityRight = (is_flight > 0)
? fthr_downHairDensityRight * 20:
fthr_downHairDensityRight;
fthr_downHairDensityRight =
fthr_downHairDensityRight * down_expedia;
fthr_downHairDensityLeft =
fthr_downHairDensityRight;
fthr_downHairWidthRight =
0.015 − ((length + hair_on_off)/2 * .007) ;
fthr_downHairWidthRight =
fthr_downHairWidthRight * (1 + down_map * .3);
fthr_downHairWidthRight =
(is_flight > 0)
? fthr_downHairWidthRight * .7 : fthr_downHairWidthRight;
fthr_downHairWidthRight =
fthr_downHairWidthRight * (1/down_expedia);
fthr_downHairWidthLeft =
fthr_downHairWidthRight;
fthr_downHairWidthTaperRight (is_flight > 0) ? .3 : .45;
fthr_downHairWidthTaperLeft = fthr_downHairWidthTaperRight;
fthr_downHairSkewRight = 0.2 * down_map;
fthr_downHairSkewLeft = fthr_downHairSkewRight;
fthr_downHairWavinessRight = down_map * .05;
fthr_downHairWavinessLeft = fthr_downHairWavinessRight;
fthr_downHairTransitionPowerRight = 4;
#transition of skew and waviness to 0 at base of vein
fthr_downHairTransitionPowerRight = (is_flight > 0) ? 8 :
fthr_downHairTransitionPowerRight;
fthr_downHairTransitionPowerLeft =
        fthr_downHairTransitionPowerRight;
###FEATHER TIP ###

fthr_tipHairRight = 1; #if 1 no effect
fthr_tipHairLeft = 1;
fthr_tipHairDensityRight = .5;
fthr_tipHairDensityLeft = fthr_tipHairDensityRight;
fthr_tipHairVariationRight = 0;
fthr_tipHairVariationLeft = 0;
fthr_tipHairLengthRight = 1.0;
fthr_tipHairLengthLeft = 1.0;
fthr_tipHairWidthRight = 0.005;
fthr_tipHairWidthLeft = 0.005;
fthr_tipHairWidthTaperRight = 1;
fthr_tipHairWidthTaperLeft = fthr_tipHairWidthTaperRight;
fthr_tipHairSkewRight = 0;
fthr_tipHairSkewLeft = 0;
fthr_tipHairWavinessRight = 0;
fthr_tipHairWavinessLeft = 0;
fthr_tipHairTransitionPowerRight = 1;
fthr_tipHairTransitionPowerLeft = 1;
HAIR PARAMS ######

hair_scale = vector(1,1,1);
hair_length = .4 * hair_len * randval(0,2.0,fthr_id*6);
hair_width = 0.011 * (1/hair_expedia);
hair_widthTaper = 0.2;
hair_widthTaperPower = 0.5;

inst_id = fthr_id;
inst_scale = (inst_type == 2) ? fthr_scale : ( (inst type == 1)
? hair_scale : vector(1));
inst_length = (inst_type == 2) ? fthr_shaftLength : ( (inst_type == 1)
? hair_length : 1);
inst_length = (inst_length < 0 ) ? 0 : inst_length;
inst_type = in_int_set(default_off_list_path, inst_id) ? 0 : inst_type;
inst_type = in_int_set(off_list_path, inst_id) ? 0 : inst_type;
inst_type = (on_list_valid == 0) ? inst_type :
        in_int_set(on_list_path, inst_id) ? inst_type : 0;
```

Example Listing D

```
# ----------------------------------------------------------------

# Example execution control expression file.

# In a "normal" final execution step, we would execute "switch_2d_vd"
# (unlocked feather driver method; last call in script below).
# This in turn would initiate calls to
#      switch_fixed
#      hair_clump
#      puffy
#      instance_2d_vd
#      instance_static

#However, we could also execute "instance_static" or
# "instance_2d_vd" or any other solution to see or test their result
# exclusively. For example, if we didn't want to render the flight feathers
# for some reason (e.g. to save time), we could just execute
# "switch_fixed". Or, if we didn't want any clumping, "hair_clump"
# could be skipped, by putting "puffy" instead of "hair_clump" into the
# "switch_fixed" call.

# ----------------------------------------------------------------
# actual frame number (integral frame + motion blur time sample offset.

subframe = frame + frame_offset;
# select different character model based on frame number.

inst_pit_path_orig = inst_pit_path;
inst_pit_path = (subframe < alt_frame_begin) ? inst_pit_path_orig :
                inst_pit_path_alt
inst_pit_path = (subframe > alt_frame_end) ? inst_pit_path_orig :
                inst_pit_path;
inst_pit_scene_path = inst_pit_path + "/scene:pit";
# instance feathers and hair ("normal" pipeline execution).

instance_static = instance(static_tri_path, inst_pit_path, " ", subframe,
        ctrl_frame);
# instance feathers and hair ("unlocked feather driver method"
# pipeline execution).

instance_2d_vd = vd_solve(instance_static, inst_pit_scene_path,
        srf_list_path, offset_path, inst_global_scale,
        subframe);
# add puffing of feathers and hair.

puffy = puff_effect(instance_2d_vd, puffiness);
# add clumping of hair.

hair clump = hair_clump_effect
(puffy, hair_clump_percent, hair_clump_rate,
        hair_clump_center);
# swap in hand-fixed feathers (generated in from previous loop and
# hand-edited).

switch_fixed =
proxy_switch(inst_fix_prxy_path, inst_fix_pit_path, subframe,
        fix_prxy_frame, hair_clump);
# swap in hand-animated flight feathers.
switch_2d_vd =
proxy_switch(inst_prxy_path, inst_pit_path, subframe,
        −1, switch_fixed);
```

What is claimed is:

1. A computer-readable medium storing a computer program for digitally representing a plurality of surface-attached geometric objects on a model, the program comprising executable instructions that cause a computer to:

generate and place a plurality of particles on a first set of predetermined locations on a patch of surface of the model to produce over the surface a non-uniform density of the plurality of particles;

generate a first plurality of curves, each curve of the first plurality of curves including at least one control point;

place each of the first plurality of curves at a second set of predetermined locations on the model;

define a flat ribbon including segments separated at the at least one control point on at least one curve of the first plurality of curves;

twist at least one segment of the segments of the flat ribbon by rotating the at least one segment about a central axis of the flat ribbon at the at least one control point of the at least one curve;

determine, for each particle of the plurality of particles, locations of a group of three of the first plurality of curves that form a triangle enclosing the particle, and weights of each curve in the group of three relative to the particle;

generate a second plurality of curves at the first set of predetermined locations of the plurality of particles on the surface by interpolating, for each particle of the plurality of particles, the group of three of the first plurality of curves according to the weights;

generate the plurality of surface-attached geometric objects;

replace the plurality of particles and the second plurality of curves with the plurality of surface-attached geometric objects to produce over the surface a non-uniform density of the plurality of surface-attached geometric objects; and display at least one of the plurality of surface-attached geometric objects.

2. The computer-readable medium recited in claim 1, wherein placing the plurality of particles on a surface of the model comprises manually placing particles on the surface of the model.

3. The computer-readable medium recited in claim 2, wherein the surface of the model includes points designated by a parametric (u, v) coordinate system, the particles being placed on the surface at the points.

4. The computer-readable medium recited in claim 1, wherein placing the plurality of particles on the surface of the model comprises automatically placing particles on a surface by determining a desired density of surface-attached geometric objects on the model and calculating a number of particles to be placed on the surface.

5. The computer-readable medium recited in claim 4, further comprising manually adding, deleting or adjusting particular ones of the plurality of particles.

6. The computer-readable medium recited in claim 4, wherein calculating a number of particles to be placed on the surface comprises specifying density values to calculate the number and position of particles on the surface.

7. The computer-readable medium recited in claim 6, wherein specifying density values comprises subdividing the surface into N×M sub-surfaces, where N+1×M+1 is a resolution of a density map.

8. The computer-readable medium recited in claim 7, wherein calculating the number and position of particles on the surface comprises averaging density map values at vertices of each of the N×M sub-surfaces and multiplying by a global density value to obtain a first result.

9. The computer-readable medium recited in claim 8, wherein calculating the number and position of particles on the surface further comprises:

multiplying the first result by an area of each sub-surface to obtain the number of particles; and randomly generating the position of particles on each sub-surface.

10. The computer-readable medium recited in claim 1, wherein placing the plurality of particles on a surface of the model comprises automatically placing the plurality of particles on a plurality of surfaces of the model by reading a plurality of density maps corresponding to the plurality of surfaces and distributing the plurality of particles over the plurality of surfaces using a particle repulsion algorithm until a predetermined level of equilibrium is achieved.

11. The computer-readable medium recited in claim 10, further comprising manually adding, deleting or adjusting particular ones of the plurality of particles.

12. The computer-readable medium recited in claim 1, wherein placing each of the first plurality of curves at locations on the model comprises manually placing each of the first plurality of curves.

13. The computer-readable medium recited in claim 1, wherein placing each of the first plurality of curves at locations on the model comprises automatically placing each of the first plurality of curves at locations across multiple surfaces based on areas of the multiple surfaces.

14. The computer-readable medium recited in claim 1, wherein the program further comprises executable instructions to define a characteristic including at least one of an orientation and a bend of at least one of the first plurality of curves.

15. The computer-readable medium recited in claim 14, wherein the program further comprises executable instructions to deform the base shape of the surface-attached geometric objects according to the characteristic.

16. The computer-readable medium recited in claim 1, wherein the program further comprises executable instructions to define a combing direction curve of at least one curve of the first plurality of curves.

17. The computer-readable medium recited in claim 1, wherein the program further comprises executable instructions to define an articulated chain over at least one curve of the first plurality of curves, the chain having n-i segments for n control points of the at least one curve, wherein when the chain is deformed, the underlying at least one curve correspondingly changes.

18. The computer-readable medium recited in claim 17, wherein multiple curves are assigned to the chain and wherein when the chain is deformed, the multiple curves correspondingly deform.

19. The computer-readable medium recited in claim 1, wherein the triangles are formed by two dimensional Delaunay triangulation and wherein the weights are calculated using barycentric coordinates.

20. The computer-readable medium recited in claim 1, wherein the model is a static model and wherein the program further comprises executable instructions to:
map the groups of three of the first plurality of curves that form triangles onto an animated model such that the groups of three curves are defined in a local coordinate space of the surface;
transform the groups of three curves to a common coordinate system; and
interpolate by vector addition using the group location and weights, in an iterative manner, to obtain a final interpolated curve for each particle on the surface.

21. The computer-readable medium recited in claim 20, wherein the final interpolated curves include the at least one of an orientation, a bend, and a twist.

22. The computer-readable medium recited in claim 20, wherein the program further comprises executable instructions to scale the final interpolated curves to a defined length according to a scaling algorithm.

23. The computer-readable medium recited in claim 20, wherein the executable instructions to generate a plurality of surface-attached geometric objects comprise instructions to:
evaluate at least one expression;
generate information based on the at least one expression for each surface-attached geometric object to be attached at a particle location; and
generate for each of the plurality of particles, in an iterative manner, a surface-attached geometric object having a base shape defined, at least in part, by the information.

24. The computer-readable medium recited in claim 23, wherein the at least one expression is at least one of a static expression, a dynamic expression and an execution control expression.

25. The computer-readable medium recited in claim 23, wherein the program further comprises executable instructions to apply fx attributes to surface-attached geometric objects to be attached at a particle location.

26. The computer-readable medium recited in claim 23, wherein the executable instructions to generate a plurality of surface-attached geometric objects further comprise manually animating at least one of the generated surface-attached geometric objects.

27. The computer-readable medium recited in claim 23, wherein said evaluating at least one expression comprises evaluating an execution control expression including a blend region defining a portion of the model, the blend region including a plurality of sections defining at least one of different animation methods and different parameters for an animation method.

28. The computer-readable medium recited in claim 27, wherein the plurality of sections comprises a plurality of spheres including an inner sphere as a first section, an outer sphere as a second section, and an area located outside of both the inner sphere and the outer sphere as a third section.

29. The computer-readable medium recited in claim 27, wherein the blend region is animated.

30. The computer-readable medium recited in claim 23, wherein evaluating at least one expression comprises evaluating an execution control expression for graphically simulating moisture on surface-attached geometric objects.

31. The computer-readable medium recited in claim 30, wherein the surface-attached geometric objects are feathers and wherein graphically simulating moisture on surface-attached geometric objects comprises:
defining a plurality of linear clumps along a shaft of a feather, each of the plurality of linear clumps having a center barb and a plurality of lateral barbs located on at least one side of the center barb; and
selectively clumping a number of the plurality of lateral barbs of at least one of the plurality of linear clumps to their respective center barb.

32. The computer-readable medium recited in claim 31, wherein the number of the plurality of lateral barbs selectively clumped to their respective center barb is based on at least one of clump-density, clump-size, clump-percent and clump-rate.

33. The computer-readable medium recited in claim 23, wherein evaluating at least one expression comprises evaluating an execution control expression for graphically simulating wind effects on surface-attached geometric objects.

34. The computer-readable medium recited in claim 33, wherein graphically simulating wind effects on surface-attached geometric objects comprises generating pseudo-random movement of the surface-attached geometric objects using a noise function.

35. The computer-readable medium recited in claim 34, wherein the noise function generates a continuous movement of the surface-attached geometric object.

36. The computer-readable medium recited in claim 34, wherein the noise function comprises a mixture of a plurality of frequencies.

37. The computer-readable medium recited in claim 34, wherein an amplitude of the noise function is controllable.

38. The computer-readable medium recited in claim 34, wherein at least one of a frequency and a direction of the noise function is controllable.

39. The computer-readable medium recited in claim 34, wherein using a noise function comprises:
    accessing a pseudo-random number field to obtain a perturbation vector for at least one surface-attached geometric object; and
    applying the perturbation vector to the at least one surface-attached geometric object such that the surface-attached geometric object is oriented in a particular direction based on the perturbation vector.

40. The computer-readable medium recited in claim 39, wherein accessing a pseudo-random number field comprises using a look-up function to access the pseudo-random number field.

41. The computer-readable medium recited in claim 39, wherein the perturbation vector is obtained based on the original position of the at least one surface-attached geometric object.

42. The computer-readable medium recited in claim 39, wherein a corresponding perturbation vector is obtained for each surface-attached geometric object.

43. The computer-readable medium recited in claim 39, wherein the perturbation vector is transformed into a local coordinate space of the at least one surface-attached geometric object.

44. The computer-readable medium recited in claim 39, wherein the perturbation vector is applied to each of a plurality of control points on the at least one surface-attached geometric object.

45. The computer-readable medium recited in claim 20, wherein the program further comprises executable instructions to determine for each of a plurality of control points on a generated surface-attached geometric object, in an iterative manner, a distance between a particular control point and a point on a surface of the static model.

46. The computer-readable medium recited in claim 45, wherein determining a distance between a particular control point and a point on a surface of the static model comprises:
    determining particular ones of a plurality of surface points that have a surface normal that passes through both the particular ones of the plurality of surface points and the particular control point;
    determining a surface point of the determined particular ones of the plurality of surface points that is closest to the particular control point; and
    determining the distance between the particular point and the closest surface point.

47. The computer-readable medium recited in claim 46, wherein the program further comprises executable instructions to attach the particular control point to the closest surface point in a static pose of the model.

48. The computer-readable medium recited in claim 46, wherein the program further comprises executable instructions to:
    generate a surfaces list listing surfaces on the model; and
    define at least one of permissible ones of the surfaces and permissible portions of ones of the surfaces for which a closest surface point may be found for a control point on the generated surface-attached geometric object.

49. The computer-readable medium recited in claim 46, wherein the program further comprises executable instructions to:
    determine a surface normal of a base point;
    estimate a surface normal of a closest point on the model to a first control point of the generated surface-attached geometric object to be equal to a surface normal of the base point;
    determine as an estimated closest surface point on the model to the first control point a first intersection point with an underlying surface by raycasting along the estimated surface normal of the closest point on the model to the first control point from the first control point; and
    determine as a first estimated offset of the first control point a distance between the first control point and the first intersection point.

50. The computer-readable medium recited in claim 49, wherein determining a surface normal of a base point comprises determining a surface normal of a base point where the generated surface-attached geometric object attaches to the model.

51. The computer-readable medium recited in claim 49, wherein the surface-attached geometric object is a feather and wherein determining a surface normal of a base point comprises determining a surface normal of a base point where a control point of a vane of the feather attaches to a shaft of the feather.

52. The computer-readable medium recited in claim 49, wherein the program further comprises executable instructions to:
    estimate a surface normal of a closest point on the model to the first control point to be equal to the actual surface normal of the first intersection point;
    determine as an estimated closest surface point on the model to the first control point a second intersection point with an underlying surface by raycasting along the estimated surface normal of the closest point on the model to the first control point from the first control point; and
    determine as a second estimated offset of the first control point a distance between the first control point and the second intersection point.

53. The computer-readable medium recited in claim 52, wherein the program further comprises executable instructions to:
    estimate a surface normal of a closest point on the model to a second control point of the generated surface-attached geometric object to be equal to the actual surface normal of the second intersection point;
    determine as an estimated closest surface point on the model to the second control point a third intersection point with the underlying surface by raycasting along the estimated surface normal of the closest point on the model to the second control point from the second control point; and
    determine as a first estimated offset of the second control point a distance between the second control point and the third intersection point.

54. The computer-readable medium recited in claim 53, wherein the program further comprises executable instructions to:
    estimate a surface normal of a closest point on the model to the second control point to be equal to the actual surface normal of the third intersection point;

determine as an estimated closest surface point on the model to the second control point a fourth intersection point with an underlying surface by raycasting along the estimated surface normal of the closest point on the model to the second control point from the second control point; and determine as a second estimated offset of the second control point a distance between the second control point and the fourth intersection point.

55. The computer-readable medium recited in claim 45, wherein said determining a distance between a particular control point and a point on a surface of the static model comprises determining a distance between a particular control point and a closest surface point of a plurality of surface points below the particular control point.

56. The computer-readable medium recited in claim 45, wherein the program further comprises executable instructions to offset the particular control point from a point on the surface by the determined distance along a surface normal during animation of the model.

57. The computer-readable medium recited in claim 56, wherein the program further comprises executable instructions to:

determine a surface normal of a base point;

estimate a surface normal of a closest point on the model to a first control point of the generated surface-attached geometric object to be equal to a surface normal of the base point;

estimate an initial position of the first control point by adding a vector between the base point and the first control point to the base point;

determine as an estimated closest surface point on the model to the first control point a first intersection point with an underlying surface by raycasting along the estimated surface normal of the closest point on the model to the first control point from the estimated initial position of the first control point; and offset the initial position of the first control point to a first offset position of the first control point from the first intersection point by a first determined distance along an actual surface normal of the first intersection point.

58. The computer-readable medium recited in claim 57, wherein determining a surface normal of a base point comprises determining a surface normal of a base point where the generated surface-attached geometric object attaches to the model.

59. The computer-readable medium recited in claim 57, wherein the surface-attached geometric object is a feather and wherein determining a surface normal of a base point comprises determining a surface normal of a base point where a control point of a vane of the feather attaches to a shaft of the feather.

60. The computer-readable medium recited in claim 57, wherein the program further comprises executable instructions to:

estimate a surface normal of a closest point on the model to the first offset position of the first control point to be equal to the actual surface normal of the first intersection point;

determine as an estimated closest surface point on the model to the first offset position of the first control point a second intersection point with an underlying surface by raycasting along the estimated surface normal of the closest point on the model to the first offset position of the first control point from the first offset position of the first control point; and offset the first offset position of the first control point to a second offset position of the first control point from the second intersection point by the first determined distance along an actual surface normal of the second intersection point.

61. The computer-readable medium recited in claim 50, wherein the program further comprises executable instructions to:

estimate a surface normal of a closest point on the model to a second control point of the generated surface-attached geometric object to be equal to the actual surface normal of the second intersection point;

estimate an initial position of the second control point by adding a vector between the first control point and the second control point to the second offset position of the first control point;

determine as an estimated closest surface point on the model to the second control point a third intersection point with the underlying surface by raycasting along the estimated surface normal of the closest point on the model to the second control point from the estimated initial position of the second control point; and offset the initial position of the second control point to a first offset position of the second control point from the third intersection point by a second determined distance along an actual surface normal of the third intersection point.

62. The computer-readable medium recited in claim 61, wherein the program further comprises executable instructions to:

estimate a surface normal of a closest point on the model to the first offset position of the second control point to be equal to the actual surface normal of the third intersection point;

determine as an estimated closest surface point on the model to the first offset position of the second control point a fourth intersection point with an underlying surface by raycasting along the estimated surface normal of the closest point on the model to the first offset position of the second control point from the first offset position of the second control point; and offset the first offset position of the second control point to a second offset position of the second control point from the fourth intersection point by the second determined distance along an actual surface normal of the fourth intersection point.

63. The computer-readable medium recited in claim 56, wherein the program further comprises executable instructions to:

maintain the attachment; and offset along a surface normal of the attachment point the particular control point from the attachment point by the determined distance during animation of the model.

64. The computer-readable medium recited in claim 56, wherein the program further comprises executable instructions to automatically generate animated curves to be used with the animated model to match animation of at least one of the plurality of surface-attached geometric objects to the animated model.

65. The computer-readable medium recited in claim 64, wherein automatically generating animated curves comprises:

attaching control points of the first plurality of curves to a corresponding estimated closest point on a surface of the model in a static pose;

recording a distance between each of the control points and its corresponding estimated closest point; and offsetting, during animation of the model, each of the control points from its corresponding attachment point by the recorded distance along a surface normal of the corresponding attachment point.

66. The computer-readable medium recited in claim 65, wherein lengths of the animated curves are adjusted to be approximately the same as lengths of the first plurality of curves.

67. The computer-readable medium recited in claim 64, wherein the model includes a sheath of manually animated surface-attached geometric objects for facilitating automated animation of the plurality of surface-attached geometric objects.

68. The computer-readable medium recited in claim 20, wherein the program further comprises executable instructions to shade each surface-attached geometric object to be attached at a particle location.

69. The computer-readable medium recited in claim 68, wherein shading each surface-attached geometric object comprises:
   determining portions of a surface-attached geometric object to be shaded;
   determining parameter values for particular regions of the model;
   generating patterns to define color variations on the surface-attached geometric object using the parameter values; and
   calculating lighting components for the surface-attached geometric object.

70. The computer-readable medium recited in claim 69, wherein the program further comprises executable instructions to add post-shading color corrections.

71. The computer-readable medium recited in claim 69, wherein the surface-attached geometric object represents a feather and wherein determining portions of a surface-attached geometric object comprises determining a left vane, a right vane, and a central shaft.

72. The computer-readable medium recited in claim 69, wherein the model represents a bird and wherein determining parameter values for particular regions of the model comprises determining different parts of the body of the bird, the different parts being represented by different region maps having different parameter values.

73. The computer-readable medium recited in claim 72, wherein the region maps define soft transitions between the particular regions.

74. The computer-readable medium recited in claim 69, wherein the parameter values are at least one of specularity, color and opacity.

75. The computer-readable medium recited in claim 69, wherein generating patterns to define color variations on the surface-attached geometric object comprises randomizing textures among a plurality of the surface-attached geometric objects.

76. The computer-readable medium recited in claim 69, wherein the surface-attached geometric object represents a feather and wherein calculating lighting components for the surface-attached geometric object comprises:
   generating an image of flight feathers wherein the flight feathers are shaded semi-transparent from a camera view; and
   projecting the image onto the flight feathers at render time to provide backlighting for the flight feathers.

77. The computer-readable medium recited in claim 76, wherein the program further comprises executable instructions to align (u, v) parameters of vanes of the flight feathers with a direction of barbs of the flight feathers.

78. The computer-readable medium recited in claim 76, wherein the program further comprises executable instructions to:
   determine a distance between an occluding point and a light; and
   calculate a difference between a distance of a shading point on the feather from the light and the occluding point distance.

79. The computer-readable medium recited in claim 1, wherein replacing the plurality of particles and the second plurality of curves with the plurality of surface-attached geometric objects comprises rendering the plurality of surface-attached geometric objects.

80. A computer-readable medium storing a computer program for digitally representing a plurality of surface-attached geometric objects on a model, the program comprising executable instructions that cause a computer to:
   generate and place a plurality of particles on a first set of predetermined locations on a patch of surface of the model;
   generate a first plurality of curves, each curve of the first plurality of curves including at least one control point;
   place each of the first plurality of curves at a second set of predetermined locations on the model;
   define a flat ribbon including segments separated at the at least one control point on at least one curve of the first plurality of curves;
   twist at least one segment of the segments of the flat ribbon by rotating the at least one segment about a central axis of the flat ribbon at the at least one control point of the at least one curve;
   determine, for each particle of the plurality of particles, locations of a group of three of the first plurality of curves that form a triangle enclosing the particle, and weights of each curve in the group of three relative to the particle;
   generate a second plurality of curves at the first set of predetermined locations of the plurality of particles on the surface by interpolating, for each particle of the plurality of particles, the group of three of the first plurality of curves according to the weights;
   generate the plurality of surface-attached geometric objects;
   replace the plurality of particles and the second plurality of curves with the plurality of surface-attached geometric objects;
   estimate, for each of a plurality of control points of the at least one of the first plurality of curves, a closest surface point on the model;
   attach each of the plurality of control points to its corresponding closest surface point in a static pose of the model;
   determine a distance between each of the plurality of control points and its corresponding closest surface point;
   maintain the attachment and offset along a surface normal of the corresponding attachment point each of the plurality of control points from its corresponding attachment point by the determined distance during animation of the model; and
   display at least one of the plurality of surface-attached objects.

81. A system for digitally representing a plurality of surface-attached geometric objects on a model, the system comprising:
   a particle generation sub-module to generate and place a plurality of particles on a first set of predetermined locations on a patch of surface of the model to produce over the surface a non-uniform density of the plurality of particles;

a key-curve sub-module to generate a first plurality of curves, each of the first plurality of curves including at least one control point, and place each of the first plurality of curves at a second set of predetermined locations on the model;

a base geometric object instancer to define a flat ribbon including segments separated at the at least one control point on at least one curve of the first plurality of curves, and twist at least one segment of the segments of the flat ribbon by rotating the at least one segment about a central axis of the flat ribbon at the at least one control point of the at least one curve;

a key-curve triangulation module to determine, for each particle of the plurality of particles, locations of a group of three of the first plurality of curves that form a triangle enclosing the particle, and weights of each curve in the group of three relative to the particle;

a curve/ribbon interpolation sub-module to generate a second plurality of curves at the first set of predetermined locations of the plurality of particles on the surface by interpolating, for each particle of the plurality of particles, the group of three of the first plurality of curves according to the weights;

a shaped geometric object generation sub-module to generate the plurality of surface-attached geometric objects;

a final geometric object generation sub-module to define at least one characteristic of at least one of the plurality of surface-attached geometric objects, and replace the plurality of particles and the second plurality of curves with the plurality of surface-attached geometric objects to produce over the surface a non-uniform density of the plurality of surface-attached geometric objects; and a display module to display the plurality of surface-attached geometric objects.

82. The system recited in claim 81, wherein the model is a static model and wherein the key-curve triangulation module further:

maps the groups of three of the first plurality of curves that form triangles onto an animated model such that the groups of three curves are defined in a Local coordinate space of the surface;

transforms the groups of three curves to a common coordinate system; and interpolates by vector addition using the group location and weights, in an iterative manner, to obtain a final interpolated curve for each particle on the surface.

83. The system recited in claim 82, further comprising a static attribute calculation module to:

evaluate at least one expression;

generate information based on the at least one expression for each surface-attached geometric object to be attached at a particle location; and generate for each final interpolated curve, in an iterative manner, a surface-attached geometric object having a base shape defined, at least in part, by the information.

84. The system recited in claim 83, wherein the at least one expression is at least one of a static expression, a dynamic expression and an execution control expression.

85. The system recited in claim 83, wherein said base geometric object instancer further deforms the base shape of the surface-attached geometric objects according to the at least one defined characteristic.

86. The system recited in claim 83, further comprising an fx attribute application module to apply ft attributes to each surface-attached geometric object to be attached at a particle location.

87. The system recited in claim 83, further comprising an offsets calculation sub-module to determine for each of a plurality of control points on a generated surface-attached geometric object, in an iterative manner, a distance between a particular control point and a point on the surface of the static model.

88. The system recited in claim 87, wherein said offsets calculation sub-module determines the distance by:

determining particular ones of a plurality of surface points that have a surface normal that passes through both the particular ones of the plurality of surface points and the particular control point; and determining a surface point of the determined particular ones of the plurality of surface points that is closest to the particular control point; and determining the distance between the particular point and the closest surface point.

89. The system recited in claim 88, wherein said key-curve sub-module further attaches the particular control point to the closest surface point in a static pose of the model.

90. The system recited in claim 88, further comprising a geometric object driver sub-module to:

generate a surfaces list listing surfaces on the model; and define at least one of permissible ones of the surfaces and permissible portions of ones of the surfaces for which a closest surface point may be found for a control point on the generated surface-attached geometric object.

91. The system recited in claim 87, wherein determining a distance between a particular control point and a point on a surface of the static model comprises determining a distance between a particular control point and a closest surface point of a plurality of surface points below the particular control point.

92. The system recited in claim 87, wherein said geometric object driver sub-module further offsets the particular control point from a point on the surface by the determined distance along a surface normal during animation of the model.

93. The system recited in claim 92, wherein said geometric object driver sub-module further:

determines a surface normal of a base point;

estimates a surface normal of a closest point on the model to a first control point of the generated surface-attached geometric object to be equal to a surface normal of the base point;

estimates an initial position of the first control point by adding a vector between the base point and the first control point to the base point;

determines as an estimated closest surface point on the model to the first control point a first intersection point with an underlying surface by raycasting along the estimated surface normal of the closest point on the model to the first control point from the estimated initial position of the first control point; and offsets the initial position of the first control point to a first offset position of the first control point from the first intersection point by a first determined distance along an actual surface normal of the first intersection point.

94. The system recited in claim 93, wherein determining a surface normal of a base point comprises determining a surface normal of a base point where the generated surface-attached geometric object attaches to the model.

95. The system recited in claim 93, wherein the surface-attached geometric object is a feather and wherein determining a surface normal of a base point comprises determining a surface normal of a base point where a control point of a vane of the feather attaches to a shaft of the feather.

96. The system recited in claim 93, wherein said geometric object driver sub-module further:
  estimates a surface normal of a closest point on the model to the first offset position of the first control point to be equal to the actual surface normal of the first intersection point;
  determines as an estimated closest surface point on the model to the first offset position of the first control point a second intersection point with an underlying surface by raycasting along the estimated surface normal of the closest point on the model to the first offset position of the first control point from the first offset position of the first control point; and
  offsets the first offset position of the first control point to a second offset position of the first control point from the second intersection point by the first determined distance along an actual surface normal of the second intersection point.

97. The system recited in claim 96, wherein said geometric object driver sub-module further:
  estimates a surface normal of a closest point on the model to a second control point of the generated surface-attached geometric object to be equal to the actual surface normal of the second intersection point;
  estimates an initial position of the second control point by adding a vector between the first control point and the second control point to the second offset position of the first control point;
  determines as an estimated closest surface point on the model to the second control point a third intersection point with the underlying surface by raycasting along the estimated surface normal of the closest point on the model to the second control point from the estimated initial position of the second control point; and
  offsets the initial position of the second control point to a first offset position of the second control point from the third intersection point by a second determined distance along an actual surface normal of the third intersection point.

98. The system recited in claim 97, said geometric object driver sub-module further:
  estimates a surface normal of a closest point on the model to the first offset position of the second control point to be equal to the actual surface normal of the third intersection point;
  determines as an estimated closest surface point on the model to the first offset position of the second control point a fourth intersection point with an underlying surface by raycasting along the estimated surface normal of the closest point on the model to the first offset position of the second control point from the first offset position of the second control point; and
  offsets the first offset position of the second control point to a second offset position of the second control point from the fourth intersection point by the second determined distance along an actual surface normal of the fourth intersection point.

99. The system recited in claim 92, wherein said geometric object driver sub-module further:
  determines a surface normal of a base point;
  estimates a surface normal of a closest point on the model to a first control point of the generated surface-attached geometric object to be equal to a surface normal of the base point;
  determine as an estimated closest surface point on the model to the first control point a first intersection point with an underlying surface by raycasting along the estimated surface normal of the closest point on the model to the first control point from the first control point; and
  determines as a first estimated offset of the first control point a distance between the first control point and the first intersection point.

100. The system recited in claim 99, wherein determining a surface normal of a base point comprises determining a surface normal of a base point where the generated surface-attached geometric object attaches to the model.

101. The system recited in claim 99, wherein the surface-attached geometric object is a feather and wherein determining a surface normal of a base point comprises determining a surface normal of a base point where a control point of a vane of the feather attaches to a shaft of the feather.

102. The system recited in claim 99, wherein said geometric object driver sub-module further:
  estimates a surface normal of a closest point on the model to the first control point to be equal to the actual surface normal of the first intersection point;
  determines as an estimated closest surface point on the model to the first control point a second intersection point with an underlying surface by raycasting along the estimated surface normal of the closest point on the model to the first control point from the first control point; and
  determines as a second estimated offset of the first control point a distance between the first control point and the second intersection point.

103. The system recited in claim 102, wherein said geometric object driver sub-module further:
  estimates a surface normal of a closest point on the model to a second control point of the generated surface-attached geometric object to be equal to the actual surface normal of the second intersection point;
  determines as an estimated closest surface point on the model to the second control point a third intersection point with the underlying surface by raycasting along the estimated surface normal of the closest point on the model to the second control point from the second control point; and
  determines as a first estimated offset of the second control point a distance between the second control point and the third intersection point.

104. The system recited in claim 103, wherein said geometric object driver sub-module further:
  estimates a surface normal of a closest point on the model to the second control point to be equal to the actual surface normal of the third intersection point;
  determines as an estimated closest surface point on the model to the second control point a fourth intersection point with an underlying surface by raycasting along the estimated surface normal of the closest point on the model to the second control point from the second control point; and
  determines as a second estimated offset of the second control point a distance between the second control point and the fourth intersection point.

105. The system recited in claim 92, wherein said geometric object driver sub-module further maintains the attachment and offsets along a surface normal of the attachment point the particular control point from the attachment point by the determined distance during animation of the model.

106. The system recited in claim 92, wherein said geometric object driver sub-module further automatically generates animated curves to be used with the animated model to match animation of at least one of the plurality of surface-attached geometric objects to the animated model.

107. The system recited in claim 106, wherein automatically generating animated curves comprises:
attaching control points of the first plurality of curves to a corresponding estimated closest point on a surface of the model in a static pose;
recording a distance between each of the control points and its corresponding estimated closest point; and
offsetting, during animation of the model, each of the control points from its corresponding attachment point by the recorded distance along a surface normal of the corresponding attachment point.

108. The system recited in claim 107, wherein lengths of the animated curves are adjusted to be approximately the same as lengths of the first plurality of curves.

109. The system recited in claim 106, wherein the model includes a sheath of manually animated surface-attached geometric objects for facilitating automated animation of the plurality of surface-attached geometric objects.

110. The system recited in claim 81, wherein at least one surface-attached geometric object of the plurality of surface-attached geometric objects has at least one of a varying radius and a varying width along a length of the at least one surface-attached geometric object.

111. The system recited in claim 110, wherein each of the plurality of surface-attached geometric objects is singly attached to the surface.

112. A system for digitally representing a plurality of surface-attached geometric objects on a model, the system comprising:
a particle generation sub-module to generate and place a plurality of particles on a first set of predetermined locations on a patch of surface of the model;
a key-curve sub-module to generate a first plurality of curves, each of the first plurality of curves including at least one control point, and place each of the first plurality of curves at a second set of predetermined locations on the model;
a base geometric object instancer to define a flat ribbon including segments separated at the at least one control point on at least one curve of the first plurality of curves, and twist at least one segment of the segments of the flat ribbon by rotating the at least one segment about a central axis of the flat ribbon at the at least one control point of the at least one curve;
a key-curve triangulation module to determine, for each particle of the plurality of particles, locations of a group of three of the first plurality of curves that form a triangle enclosing the particle, and weights of each curve in the group of three relative to the particle;
a curve/ribbon interpolation sub-module to generate a second plurality of curves at the first set of predetermined locations of the plurality of particles on the surface by interpolating, for each particle of the plurality of particles, the group of three of the first plurality of curves according to the weights;
a shaped geometric object generation sub-module to generate the plurality of surface-attached geometric objects;
a final geometric object generation sub-module to replace the plurality of particles and the second plurality of curves with the plurality of surface-attached geometric objects;
wherein the key-curve sub-module further:

estimates, for each of a plurality of control points of the at least one of the first plurality of curves, a closest surface point on the model;
attaches each of the plurality of control points to its corresponding closest surface point in a static pose of the model;
determines a distance between each of the plurality of control points and its corresponding closest surface point; and
maintains the attachment and offsets along a surface normal of the corresponding attachment point each of the plurality of control points from its corresponding attachment point by the determined distance during animation of the model; and
a display module to display the plurality of surface-attached geometric objects.

113. An apparatus for digitally representing a plurality of surface-attached geometric objects on a model, the apparatus comprising:
means for generating and placing a plurality of particles on a first set of predetermined locations on a patch of surface of the model to produce over the surface a non-uniform density of the plurality of particles;
means for generating a first plurality of curves, each curve of the first plurality of curves comprising at least one control point;
means for placing each of the first plurality of curves at a second set of predetermined locations on the model;
means for defining a flat ribbon including segments separated at the at least one control point on at least one curve of the first plurality of curves;
means for twisting at least one segment of the segments of the flat ribbon by rotating the at least one segment about a central axis of the flat ribbon at the at least one control point of the at least one curve;
means for determining, for each particle of the plurality of particles, locations of a group of three of the first plurality of curves that form a triangle enclosing the particle, and weights of each curve in the group of three relative to the particle;
means for generating a second plurality of curves at the first set of predetermined locations of the plurality of particles on the surface by interpolating, for each particle of the plurality of particles, the group of three of the first plurality of curves according to the weights;
means for generating the plurality of surface-attached geometric objects;
means for replacing the plurality of particles and the second plurality of curves with the plurality of surface-attached geometric objects to produce over the surface a non-uniform density of the plurality of surface-attached geometric objects; and
means for displaying at least one of the plurality of surface-attached geometric objects.

114. The apparatus recited in claim 113, wherein at least one surface-attached geometric object of the plurality of a surface-attached geometric objects has at least one of a varying radius and a varying width along a length of the at least one surface-attached geometric object.

115. The apparatus recited in claim 114, wherein each of the plurality of surface-attached geometric objects is singly attached to the surface.

116. An animation sequence including images representing a plurality of surface-attached geometric objects on a surface, wherein a process for generating the animation sequence comprises:

generating and placing a plurality of particles on a first set of predetermined locations on a patch of surface of the model to produce over the surface a non-uniform density of the plurality of particles;

generating a first plurality of curves, each curve of the first plurality of curves including at least one control point;

placing each of the first plurality of curves at a second set of predetermined locations on the model;

defining a flat ribbon including segments separated at the at least one control point on at least one curve of the first plurality of curves;

twisting at least one segment of the segments of the flat ribbon by rotating the at least one segment about a central axis of the flat ribbon at the at least one control point of the at least one curve;

determining, for each particle of the plurality of particles, locations of a group of three of the first plurality of curves that form a triangle enclosing the particle, and weights of each curve in the group of three relative to the particle;

generating a second plurality of curves at the first set of predetermined locations of the plurality of particles on the surface by interpolating, for each particle of the plurality of particles, the group of three of the first plurality of curves according to the weights;

generating the plurality of surface-attached geometric objects;

replacing the plurality of particles and the second plurality of curves with the plurality of surface-attached geometric objects to produce over the surface a non-uniform density of the plurality of surface-attached geometric objects; and Displaying at least one of the plurality of surface-attached geometric object.

117. The computer-readable medium recited in claim 1, wherein at least one surface-attached geometric object of the plurality of surface-attached geometric objects has at least one of a varying radius and a varying width along a length of the at least one surface-attached geometric object.

118. The computer-readable medium recited in claim 117, wherein each of the plurality of surface-attached geometric objects is singly attached to the surface.

119. The animation sequence recited in claim 116, wherein at least one surface-attached geometric object of the plurality of surface-attached geometric objects has at least one of a varying radius and a varying width along a length of the at least one surface-attached geometric object.

120. The animation sequence recited in claim 119, wherein each of the plurality of surface-attached geometric objects is singly attached to the surface.

* * * * *